United States Patent
Schoenfisch et al.

(10) Patent No.: US 12,460,050 B2
(45) Date of Patent: Nov. 4, 2025

(54) NITRIC OXIDE-RELEASING HYPERBRANCHED COMPOUNDS AS ANTIBACTERIAL SCAFFOLDS AND METHODS PERTAINING THERETO

(71) Applicant: The University of North Carolina at Chapel Hill, Chapel Hill, NC (US)

(72) Inventors: Mark H. Schoenfisch, Chapel Hill, NC (US); Lei Yang, Carrboro, NC (US); Haibao Jin, Carrboro, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 1216 days.

(21) Appl. No.: 16/763,414

(22) PCT Filed: Nov. 14, 2018

(86) PCT No.: PCT/US2018/061061
§ 371 (c)(1),
(2) Date: May 12, 2020

(87) PCT Pub. No.: WO2019/099525
PCT Pub. Date: May 23, 2019

(65) Prior Publication Data
US 2020/0332061 A1    Oct. 22, 2020

Related U.S. Application Data

(60) Provisional application No. 62/737,603, filed on Sep. 27, 2018, provisional application No. 62/586,404, filed on Nov. 15, 2017.

(51) Int. Cl.
C08G 73/02       (2006.01)
A61K 31/785      (2006.01)
(Continued)

(52) U.S. Cl.
CPC .......... C08G 73/028 (2013.01); A61K 31/785 (2013.01); A61L 2/16 (2013.01); C08G 83/006 (2013.01); A61L 2202/24 (2013.01)

(58) Field of Classification Search
CPC .. C08G 73/028; C08G 83/006; A61K 31/785; A61L 2/16; A61L 2202/24
See application file for complete search history.

(56) References Cited

U.S. PATENT DOCUMENTS

| 4,169,079 A | 9/1979 | Tabushi et al. |
| 5,234,933 A | 8/1993 | Marnett et al. |

(Continued)

FOREIGN PATENT DOCUMENTS

| CA | 2205564 C | 7/2006 |
| CN | 101049513 A | 10/2007 |

(Continued)

OTHER PUBLICATIONS

Falcone et al., "Rheological and cohesive properties of hyaluronic acid," J. Biomed. Mater. Res., Part A, 76A(4):721-728, (2005).

(Continued)

*Primary Examiner* — Jianfeng Song
(74) *Attorney, Agent, or Firm* — Alston & Bird LLP

(57) ABSTRACT

Several embodiments of hyperbranched structures are disclosed. In some embodiments, the hyperbranched structures are covalently modified to store and release nitric oxide. Some embodiments pertain to methods of making and also to the use of hyperbranched structures. The covalently modified hyperbranched structures may be tailored to release nitric oxide in a controlled manner and are useful for eradication of both gram positive and gram negative bacteria as well as other microbes.

13 Claims, 21 Drawing Sheets

(51) Int. Cl.
  *A61L 2/16* (2006.01)
  *C08G 83/00* (2006.01)

(56) References Cited

U.S. PATENT DOCUMENTS

| | | |
|---|---|---|
| 5,326,902 A | 7/1994 | Seipp et al. |
| 5,525,357 A | 6/1996 | Keefer et al. |
| 5,574,027 A | 11/1996 | Bernstein |
| 5,632,981 A | 5/1997 | Saavedra et al. |
| 5,650,442 A | 7/1997 | Mitchell et al. |
| 5,650,447 A | 7/1997 | Keefer et al. |
| 5,714,511 A | 2/1998 | Saavedra et al. |
| 5,814,666 A | 9/1998 | Green et al. |
| 5,840,759 A | 11/1998 | Mitchell et al. |
| 5,910,316 A | 6/1999 | Keefer et al. |
| 6,110,453 A | 8/2000 | Keefer et al. |
| 6,121,441 A | 9/2000 | Simensen et al. |
| 6,180,082 B1 | 1/2001 | Woltering et al. |
| 6,200,558 B1 | 3/2001 | Saavedra et al. |
| 6,261,594 B1 | 7/2001 | Smith et al. |
| 6,451,337 B1 | 9/2002 | Smith et al. |
| 6,911,433 B2 | 6/2005 | Saavedra et al. |
| 7,553,656 B2 | 6/2009 | Gimmestad et al. |
| 7,928,079 B2 | 4/2011 | Hrabie et al. |
| 8,158,580 B2 | 4/2012 | Judice et al. |
| 8,603,454 B2 | 12/2013 | Cheng et al. |
| 8,815,831 B2 | 8/2014 | Onsoyen et al. |
| 8,841,279 B2 | 9/2014 | Taylor et al. |
| 8,987,215 B2 | 3/2015 | Taylor et al. |
| 9,238,038 B2 | 1/2016 | Schoenfisch et al. |
| 9,539,233 B2 | 1/2017 | Ohtake et al. |
| 9,850,322 B2 | 12/2017 | Schoenfisch et al. |
| 10,759,877 B2 | 9/2020 | Schoenfisch et al. |
| 11,026,965 B2 | 6/2021 | Schoenfisch et al. |
| 11,072,668 B2 | 7/2021 | Schoenfisch et al. |
| 2001/0000039 A1 | 3/2001 | Toone et al. |
| 2002/0122857 A1 | 9/2002 | Asai et al. |
| 2003/0078365 A1 | 4/2003 | Stamler et al. |
| 2003/0093143 A1 | 5/2003 | Zhao et al. |
| 2004/0038947 A1 | 2/2004 | Wink et al. |
| 2005/0009789 A1 | 1/2005 | Wink et al. |
| 2005/0085413 A1 | 4/2005 | Jin et al. |
| 2005/0228184 A1 | 10/2005 | Haj-Yehia |
| 2005/0265956 A1 | 12/2005 | Liu et al. |
| 2006/0199785 A1 | 9/2006 | Fahmi et al. |
| 2007/0243131 A1 | 10/2007 | Chen et al. |
| 2008/0305004 A1 | 12/2008 | Anderson et al. |
| 2009/0214618 A1 | 8/2009 | Schoenfisch et al. |
| 2009/0222088 A1 | 9/2009 | Chen et al. |
| 2009/0232863 A1 | 9/2009 | Cheng et al. |
| 2010/0197631 A1 | 8/2010 | Reiner et al. |
| 2010/0305062 A1 | 12/2010 | Onsoyen et al. |
| 2010/0305489 A1 | 12/2010 | Liu et al. |
| 2011/0002999 A1 | 1/2011 | Chen et al. |
| 2011/0150999 A1 | 6/2011 | Chu et al. |
| 2011/0218139 A1 | 9/2011 | Robinson et al. |
| 2012/0034169 A1 | 2/2012 | Schoenfisch et al. |
| 2012/0107229 A1 | 5/2012 | Huang et al. |
| 2013/0096078 A1 | 4/2013 | Yoon et al. |
| 2013/0196951 A1 | 8/2013 | Schoenfisch et al. |
| 2013/0337033 A1 | 12/2013 | Balkus, Jr. et al. |
| 2014/0256658 A1 | 9/2014 | Sinha et al. |
| 2015/0126467 A1 | 5/2015 | Onsøyen et al. |
| 2015/0225488 A1 | 8/2015 | Schoenfisch et al. |
| 2016/0185891 A1 | 6/2016 | Chambers et al. |
| 2016/0331777 A1 | 11/2016 | Dessen et al. |
| 2016/0346313 A1 | 12/2016 | Taylor Nordgard et al. |
| 2016/0361342 A1 | 12/2016 | Hansson et al. |
| 2017/0333456 A1 | 11/2017 | Miranda et al. |
| 2018/0055873 A1 | 3/2018 | Dessen et al. |
| 2019/0197631 A1 | 6/2019 | Schneider |
| 2019/0225747 A1 | 7/2019 | Schoenfisch et al. |
| 2019/0322770 A1 | 10/2019 | Schoenfisch et al. |
| 2019/0343869 A1 | 11/2019 | Schoenfisch et al. |
| 2020/0021657 A1 | 1/2020 | Brinkmann et al. |
| 2020/0030362 A1 | 1/2020 | Schoenfisch et al. |
| 2020/0216571 A1 | 7/2020 | Schoenfisch et al. |
| 2021/0346424 A1 | 11/2021 | Schoenfisch et al. |
| 2021/0347918 A1 | 11/2021 | Schoenfisch et al. |

FOREIGN PATENT DOCUMENTS

| | | |
|---|---|---|
| CN | 102083862 A | 6/2011 |
| CN | 106046382 A | 10/2016 |
| EP | 0726768 B1 | 5/2000 |
| EP | 2547660 B1 | 1/2015 |
| EP | 3185853 A1 | 7/2017 |
| IN | 2010DN04583 A | 11/2010 |
| JP | 2001-524991 A | 12/2001 |
| JP | 2002-518557 A | 6/2002 |
| JP | 2005047979 A | 2/2005 |
| JP | 4285775 B2 | 6/2009 |
| NO | 20050480 L | 4/2005 |
| WO | WO 93/25521 A1 | 12/1993 |
| WO | WO 1996/015797 A1 | 5/1996 |
| WO | WO 1996/032136 | 10/1996 |
| WO | WO 1998/005689 A1 | 2/1998 |
| WO | WO 1998/013358 A1 | 4/1998 |
| WO | WO 00/30658 A1 | 6/2000 |
| WO | WO 2007/085254 A1 | 8/2007 |
| WO | WO 2009/049208 A1 | 4/2009 |
| WO | WO 2010/037179 A1 | 4/2010 |
| WO | WO 2010/096320 A2 | 8/2010 |
| WO | WO 2010/139957 A1 | 12/2010 |
| WO | WO 2010/139958 A1 | 12/2010 |
| WO | WO 2010/139959 A2 | 12/2010 |
| WO | WO 2011/003172 A1 | 1/2011 |
| WO | WO 2012/046994 A2 | 4/2012 |
| WO | WO 2012/116177 A2 | 8/2012 |
| WO | WO 2013/029009 A1 | 2/2013 |
| WO | WO 2014/028847 A1 | 2/2014 |
| WO | WO 2017/060388 A1 | 4/2017 |
| WO | WO 2018/067838 A1 | 4/2018 |
| WO | WO 2018/127819 A1 | 7/2018 |
| WO | WO 2018/178902 A1 | 10/2018 |
| WO | WO 2019/099525 A1 | 5/2019 |
| WO | WO 2019/173539 A1 | 9/2019 |
| WO | WO 2020/139857 A1 | 7/2020 |

OTHER PUBLICATIONS

Zhou et al., "Polymethacrylate-Based Nitric Oxide Donors with Pendant N-Diazeniumdiolated Alkyldiamine Moieties: Synthesis, Characterization, and Preparation of Nitric Oxide Releasing Polymeric Coatings," Biomacromolecules, 6:780-789, (2005).
U.S. Appl. No. 16/725,566, Non-Final Office Action mailed Jun. 10, 2021.
Hopkins, Sean, "Development of High Capacity Hyperbranched Nitric Oxide Donors for Controlling Subcutaneous Inflammation," Access Dissertation, Michigan Technological University, (2015).
Yang, Lei et al., "Antibacterial Activity of Nitric Oxide-Releasing Hyperbranched Polyamidoamines," Bioconjugate Chem., 29:35-43, (2018).
Chinese Application No. 201880080277.6, First Office Action, dated Sep. 3, 2021.
WIPO Application No. PCT/US2019/068412, PCT International Preliminary Report on Patentability mailed Jul. 8, 2021.
Ahonen et al., "Nitric oxide-releasing alginates as mucolytic agents," ACS Biomater. Sci. Eng., 5:3409-3418, (2019).
Ahonen et al., "Nitric oxide-releasing alginate as a biodegradable antibacterial scaffold," 253rd National Metting of the American Chemical Society (ACS) on Advanced Materials, Technologies, Systems, and Processes; San Francisco, CA, Apr. 2-6, 2017— Abstracts of Papers, p. 600, (2017).
Allaker, R.P., "The use of Nanoparticles to Control Oral Biofilm formation," J Dent Res, 89(11):1175-1186, (2010).
Alnaief et al., "Preparation of biodegradable nanoporous microspherical aerogel based on alginate," Carbohydrate Polymers, 84(3):1011-1018, (2011).

(56) References Cited

OTHER PUBLICATIONS

Arulsamy, N. et al. "Multiplicity Control in the Polygeminal Diazeniumdiolation of Active Hydrogen Bearing Carbons: Chemistry of a New Type of Trianionic Molecular Propeller," S. J. Am. Chem. Soc.,123:10860-10869, (2001).

Backlund et al., "Antibacterial Efficacy of Exogenous Nitric Oxide on Periodontal Pathogens," J Dent Res, 93(11):1089-1094, (2014).

Backlund et al., "Anti-biofilm action of nitric oxide-releasing alkyl-modified poly(amidoamine) dendrimers against *Streptococcus mutans*," Acta Biomaterialia, 29:198-205, (2016).

Backlund et al., "Kinetic-dependent Killing of Oral Pathogens with Nitric Oxide," J Dent Res, 94(8):1092-1098, (2015).

Barraud et al., "Nitric Oxide: A Key Mediator of Biofilm Dispersal with Applications in Infectious Diseases," Curr. Pharm. Des., 21(1):31-42, (2015).

Barraud et al., "Involvement of Nitric Oxide in Biofilm Dispersal of Pseudomonas aeruginosa," Journal of Bacteriology, 188(21):7344-7353, (2006).

Beck et al., "Systemic Effects of Periodontitis: Epidemiology of Periodontal Disease and Cardiovascular Disease," J. Periodontol., 76(11)(Suppl.):2089-2100, (2005).

Belley, A et al., "Assessment by time-kill methodology of the synergistic effects of oritavancin in combination with other antimicrobial agents against *Staphylococcus aureus*," Antimicrob. Agents Chemother., 52:3820-3822, (2008).

Benkovics et al., "A multifunctional β-cyclodextrin-conjugate photodelivering nitric oxide with fluorescence reporting," International Journal of Pharmaceutics, 531: 614-620 (2017).

Bernkop-Schnurch et al., "Improvement in the mucoadhesive properties of alginate by the covalent attachment of cysteine," Journal of Controlled Release, 71(3):277-285, (2001).

Besinis et al., "Review of Nanomaterials in Dentistry: Interactions with the Oral Microenvironment, Clinical Applications, Hazards, and Benefits," ACS Nano, 9(3):2255-2289, (2015).

Beveridge, Terry J., "Structures of Gram-Negative Cell Walls and Their Derived Membrane Vesicles," Journal of Bacteriology, 181(16):4725-4733, (1999).

Bhardwaj, Atul, et al., "A diazen-1-ium-1, 2-diolate analog of 7-azabenzobicyclo [2.2. 1] heptane: Synthesis, nitric oxide and nitroxyl release, in vitro hemodynamic, and anti-hypertensive studies," Bioorganic & Medicinal Chemistry Letters, 23(9):2769-2774, (2013).

Bjarnsholt et al., "Why chronic wounds will not heal: a novel hypothesis," Wound Rep Reg, 16:2-10, (2008).

Boas and Heegaard, "Dendrimers in drug research," Chem. Soc. Rev., 33(1):43-63, (2004).

Bogdan, Christian, "Nitric oxide and the immune response," Nat. Immunol., 2(10):907-916, (2001).

Bollenbach, T., "Antimicrobial interactions: mechanisms and implications for drug discovery and resistance evolution," Curr. Opin. Microbiol., 27:1-9, (2015).

Breed and Dotterrer, "The number of colonies allowable on satisfactory agar plates," J. Bacteriol. 1(3):321-331, (1916).

Calabretta et al., "Antibacterial activities of poly (amidoamine) dendrimers terminated with amino and poly (ethylene glycol) groups," Biomacromolecules, 8(6):1807-1811, (2007).

Caleffi-Ferracioli et al., "Fast detection of drug interaction in *Mycobacterium tuberculosis* by a checkerboard resazurin method," Tuberculosis, 93:660-663, (2013).

Caminade et al., "Dendrimers and hyperbranched polymers," Chem. Soc. Rev, 44(12):3870-3873, (2015).

Cao et al., "Synthesis and striking fluorescence properties of hyperbranched poly (amido amine)," J. Macromol. Sci. Pure Appl. Chem., 44(4):417-424, (2007).

Caraher, E. M. et al., "The effect of recombinant human lactoferrin on growth and the antibiotic susceptibility of the cystic fibrosis pathogen *Burkholderia cepacia* complex when cultured planktonically or as biofilms," J. Antimicrob. Chemother., 60:546-554, (2007).

Carlmark et al., "New methodologies in the construction of dendritic materials," Chem. Soc. Rev., 38(2):352-362, (2009).

Carlmark, A. et al., "Dendritic Architechtures Based on bis-MPA: Functional Polymeric Scaffolds for Application-Driven Research," Chem Soc Rev., 42:5858-79, (2013).

Carpenter et al., "Dual action antimicrobials: nitric oxide release from quaternary ammonium-functionalized silica nanoparticles," Biomacromolecules, 13(10):3334-3342, (2012).

Carpenter et al., "Nitric oxide release: Part II. Therapeutic applications," Chem. Soc. Rev., 41(10):3742-3752, (2012).

Centers for Disease Control, Antibiotic Resistance Threats in the United States, (2013).

Chakrapani, Harinath, et al., "Nitric oxide prodrugs: diazeniumdiolate anions of hindered secondary amines," Organic Letters, 9(22): 4551-4554, (2007).

Charbonneau et al., "Reduced chlorhexidine tooth stain coverage by sequential administration of monoperoxyphthalic acid in the beagle dog," J. Dent. Res., 76(9):1596-1601, (1997).

Chen et al., "Cytotoxicity, hemolysis, and acute in vivo toxicity of dendrimers based on melamine, candidate vehicles for drug delivery," J. Am. Chem. Soc., 126(32):10044-10048, (2004).

Chen et al., "Cariogenic Actinomyces Identified with a β-Glucosidase-Dependent Green Color Reaction to Gardenia jasminoides Extract," Journal of Clinical Microbology, 39(8):3009-3012, (2001).

Chen et al., "Hyperbranched glycoconjugated polymer from natural small molecule kanamycin as a safe and efficient gene vector," Polym. Chem., 2:2674-2682, (2011).

Chen et al., "Hyperbranched polymers from A2 +B 3 strategy: recent advances in description and control of fine topology," Polym. Chem., 7(22):3643-3663, (2016).

Chen et al., "Multifunctional Hyperbranched Glycoconjugated Polymers Based on Natural Aminoglycosides," Bioconjugate Chemistry, 23(6):1189-1199, (2012).

Chen et al., "Selective deprotection of the Cbz amine protecting group for the facile syntehsis of kanmycin A dimers linked at N-3" position," Tetrahedron, 65(31)5922-5927, (2009).

Cheng et al., "Michael Addition Polymerization of Trifunctional Amine and Acrylic Monomer: A Versatile Platform for Development of Biomaterials ," Biomacromolecules, 17(10):3115-3126, (2016).

Ciacci, N., et al., "In vitro Synergism of Colistin and N-acetylcysteine against Stenotrophomonas maltophilia," Antibiotics, 8:101, (2019).

Ciofu, O. & Tolker-Nielsen, T., "Tolerance and Resistance of *Pseudomonas aeruginosa* Biofilms to Antimicrobial Agents-How *P. aeruginosa* Can Escape Antibiotics," Front. Microbiol., 10:913, (2019).

Cleland, W.W., "Diothiothreitol, A New Protective Reagent for SH Groups," Biochemical., 3(4):480-482, (1964).

Compound Summary, "PubChem Compound Summary for CID 65430: Gallium citrate ga-67," National Library of Medicine: National Center for Biotechnology Information, (Last accessed Aug. 7, 2020), https://pubchem.ncbi.nlm.nih.gov/compound/Gallium-citrate-ga-67.

Compound Summary, "Gallium citrate Ga-67," Drugbank, (Last accessed Aug. 6, 2020), https://www.drugbank.ca/drugs/DB06784.

Compound Summary, "PubChem Compound Summary for CID 61635, Gallium nitrate," National Library of Medicine: National Center for Biotechnology Information, (Last accessed Aug. 7, 2020) https://pubchem.ncbi.nlm.nih.gov/compound/61635.

Coneski and Schoenfisch, "Nitric oxide release: part III. Measurement and reporting," Chem. Soc. Rev, 41(10):3753-3758, (2012).

Coneski, "Design and Synthesis of Nitric Oxide Releasing Polymers for Biomedical Applications", pp. 122-127, (2010). [Retrieved from the Internet: URL:https://cdr.lib.unc.edu/indexablecontent/uuid:d84bce49-d4dd-4026-96a5-3ea9e82dee9c [retrieved on Oct. 9, 2015]].

Coneski, P.N. and Schoenfisch, M.H., "Synthesis of Nitric Oxide-Releasing Polyurethanes with S-Nitrosothiol-Containing Hard and Soft Segments," Polym Chem., 2(4):906-913, (2011).

Coneski, P.N. et al., "Degradable Nitric Oxide-Releasing Biomaterials via Post-Polymerization Functionalization of Cross-Linked Polyesters," Biomacromolecules, 11(11):3208-3215, (2010).

Cooke et al., "Nitric Oxide and Angiogenesis," Circulation, 105:2133-2135, (2002).

(56) References Cited

OTHER PUBLICATIONS

Cooke, John P., "NO and Angiogenesis," Atherosclerosis Suppl., 4(4):53-60, (2003).
Cullen, L. & Mcclean, S., "Bacterial adaptation during chronic respiratory infections," Pathogens, 4:66-89, (2015).
Cutrone et al., "Mannoside and 1,2-mannobioside β-cyclodextrin-scaffolded NO-photodonors for targeting antibiotic resistant bacteria", Carbohydr. Polym, 199: 649-660, (2018).
Da Silva et al., "Antimicrobial peptide control of pathogenic microorganisms of the oral cavity: A review of the literature," Peptides, 36(2):315-321, (2012).
Damodaran, V.B. and Reynolds, M.M., "Biodegradable S-Nitrosothiol Tethered Multiblock Polymer for Nitric Oxide Delivery," J Mater Chem., 21:5870-5872, (2011).
Davies et al., "Evolutionary diversification of Pseudomonas aeruginosa in an artificial sputum model," BMC Microbiol. 17:3, (2017).
Davies et al., "Chemistry of the diazeniumdiolates. 2. Kinetics and Mechanism of Dissociation to Nitric Oxide in Aqueous Solution," JACS, 123(23):5473-5481, (2001).
Deng et al., "pH and cation-responsive supramolecular gels formed by cyclodextrin amines in DMSO," Soft Matter, 6:1884-1887, (2010).
Deupree, S. M. & Schoenfisch, M. H., "Morphological analysis of the antimicrobial action of nitric oxide on Gram-negative pathogens using atomic force microscopy," Acta Biomater., 5:1405-1415, (2009).
Draget et al., "Chemical, physical and biological properties of alginates and their biomedical implications," Food Hydrocolloids, 25(2):251-256, (2011).
Drug Development Pipeline Status, "Inhaled Gallium: Phase One", Cystic Fibrosis Foundation, (Last accessed Aug. 13, 2020), https://www.cff.org/Trials/Pipeline/details/10146/Inhaled-Gallium.
Duncan and Izzo, "Dendrimer biocompatibility and toxicity," Adv. Drug Deliv. Rev., 57(14):2215-2237, (2005).
Duong et al., "Functional gold nanoparticles for the storage and controlled release of nitric oxide: applications in biofilm dispersal and intracellular delivery," J. Mater. Chem. B-2, 2(31):5003-5011, (2014).
Duong et al., "Nanoparticle (Star Polymer) Delivery of Nitric Oxide Effectively Negates Pseudomonas aeruginosa Biofilm Formation," Biomacromolecules, 15(7):2583-2589, (2014).
Elion et al., "Antagonists of Nucleic Acid Derivatives: VIII. Synergism in combinations of biochemically related antimetabolites," J. Biol. Chem., 208:477-488, (1954).
Fang, Ferric C., "Antimicrobial reactive oxygen and nitrogen species: concepts and controversies," Nat. Rev. Micro., 2(10):820-832, (2004).
Feliu, N. et al., "Stability and Biocompatibility of a Library of Polyester Dendrimers in Comparison to Polyamidoamine Dendrimers," Biomaterials., 33(7):1970-1981, (2012).
Fernández-Barat, L. et al., "Phenotypic shift in Pseudomonas aeruginosa populations from cystic fibrosis lungs after 2-week antipseudomonal treatment," J. Cyst. Fibros., 16:222-229, (2017).
Friedman et al., "The negative impact of antibiotic resistance," Clin. Microbiol. Infect., 22:416-422, (2016).
Frost, M.C. and Meyerhoff, M.E., "Synthesis, Characterization, and Controlled Nitric Oxide Release from S-Nitrosothiol-Derivatized Fumed Silica Polyme Filler Particles," J Biomed Mater Res Part A., 72A(4):409-419, (2005).
Fu, et al., "Preparation and reversible photo-crosslinking/photocleavage behavior o 4-methylcoumarin functionalized hyperbranched polyester," Polymer, 49(23): 4981-4988, (2008).
Gabor, G. and Vincze, A., "Determination of Thiols in Non-Aqueous Solutions," Anal Chim Acta., 92(2):429-431, (1977).
Gao and Koo, "Do catalytic nanoparticles offer an improved therapeutic strategy to combat dental biofilms?," Nanomed. Nanotech. Biol. Med., 12(4):275-279, (2017).
Gao and Yan, "Hyperbranched polymers: from synthesis to applications," Prog. Polym. Sci., 29(3):183-275, (2004).
Gao, Q, et al., "Synthesis and Characterization of Chitosan-Based Diazeniumdiolates [Abstract]," Polymer Materials Science and Engineering, 24(12):415-421, (2008).
Ghosh, S. & Lapara, T. M., "The effects of subtherapeutic antibiotic use in farm animals on the proliferation and persistence of antibiotic resistance among soil bacteria," ISME J., 1:191-203, (2007).
Gibney et al., "Poly(ethylene imine)s as antimicrobial agents with selective activity," Macromol. Biosci., 12(9):1279-1289, (2012).
Gombotz et al., "Protein release from alginate matrices," Advanced Drug Delivery Reviews, 31(3):267-285 (1998).
Grabowski et al., "Toxicity of surface-modified PLGA nanoparticles toward lung alveolar epithelial cells," International Journal of Pharmaceutics, 454:686-694, (2013).
Haggie, P., and Lueck, J.(Eds), "Agenda for Cystic Fibrosis Foundation Research Conference," Cystic Fibrosis Foundation, (2019), https://www.cff.org/Research/Researcher-Resources/Cystic-Fibrosis-Foundation-Research-Conference/.
Hall, J. R. et al., "Mode of nitric oxide delivery affects antibacterial action," ACS Biomater. Sci. Eng., acsbiomaterials.9b01384 (2019).
Hall-Stoodley et al., "Bacterial Biofilms: from the Natural Environment to Infectious Diseases," Nat. Rev. Micro., 2:95-108, (2004).
Harrison et al., "Development of an ex vivo porcine lung model for studying growth Virulence, And signaling of pseudomonas aeruginosa," Infect. Immun., 82:3312-3323, (2014).
Helander, I. M. & Mattila-Sandholm, T., "Fluorometric assessment of Gram-negative bacterial permeabilization," J. Appl. Microbiol., 88:213-219, (2000).
Hetrick and Schoenfisch, "Analytical chemistry of nitric oxide," Annu. Rev. Anal. Chem., 2:409-433, (2009).
Hetrick et al., "Anti-biofilm efficacy of nitric oxide-releasing silica nanoparticles," Biomaterials, 30:2782-2789, (2009).
Hetrick et al., "Bactericidal Efficacy of Nitric-Oxide Releasing Silica Nanoparticles," ACS Nano, 2(2):235-246, (2008).
Hopkins, Sean, "Development of high capacity hyperbranched nitric oxide donors for controlling ubcutaneous inflammation," Open Access Dissertation, Michigan Technological University, 154 pages, (2015).
Hossain et al., "Discovery of Two Bacterial Nitric Oxide-Responsive Proteins and Their Roles in Bacterial Biofilm Regulation," Acc. Chem. Res., 50(7):1633-1639, (2017).
Howlin, R. P., et al., "Low-Dose Nitric Oxide as Targeted Anti-biofilm Adjunctive Therapy to Treat Chronic Pseudomonas aeruginosa Infection in Cystic Fibrosis," Mol. Ther., 25:2104-2116, (2017).
Hrabie, Joseph A., et al., "New nitric oxide-releasing zwitterions derived from polyamines," The Journal of Organic Chemistry, 58(6):1472-1476, (1993).
Hu et al., "A smart aminoglycoside hydrogel with tunable gel degradation, on-demand drug release, and high antibacterial activity," Journal of Controlled Release, 247:145-152, (2017).
Huang et al., "Nitric oxide-loaded echogenic liposomes for nitric oxide delivery and inhibition of intimal hyperplasia," J. Am. Coll. Cardiol., 54(7):652-659, (2009).
Huang et al., "Reduction-responsive multifunctional hyperbranched polyaminoglycosides with excellent antibacterial activity, biocompatibility and gene transfection capability," Biomaterials, 106:134-143, (2016).
Hussain et al., "Glucocorticoids can affect Pseudomonas aeruginosa (ATCC 27853) internalization and intracellular calcium concentration in cystic fibrosis bronchial epithelial cells," Experimental Lung Research, 41(7):383-392, (2015).
Imfeld, T. "Chewing gum—facts and fiction: a review of gum-chewing and oral health," Crit. Rev. Oral. Biol. Med., 10(3):405-419, (1999).
Jin et al., "Nitric Oxide-Releasing Cyclodextrins," Journal of the American Chemical Society, 140: 14178-14184 (2018).
Jin et al., "Biocompatible or biodegradable hyperbranched polymers: from self-assembly to cytomimetic applications," Chem. Soc. Rev., 41(18):5986-5997, (2012).
Jones et al., "Antimicrobial properties of nitric oxide and its application in antimicrobial formulations and medical devices," Appl. Microbiol. Biotechnol., 88(2):401-407, (2010).
Jones, C.G., "Chlorhexidine: is it still the gold standard?" Periodontology 2000, 15:55-62, (1997).

(56) References Cited

OTHER PUBLICATIONS

Kailasan et al., "Synthesis and characterization of thermoresponsive polyamidoamine-polyethylene glycol-poly (d, l-lactide) core-shell nanoparticles," Acta Biomater. 6(3):1131-1139, (2010).
Kaneko et al., "The transition metal gallium disrupts Pseudomonas aeruginosa iron metabolism and has antimicrobial and antibiofilm activity," The Journal of Clinical Investigations, 117(4):877-888, (2007).
Karatasos, K., "Self-Association and Complexation of the Anti-Cancer Drug Doxorubicin with PEGylated Hyperbranched Polyesters in an Aqueous Environment," J Phys Chem B., 117(8):2564-2575, (2013).
Kassebaum et al., "Global Burden of Untreated Caries: A Systematic Review and Metaregression," Journal of Dental Research, 94(5):650-658, (2015).
Keefer et al., "Chemistry of the Diazeniumdiolates I. Structural and Spectral Characteristics of the [N(O)NO]-Functional Group," Nitric Oxide, 5(4):377-394, (2001).
Keefer et al., "'NONOates' (1-Substituted Diazen-1-ium-1,2-diolates) as Nitric Oxide Donors: Convenient Nitric Oxide Dosage Forms," Methods in Enzymology, 268:281-293, (1996).
Keefer, Larry K., "Fifty Years of Diazeniumdiolate Research. From Laboratory Curiosity to Broad-Spectrum Biomedical Advances," ACS Chemical Biology, 6(11):1147-1155, (2011).
Keefer, Larry K., "Nitric Oxide (NO)- and Nitroxyl (HNO)-Generating Diazeniumdiolates (NONOates): Emerging Commercial Opportunities," Current Topics in Medicinal Chemistry, 5(7):625-636, (2005).
Khalil et al., "Synergy between Polyethylenimine and Different Families of Antibiotics against a Resistant Clinical Isolate of Pseudomonas aeruginosa," Antimicrob. Agents Chemother., 52:1635-1641, (2008).
Khan et al., "Overcoming Drug Resistance with Alginate Oligosaccharides Able to Potentiate the Action of Selected Antibiotics," Antimicrobial Agents and Chemotherapy, 56(10):5134-5141, (2012).
Kim et al., "NONOates—polyethylenimine hydrogel for controlled nitric oxide release and cell proliferation modulation," Bioconjugate Chem., 22(6):1031-1038, (2011).
Knop et al., "Poly(ethylene glycol) in drug delivery: pros and cons as well as potential alternatives," Angew. Chem. Int. Ed., 49(36):6288-6308, (2010).
Konter, Joerg, et al., "Synthesis of Diazen-1-ium-1, 2-diolates Monitored by the "NOtizer" Apparatus: Relationship between Formation Rates, Molecular Structure and the Release of Nitric Oxide," European Journal of Organic Chemistry, 2007(4): 616-624, (2007).
Kovach, K. et al., "Evolutionary adaptations of biofilms infecting cystic fibrosis lungs promote mechanical toughness by adjusting polysaccharide production," npj Biofilms Microbiomes, 3, (2017).
Kurniasih et al., "Dendritic nanocarriers based on hyperbranched polymers," Chem. Soc. Rev., 44(12):4145-4164, (2015).
Labena et al., "One-pot synthesize of dendritic hyperbranched PAMAM and assessment as a broad spectrum antimicrobial agent and anti-biofilm," Mater. Sci. Eng. C Mater. Biol. Appl., 58:1150-1159, (2016).
Lee et al., "Alginate: properties and biomedical applications," Prog Polym Sci., 37(1):106-126, (2012).
Lenoir et al., "Polyolefin matrixes with permanent antibacterial activity: preparation, antibacterial activity, and action mode of the active species," Biomacromolecules, 7(8):2291-2296, (2006).
Liakos et al., "All-natural composite wound dressing films of essential oils encapsulated in sodium alginate with antimicrobial properties," International Journal of Pharmaceutics, 463(2):137-145, (2014).
Liu et al., "Hollow double-layered polymer microspheres with pH and thermo-responsive properties as nitric oxide-releasing reservoirs," Polym. Chem., 6(17):3305-3314, (2015).
Liu et al., "Synergistic supramolecular encapsulation of amphiphilic hyperbranched polymer to dyes," Macromolecules, 39(23):8102-8111, (2006).
Liu, T. et al., "Hollow Polymer Nanoparticles with S-Nitrosothiols as Scaffolds for Nitric Oxide Release," J Colloid Interface Sci., 459:115-122, (2015).
Loesche et al., "Role of *Streptococcus mutans* in Human Dental Decay," Microbiological Reviews, 50(4):353-380, (1986).
Lowe et al., "Storage and delivery of nitric oxide via diazeniumdiolated metal organic framework," Micropor. Mesopor. Mat., 181:17-22, (2013).
Lu et al., "Nitric oxide-releasing amphiphilic poly(amidoamine) (PAMAM) dendrimers as antibacterial agents," Biomacromolecules, 14(10):3589-3598, (2013).
Lu et al., "Nitric oxide-releasing chitosan oligosaccharides as antibacterial agents," Biomaterials, 35(5):1716-1724, (2014).
Lu et al., "Structurally Diverse Nitric Oxide-Releasing Poly(propylene imine) Dendrimers," Chem. Mater., 23(18):4227-4233, (2011).
Lu, Y. et al., "Shape- and Nitric Oxide Flux-Dependent Bactericidal Activity of Nitric Oxide-Releasing Silica Nanorods," Small., 9(12):2189-2198, (2013).
Lu, Y. et al., "S-Nitrosothiol-Modified Nitric Oxide-Releasing Chitosan Oligosacccarides as Antibacterial Agents," Acta Biomater., 12:62-69, (2015).
Luo et al., "Nitric oxide: a newly discovered function on wound healing," Acta Pharmacol. Sin., 26(3):259-264, (2005).
Luo et al., "Poly (ethylene glycol)-conjugated PAMAM dendrimer for biocompatible, high-efficiency DNA delivery," Macromolecules, 35(9):356-3462, (2002).
Lutzke, A. et al., "Nitric Oxide-Releasing S-Nitrosated Derivatives of chitin and Chitosan for Biomedical Applications," J Mater Chem B., 2:7449-7458, (2014).
Lutzke, et al., "Nitric oxide release from a biodegradable cysteine-based polyphosphazene," Journal of Materials Chemistry B, 4(11): 1987-1988, (2016).
Machelart et al., "Intrinsic Antibacterial Activity of Nanoparticles Made of β-Cyclodextrins Potentiates Their Effect as Drug Nanocarriers against Tuberculosis", ACS Nano, 13: 3992-4007, (2019).
Macmicking et al., "Nitric oxide and macrophage function," Annu. Rev. Immunol, 15:323-350, (1997).
Madison, C.J., et al., "Gallium and Nitrite Have Synergistic Antimicrobial Activity," Cystic Fibrosis Conference: Scientific Session VIII: Novel Approaches for Treating Difficult Infections, Abstract, Jun. 26, 2019.
Malmström, E. et al., "Hyperbranched Aliphatic Polyesters," Macromolecules, 28(5):1698-1703, (1995).
Maragos, Chris M., et al., "Complexes of NO with nucleophiles as agents for the controlled biological release of nitric oxide. Vasorelaxant effects," Journal of Medicinal Chemistry, 34(11):3242-3247, (1991).
Martinez, J. L. & Baquero, F., "Mutation Frequencies and Antibiotic Resistance," Antimicrob. Agents Chemother., 44:1771-1777, (2000).
Matai et al., "Chemically Cross-Linked Hybrid Nanogels of Alginate and PAMAM Dendrimers as Efficient Anticancer Drug Delivery Vehicles," ACS Biomater. Sci. Eng., 2(2):213-223, (2016).
Mather et al., "Michael addition reactions in macromolecular design for emerging technologies," Prog. Polym. Sci., 31(5):487-531, (2006).
Mendelman, P. M. et al., "Aminoglycoside penetration, inactivation, and efficacy in cystic fibrosis sputum," Am. Rev. Respir. Dis., 132:761-765, (1985).
Miller et al., "Gaseous nitric oxide bactericidal activity retained during intermittent high-dose short duration exposure," Nitric Oxide, 20:16-23, (2009).
Miller et al., "Role of Oxidants in Microbial Pathophysiology," Clinical Microbiology Reviews, 10(1):1-18, (1997).
Miller, MR, and Megson, IL, "Recent developments in nitric oxide donor drugs," Br J Pharmacol., 151(3):305-321, (2007).
Minandri, F., "Promises and failures of gallium as an antibacterial agent," Future Microbiology, 9(3):379-397, (2014).
Moreno-Sastre et al., "Pulmonary delivery of tobramycin-loaded nanostructured lipid carriers for Pseudomonas aeruginosa infections associated with cystic fibrosis," International Journal of Pharmaceutics, 498:263-273, (2016).

(56) References Cited

OTHER PUBLICATIONS

Mourtzis et al., "Synthesis, characterization, and remarkable biological properties of cyclodextrins bearing guanidinoalkylamino and aminoalkylamino groups on their primary side," Chem. Eur. J., 14: 4188-4200 (2008).
Mulani et al., "Emerging Strategies to Combat ESKAPE Pathogens in the Era of Antimicrobial Resistance: A Review," Front. Microbiol., 10, (2019).
Müller, L. et al., "Human airway mucus alters susceptibility of Pseudomonas aeruginosa biofilms to tobramycin, but not colistin," J. Antimicrob. Chemother., 73:2762-2769, (2018).
Nair et al., "Biodegradable polymers as biomaterials," Prog. Polym. Sci., 32(8-9):762-798, (2007).
Nakamoto, H. and Bardwell, J.C.A., "Catalysis of Disulfide Bond Formation and Isomerization in the *Escherichia coli* Periplasm," Biochim Biophys Acta., 1694(1-3):111-119, (2004).
Nguyen et al., "Co-delivery of nitric oxide and antibiotic using polymeric nanoparticles," Chem Sci., 7(2):1016-1027, (2016).
Nichols et al., "Local delivery of nitric oxide: Targeted delivery of therapeutics to bone and connective tissues," Adv. Drug Delivery Rev, 64(12):1177-1188, (2012).
Nordgard et al., "Alterations in Mucus Barrier Function and Matrix Structure Induced by Guluronate Oligomers," Biomacromolecules, 15:2294-2300, (2014).
Nordgard et al., "Oligosaccharides as Modulators of Rheology in Complex Mucous Systems," Biomacromolecules, 12(8):3084-3090, (2011).
O'Halloran, T.V. and Culotta, V.C., "Metallochaperones, an Intercellular Shuttle Service for Metal Ions," J Biol Chem., 275(33):25057-25060, (2000).
Johwada, Tomohiko, et al., "7-Azabicyclo [2.2. 1] heptane as a structural motif to block mutagenicity of nitrosamines," Bioorganic & Medicinal Chemistry, 19(8): 2726-2741, (2011).
Park et al., "Nitric oxide integrated polyethylenimine-based triblock copolymer for efficient antibacterial activity," Biomaterials, 34(34):8766-8775, (2013).
Park et al., "Polydopamine Hollow Nanoparticle Functionalized with N-diazeniumdiolates as a Nitric Oxide Delivery Carrier for Antibacterial Therapy," Adv. Healthcare Mater., 5(16):2019-2024, (2016).
Parzuchowski et al., "Synthesis and characterization of polymethacrylate-based nitric oxide donors," J. Am. Chem. Soc., 124(41):12182-12191, (2002).
Paster et al., "The breadth of bacterial diversity in the human periodontal pocket and other oral sites," Periodontology 2000, 42:80-87, (2006).
Paul et al., "Chitosan and Alginate Wound Dressings: A Short Review," Trends Biomater. Artif. Organs, 18(1):18-23, (2004).
Paula and Koo, "Nanosized building blocks for customizing novel antibiofilm approaches," J. Dent. Res., 96(2):128-136, (2017).
Petersen et al., "The global burden of oral diseases and risks to oral health," Bull. World Health Organ., 83(9):661-669, (2005).
Piras et al., "S-Nitroso-Beta-Cyclodextrins as New Bimodal Carriers: Preparation, Detailed Characterization, Nitric-Oxide Release, and Molecular Encapsulation," Chemistry—An Asian Journal, 8:2768-2778 (2013).
Polizzi et al., "Water-Soluble Nitric Oxide-Releasing Gold Nanoparticles," Langmuir, 23:4938-4943, (2007).
Prabaharan, M. et al., "Amphiphilic Multi-Arm-Block Copolymer Conjugated with Doxorubicin via pH-Sensitive Hydrazone Bond for Tumor-Targeted Drug Delivery," Biomaterials., 30(29):5757-5766, (2009).
Pritchard et al., "A New Class of Safe Oligosaccharide Polymer Therapy to Modify the Mucus Barrier of Chronic Respiratory Disease," Molecular Pharmaceutics, 13(3):863-872, (2016).
Privett et al., "Examination of Bacterial Resistance to Exogenous Nitric Oxide," Nitric Oxide, 26:169-173, (2012).
Privett, B. J., et al., "Synergy of nitric oxide and silver sulfadiazine against gram-negative, gram-positive, and antibiotic-resistant pathogens," Mol. Pharm., 7:2289-2296, (2010).
Product Overiew, "AR-501 (Gallium Citrate): Novel anti-infective for the growing problem of antibiotic resistance," Aridis Pharmaceuticals, (Last accessed Aug. 13, 2020), https://www.aridispharma.com/ar-501/.
Product Overview, "Ardis Pipeline: Blood Stream Infections : Product Candidates," Aridis Pharmaceuticals, (Last accessed Aug. 13, 2020), https://www.aridispharma.com/product-overview/.
Pubchem CID 6032, "Kanamycin A," PubChem, NCBI, pp. 1-9, (2005).
Radvar et al., "Comparison of 3 periodontal local antibiotic therapies in persistent periodontal pockets," J. Periodontol., 67(9):860-865, (1996).
Ragheb, M. N. et al. "Inhibiting the Evolution of Antibiotic Resistance," Mol. Cell, 73:157-165.e5, (2019).
Rees et al., "Role of endothelium-derived nitric oxide in the regulation of blood pressure," Proc. Natl. Acad. Sci., 86(9):3375-3378, (1989).
Reighard et al., "Disruption and eradication of *P. aeruginosa* biofilms using nitric oxide-releasing chitosan oligosaccharides," Biofouling, 31:775-787, (2015).
Reighard, K. P. & Schoenfisch, M. H., "Antibacterial action of nitric oxide-releasing chitosan oligosaccharides against Pseudomonas aeruginosa under aerobic and anaerobic conditions," Antimicrob. Agents Chemother., 59:6506-6513, (2015).
Riccio and Schoenfisch, "Nitric oxide release: part I. Macromolecular scaffolds," Chem. Soc. Rev., 41(10):3731-3741, (2012).
Riccio, D.A. et al., "Photoinitiated Nitric Oxide-Releasing Tertiary S-Nitrosothiol-Modified Xerogels," ACS Appl Mater Interfaces., 4(2):796-804, (2012).
Riccio, D.A. et al., "Stober Synthesis of Nitric Oxide-Releasing S-Nitrosothiol-Modified Silica Particles," Chem Mater., 23(7):1727-1735, (2011).
Robson, Martin C., "Wound Infection: A Failure of Wound Healing Caused by an Imbalance of Bacteria," Surgical Clinics of North America, 77(3):637-650, (1997).
Rouillard, K. R., et al., "Exogenous Nitric Oxide Improves Antibiotic Susceptibility in Resistant Bacteria," Research Presentation: Univ. of North of Carolina Chapel Hill, (2019).
Roy, B. et al., New Thionitrates: Synthesis, Stability, and Nitric Oxide Generation, J Org Chem., 59(23):7019-7026, (1994).
Safdar et al., "Targeted diazeniumdiolates: Localized nitric oxide release from glioma-specific peptides and proteins," Int. J. Pharm., 422(1-2):264-270, (2012).
Santajit, S. & Indrawattana, N., "Mechanisms of Antimicrobial Resistance in ESKAPE Pathogens," Biomed Res. Int., 2016:1-8, (2016).
Schaffer et al., "Nitric oxide regulates wound healing," J. Surg. Res., 63(1):237-240, (1996).
Schairer et al., "The potential of nitric oxide releasing therapies as antimicrobial agents," Virulence, 3:271-279, (2012).
Schomburg et al., "Preparation, Purification, and Analysis of Alkylated Cyclodextrins," J. High Res. Chromatog., 15:579-584, (1992).
Seabra, A.B. et al., "Antibacterial Nitric Oxide-Releasing Polyester for the Coating of Blood- Contacting Artificial Materials," Artif Organs, 34(7):E204-14, (2010).
Sen et al., "Periodontal Disease and Recurrent Vascular Events in Stroke/TIA Patients," J. Stroke Cerebrovasc Dis., 22(8):1420-1427, (2013).
Shah et al., "Synthesis of S-nitrosoglutathione-alginate for prolonged delivery of nitric oxide in intestines," Drug Deliv., 23(8):2927-2935, (2016).
Shin et al., "Inorganic/Organic Hybrid Silica Nanoparticles as a Nitric Oxide Delivery Scaffold," Chem. Mater., 20:239-249, (2008).
Shishido, S.M. and Oliveira, M.G., "Polyethylene Glycol Matrix Reduces the Rates of Photochemical and Thermal Release of Nitric Oxide from S-Nitroso-N-Acetylcysteine," Photochem Photobiol., 71(3):273-80, (2000).
Singh et al., "Biotechnological applications of cyclodextrins," Biotechnol. Adv., 20:341-359, (2002).
Singh, Simrat Pal, et al., "Rice Nicotianamine Synthase 2 expression improves dietary iron and zinc levels in wheat," Theoretical and Applied Genetics, 130(2): 283-292, (2017).

(56) References Cited

OTHER PUBLICATIONS

Slomberg, D.L. et al., "Role of Size and Shape on Biofilm Eradication for Nitric Oxide-releasing Silica," ACS Appl. Mater. Interfaces, 5(19):9322-9329, (2013).
Slots et al., "Antibiotics in periodontal therapy: advantages and disadvantages," J. Clin. Periodontol., 17(7 (Pt 2)):479-493, (1990).
Solleti et al., "Antimicrobial properties of liposomal azithromycin for Pseudomonas infections in cystic fibrosis patients," J Antibacrob Chemother, 70:784-796, (2015).
Soto et al., "Design Considerations for Silica-Particle-Doped Nitric-Oxide-Releasing Polyurethane Glucose Biosensor Membranes," ACS Sensors, 2(1):140-150, (2017).
Soto et al., "Functionalized Mesoporous Silica via an Aminosilane Surfactant Ion Exchange Reaction: Controlled Scaffold Design and Nitric Oxide Release," ACS Appl. Mater. Interfaces, 8(3):2220-2231, (2016).
Southerland et al., "Periodontitis and diabetes associations with measures of atherosclerosis and CHD," Atherosclerosis, 222(1):196-201, (2012).
Spellberg, B., et al., "The Epidemic of Antibiotic-Resistant Infections: A Call to Action for the Medical Community from the Infectious Diseases Society of America," Clin. Infect. Dis., 46:155-164, (2008).
Stasko and Schoenfisch, "Dendrimers as a Scaffold for Nitric Oxide Release," J. Am. Chem. Soc., 128(25):8265-8271, (2006).
Stasko et al., "Cytotoxicity of polypropylenimine dendrimer conjugates on cultured endothelial cells," Biomacromolecules, 8(12):3853-3859, (2007).
Stasko, N.A. et al., "S-Nitrosothiol-Modified Dendrimers as Nitric Oxide Delivery Vehicles," Biomacromolecules, 9(3):834-841, (2008).
Suchyta and Schoenfisch, "Controlled release of nitric oxide from liposomes," ACS Biomater. Sci. Eng., 3(9):2136-2143, (2017).
Sun et al., "Nitric Oxide-Releasing Dendrimers as Antibacterial Agents," Biomacromolecules, 13(10):3343-3354, (2012).
Tomalia et al., "A New Class of Polymers: Starburst-Dendritic," Polym. J, 17:117-132, (1985).
Valko, M. et al., "Metals, Toxicity and Oxidative Stress," Curr Med Chem., 12(10):1161-1208, (2005).
Van Strydonck et al., "Plaque inhibition of two commercially available chlorhexidine mouthrinses," J. Clin. Periodontol., 32(3):305-309, (2005).
Vizitiu et al., "Binding of phosphates to aminocyclodextrin biomimetics," J. Org. Chem., 64(17):6235-6238, (1999).
Voit and Lederer, "Hyperbranched and highly branched polymer architectures—synthetic strategies and major characterization aspects," Chem. Rev., 109(11):5924-5973, (2009).
Wan, A., et al., "Characterization of folate-graft-chitosan as a scaffold for nitric oxide release," International Journal of Biological Macromolecules, Elsevier B.V. 43:415-421, (2008).
Wan, A., et al., "Effects of Molecular Weight and Degree of Acetylation on the Release of Nitric Oxide from Chitosan-Nitric Oxide Adducts," Journal of Applied Polymer Science, Wiley Periodicals, Inc., 117:2183-2188, (2010).
Wang et al., "Synthesis and applications of stimuli-responsive hyperbranched polymers," Prog. Polym. Sci., 64:114-153, (2017).
Wang et al., "Synthesis and gene delivery of poly(amido amine)s with different branched architecture," Biomacromolecules, 11(2):489-495, (2010).
Wang et al., "Bioapplications of hyperbranched polymers," Chemical Society Reviews, 44(12):4023-4071, (2015).
Wang et al., "Synthesis and evaluation of phenylalanine-modified hyperbranched poly (amido amine) s as promising gene carriers," Biomacromolecules, 11(1):241-251, (2009).
Wang et al., "The effect of a branched architecture on the antimicrobial activity of poly(sulfone amines) and poly(sulfone amine)/silver nanocomposites" J. Mater. Chem., 22:15227-15234, (2012).
Wang, J. and Xu, Tongwen, "Facile Construction of Multivalent Targeted Drug Delivery System from Boltorn® Series Hyperbranched Aliphatic Polyester an Folic Acid," Poly Adv Technol., 22:763-767, (2009).
Williams, D.L.H., "S-Nitrosation and the Reactions of S-Nitroso Compounds," Chem Soc Rev., 14(2):171-196, (1985).
Williams, D.L.H., "The Chemistry of S-Nitrosothiols," Acc Chem Res., 32(10):869-876, (1999).
Wink et al., "DNA deaminating ability and genotoxicity of nitric oxide and its progenitors," Science, 254(5034):1001-1003, (1991).
Wo et al., "Recent advances in thromboresistant and antimicrobial polymers for biomedical applications: just say yes to nitric oxide (NO)," Biomater. Sci., 4(8):1161-1183, (2016).
Wold et al., "Fabrication of Biodegradable Polymeric Nanofibers with Covalently Attached NO Donors," ACS Appl. Mater. Interfaces, 4(6):3022-3030, (2012).
Worley et al., "Anti-Biofilm Efficacy of Dual-Action Nitric Oxide-Releasing Alkyl Chain Modified Poly(amidoamine) Dendrimers," Mol. Pharmaceutics, 12:1573-1583, (2015).
Worley et al., "Nitric Oxide-Releasing Quaternary Ammonium-Modified Poly(amidoamine) Dendrimers as Dual Action Antibacterial Agents," Bioconjugate Chem., 25(5):918-927, (2014).
Wu et al., "'Living' controlled in situ gelling systems: thiol-disulfide exchange method toward tailor-made biodegradable hydrogels," J. Am. Chem. Soc., 132(43):15140-15143, (2010).
Xiao, Y.L. et al., "Multifunctional Unimolecular Micelles for cancer—Targeted Drug Delivery and Positron Emission Tomography Imaging," Biomaterials, 33(11):3071-3082, (2012).
Xu et al., "Well-defined poly (2-hydroxyl-3-(2-hydroxyethylamino) propyl methacrylate) vectors with low toxicity and high gene transfection efficiency," Biomacromolecules, 11(6):1437-1442, (2010).
Yang et al., "S-Nitrosothiol-modified hyperbranched polyesters," Polym. Chem., 7(46):7161-7169, (2016).
Yapor, J.P. et al., "Biodegradable Citrate-Based Polyesters with S-Nitrosothiol Functional Groups for Nitric Oxide Release," J Mater Chem B., 3(48):9233-9241, (2015).
Žagar, E. and Žigon, M., "Aliphatic Hyperbranched Polyesters Based on 2,2-bis(methylol)propionic Acid—Determination of Structure, Solution and Bulk Properties," Prog Polymer Sci., 36(1):53-88, (2011).
Zambon, Joseph J., "Actinobacillus actinomycetemcomitans in human periodontal disease," Journal of Clinical Periodontology, 12(1):1-20, (1985).
Zamboulis et al: "Polyglycerol Hyperbranched Polyesters: Synthesis, Properties and Pharmaceutical and Biomedical Applications," International Journal of Molecular Sciences, 20(24):6210, (2019).
Zeng, X.H et al., "Endocytic Uptake and Intracellular Trafficking of Bis-MPA-Based Hyperbranched Copolymer Micelles in Breast Cancer Cells," Biomacromolecules, 13(11):3814- 3822, (2012).
Zhai, X et al., "Amphiphilic Dendritic Molecules: Hyperbranched Polyesters with Alkyl- Terminated Branches," Macromolecules, 36(9):3101-3110, (2003).
Zhang et al., "Nitric oxide-releasing fumed silica particles: synthesis, characterization, and biomedical application," J. Am. Chem. Soc., 125(17):5015-5024, (2003).
Zhang et al., "A physical gel made from hyperbranched polymer gelator," Chem. Commun., 25:2587-2589, (2007).
Zhang et al., "Antibacterial cotton fabric grafted with silver nanoparticles and its excellent laundering durability," Carbohydr. Polym., 92(2):2088-2094, (2013).
Zhang et al., "Synthesis of an amino-terminated hyperbranched polymer and its application in reactive dyeing on cotton as a salt-free dyeing auxiliary," Color. Technol., 123(6):351-357, (2007).
Zhang et al., "The antimicrobial activity of the cotton fabric grafted with an amino-terminated hyperbranched polymer," Cellulose, 16:281-288, (2009).
Zhang, H. et al., "Hyperbranched Polyester Hydrogels with Controlled Drug Release and Cell Adhesion Properties," Biomacromolecules, 14(5):1299-1310, (2013).
Zhang, X.F. et al., "Nitric Oxide Delivery by Core/Shell Superparamagnetic Nanoparticle Vehicles with Enhanced Biocompatibility," Langmuir., 28(35):12879-12885, (2012).
Zheng et al., "Hyperbranched polymers: Advances from synthesis to applications," Chemical Society Reviews, 44(12):4091-4130, (2015).
Zhong, Yong-Li, et al., "Scalable Synthesis of Diazeniumdiolates: Application to the Preparation of MK-8150," Organic letters, 21(11):4210-4214, (2019).

(56) References Cited

OTHER PUBLICATIONS

Zhou et al., "Water-soluble poly (ethylenimine)-based nitric oxide donors: preparation, characterization, and potential application in hemodialysis," Biomacromolecules, 7(9):2565-2574, (2006).
Zhu et al., "Influence of Branching Architecture on Polymer Properties," Journal of Polymer Science Part B: Polymer Physics, 49(18):1277-1286, (2011).
European Application No. 18775628.3, Extended European Search Report mailed Sep. 28, 2020.
European Application No. 18812540.5, Communication pursuant to Rules 161(1) and 162 EPC, dated Jul. 8, 2020.
European Search Report and Search Opinon mailed on Aug. 3, 2020 by the European Search Authority for EP Application No. 18736471.6 (8 pages).
European Search Report mailed on May 4, 2020 by the European Search Authority for EP Application No. 17859196.2 (32 pages).
Supplementary European Search Report mailed Feb. 5, 2016 in EP Application No. 13829755.1.
U.S. Appl. No. 16/459,015, Requirement for Restriction/Election mailed Oct. 9, 2019.
WIPO Application No. PCT/IB2018/050051, PCT International Search Report and Written Opinion of the International Searching Authority mailed Jun. 8, 2018.
WIPO Application No. PCT/IB2018/052144, PCT International Search Report and Written Opinion of the International Searching Authority mailed Aug. 8, 2018.
WIPO Application No. PCT/US2013/055360, PCT International Search Report and Written Opinion of the International Searching Authority mailed Dec. 23, 2013.
WIPO Application No. PCT/US2017/055371, PCT International Preliminary Report on Patentability mailed Apr. 9, 2019.
WIPO Application No. PCT/US2017/055371, PCT International Search Report and Written Opinion of the International Searching Authority mailed Dec. 28, 2017.
WIPO Application No. PCT/US2018/061061, PCT International Search Report and Written Opinion of the International Searching Authority mailed Apr. 5, 2019.
WIPO Application No. PCT/US2019/021051, PCT International Search Report and Written Opinion of the International Searching Authority mailed Jun. 21, 2019.
WIPO Application No. PCT/US2019/068412, PCT International Search Report and Written Opinion of the International Searching Authority mailed May 21, 2020.
Smith et al., "Nitric Oxide-Releasing Polymers Containing the AN(O)NoU-Group," Journal of Medicinal Chemistry, 39:1148-1157, (Jan. 1996).
Australian Application 2018205823, Examination Report No. 1 for standard patent application mailed Sep. 15, 2021.
EP Application No. 18812540.5, Communication Pursuant to Article 94(3) mailed Oct. 14, 2021.
EP Application No. 19763961.0, Extended European Search Report mailed Nov. 19, 2021.
JP Application No. 2019-556425, Notice of Reasons for Refusal mailed Oct. 26, 2021.

FIG. 11a
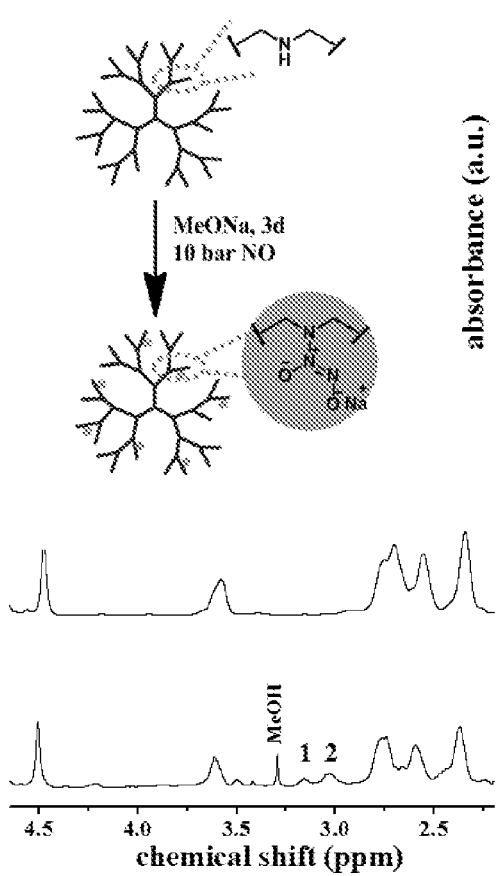
FIG. 11b
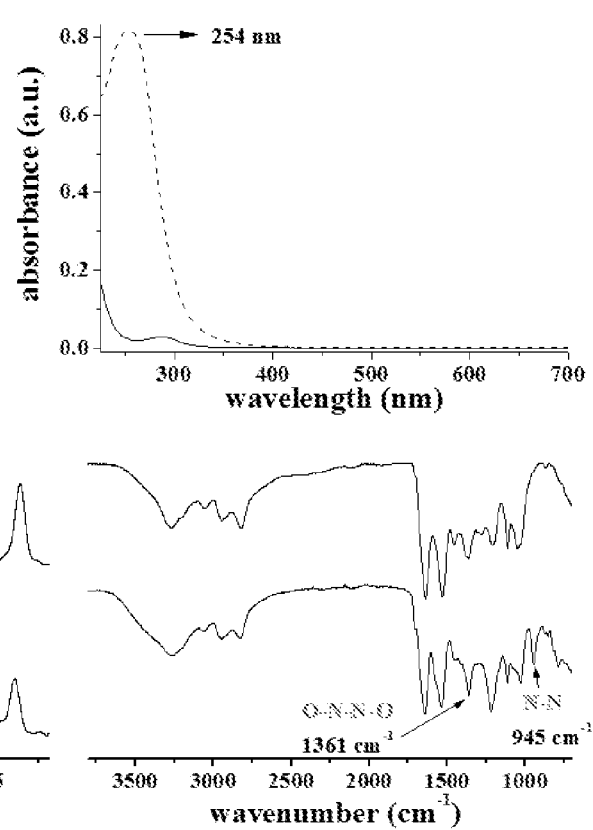
FIG. 11c
FIG. 11d

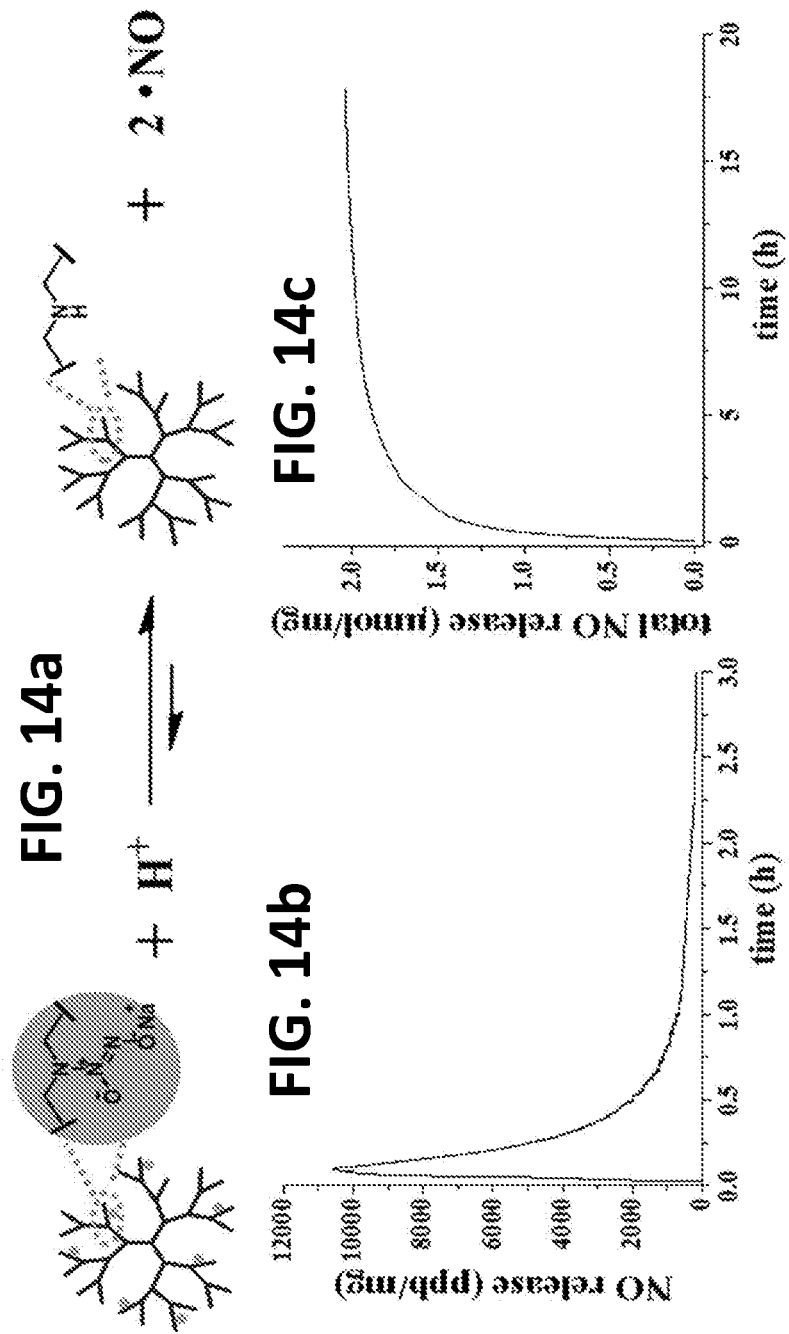

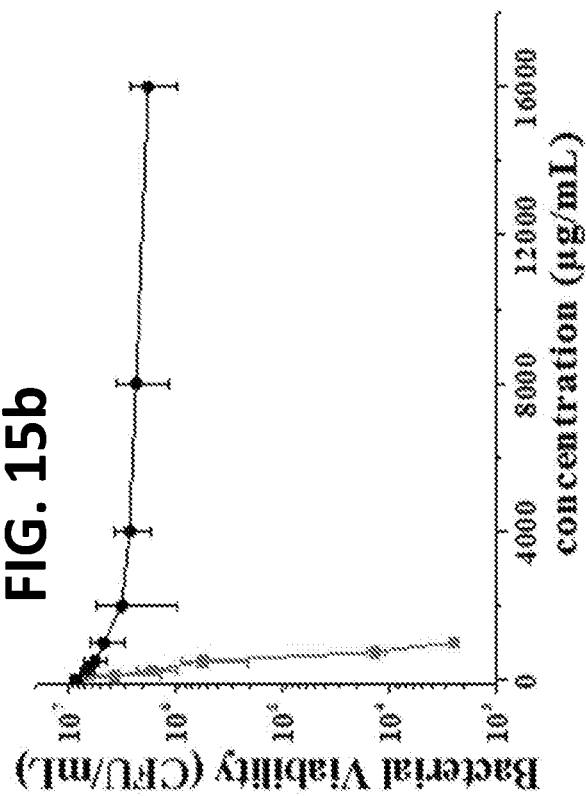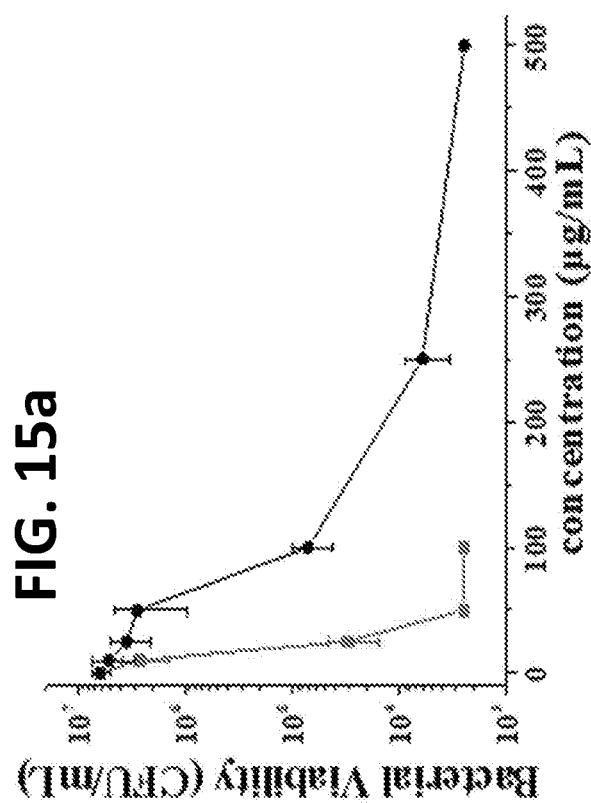

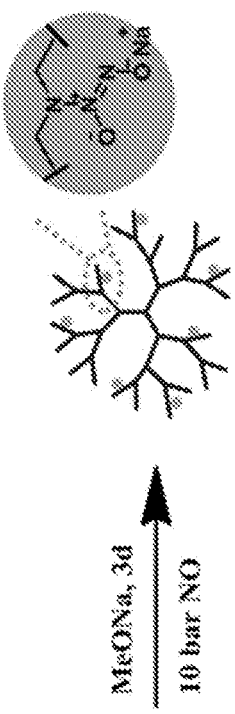
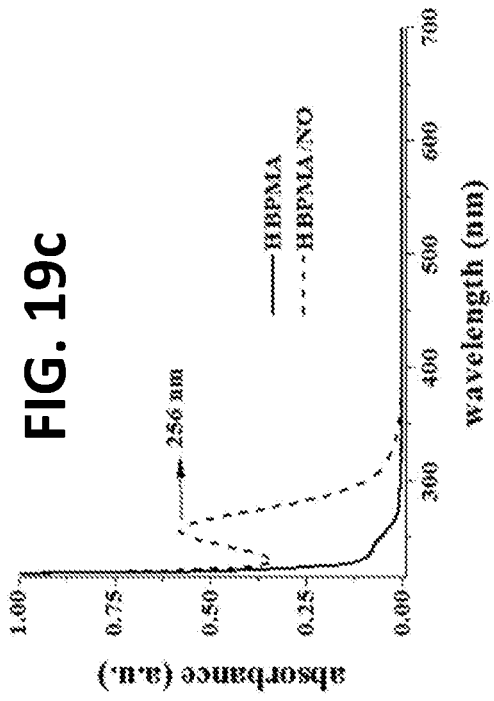
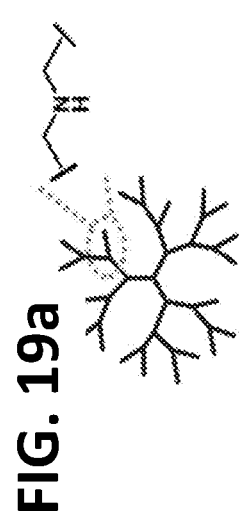
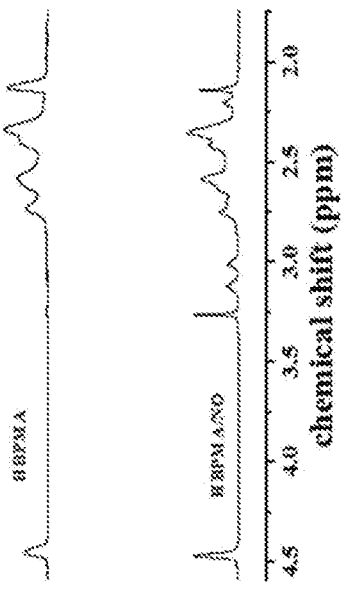
FIG. 19a
FIG. 19b
FIG. 19c

NITRIC OXIDE-RELEASING HYPERBRANCHED COMPOUNDS AS ANTIBACTERIAL SCAFFOLDS AND METHODS PERTAINING THERETO

CROSS-REFERENCE TO RELATED PATENT APPLICATIONS

This application is a national stage application filed under 35 U.S.C. § 371 of International Application No. PCT/US2018/061061 with an international filing date of Nov. 14, 2018, which claims the benefit of and priority to U.S. Provisional Patent Application Nos. 62/586,404, filed on Nov. 15, 2017, and 62/737,603, filed on Sep. 27, 2018, the entire contents of each of which are incorporated herein by reference.

GOVERNMENT SUPPORT

This invention was made with government support under Grant No. DE025207 awarded by The National Institutes of Health. The Government has certain rights in the invention.

FIELD

The presently disclosed subject matter relates generally to nitric oxide-releasing hyperbranched structures having units that store and/or release nitric oxide in a controlled manner. Additionally disclosed are methods of synthesis of the same and the use of the same as antibacterial agents in methods.

BACKGROUND

Bacterial infections pose a great challenge to human health in community and hospital settings. Biofilms are cooperative communities of bacteria encapsulated by an exopolysaccharide (EPS) matrix protecting the bacteria from host immune response and antibiotics.

SUMMARY

Nitric oxide (NO) plays a variety of physiological roles as a signaling molecule and, as disclosed herein, can also play significant roles in treating or ameliorating pathophysiology, for example as a therapeutic agent. NO as a therapeutic has heretofore been underused, based at least in part on limited NO payloads of therapeutic compositions, NO release rates that are more rapid than desired, and the lack of targeted NO delivery. Provided herein are hyperbranched NO-releasing constructs, methods of producing such constructs, and methods of treating various pathophysiologies using such constructs that leverage the enhanced NO-release characteristics and harness the abundant potential of NO-releasing pharmacological compounds. In particular, provided herein are compounds that are highly efficacious as antimicrobials.

For example, in several embodiments there is provided one or more hyperbranched compounds that release NO and exhibit potent antimicrobial characteristics. In several embodiments, the hyperbranched compound is a functionalized hyperbranched poly(amidoamine) (PAMAM). In some embodiments, a hyperbranched poly(amidoamine) is a structure provided in a single step where acrylates and amine containing starting materials are mixed to provide a structure comprising amide bonds (e.g., through the reaction of an amine starting material with an ester or carboxylate of an acrylate), secondary amine bonds (e.g., through the reaction of a starting material amine with an acrylate via Michael Addition), and/or tertiary amine bonds (e.g., through the reaction of a starting material amine with multiple acrylates via Michael Addition). In several embodiments, the hyperbranched compound is a functionalized hyperbranched hydroxyl-terminated poly(amidoamine).

In several embodiments, at least a secondary amine of the hyperbranched compound comprises a NO donor. In several embodiments, at least a secondary amine of the hyperbranched compound comprises a N-diazeniumdiolate-based NO donor. In several embodiments, the hyperbranched construct comprises an amine-containing group covalently bonded to a NO donor. In some embodiments, the NO donor of the hyperbranched construct generates NO and induces damage to the membrane and/or DNA of the microbes, thereby reducing the number of viable microbes.

Some embodiments pertain to a method of decreasing microbial contamination. In some embodiments of the method, the method comprises contacting a surface contaminated with a plurality of microbes with a compound comprising a NO-releasing hyperbranched compound. In some embodiments of the method, the NO-donor generates NO and induces damage to the membrane and/or DNA of the microbes, thereby reducing the number of viable microbes. In several embodiments, the surface comprises an organic surface. In some embodiments of the method, the surface is human skin or animal skin. In some embodiments of the method, the surface is in the mouth, or surrounding tissues (e.g., lips, nasal nares, teeth, gums, etc.). In several embodiments, the surface comprises the oral mucosa. Advantageously, in some embodiments of the method, the application step does not induce skin or tissue irritation. In some embodiments, the plurality of microbes comprises one or more viruses, gram positive bacteria, gram negative bacteria, drug resistant bacteria, molds, yeasts, fungi, and combinations thereof.

In several embodiments, the hyperbranched NO donating compound is a hyperbranched PAMAM. In several embodiments, the hyperbranched NO donating compound comprises one or more linking groups. In several embodiments, the linking group comprises any one or more of Formulae A, B, C, or D:

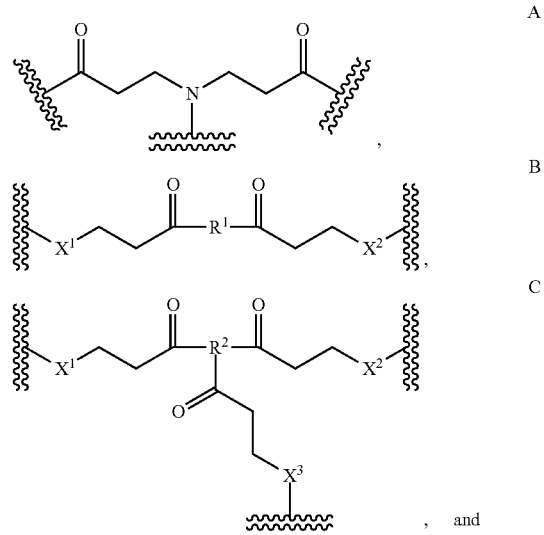

-continued

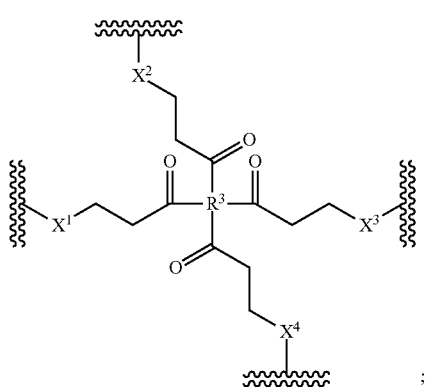

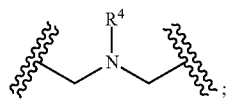

wherein $R^4$ is —$N^+$(=N—$O^-$)$O^-$.

In several embodiments, the linking group comprises Formula A. In several embodiments, the linking group comprises Formula B wherein: $R^1$ is as disclosed elsewhere herein and/or is —$R_bN(R_c)R_a$—$(N(R_c))$—$R_b$—; n is as disclosed elsewhere herein and/or is 1; $R_a$ is as disclosed elsewhere herein and/or is —$CH_2$—; $R_b$ is as disclosed elsewhere herein and/or is a single bond; and each $R_c$ is as disclosed elsewhere herein and/or is H.

In several embodiments, the linking group of Formula B is represented by the following structure:

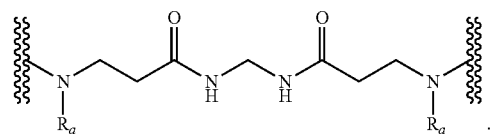

In several embodiments, each instance of $R_a$ is the NO donating moiety or —H.

In several embodiments, the linking group of Formula A is represented by the following structure:

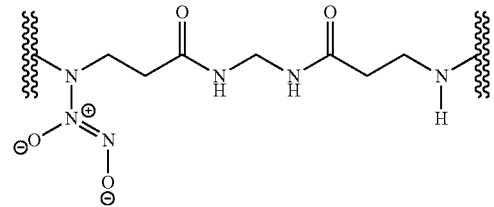

In several embodiments, "〰" indicates an attachment to another portion of the hyperbranched NO donating compound. In several embodiments, $X^1$, $X^2$, $X^3$, and $X^4$ are independently selected from the group consisting of —NH—, —N($R_a$)—, —O—, and —S—. In several embodiments, each instance of $R_a$ is selected from a NO donating moiety, —H, an optionally substituted $C_1$-$C_6$ alkyl group, or an optionally substituted polyether having 1 to 6 repeat units. In several embodiments, $R^1$, $R^2$, and $R^3$ are independently selected from the group consisting of —$R_bN(R_c)R_a$—$(N(R_c))_n$—$R_b$—, —$R_b(OR_d)O$—$R_b$—, and $C_1$-$C_6$ alkyl. In several embodiments, each instance of $R_c$ is independently selected from a NO donating moiety, —H, an optionally substituted $C_1$-$C_6$ alkyl group, or an optionally substituted polyether having 1 to 6 repeat units. In several embodiments, $R_b$ is a single bond or an optionally substituted $C_1$-$C_6$ alkylene group. In several embodiments, $R_d$ is an optionally substituted $C_1$-$C_6$ alkylene group. In several embodiments, n is an integer selected from 0, 1, 2, 3, 4, 5, or 6. In several embodiments, where $R^2$ is present, at least one instance of R comprises the —C(O)—$(CH_2)_2$—$X^3$— group. In several embodiments, where $R^3$ is present, at least one instance of R comprises the —C(O)—$(CH_2)_2$—$X^3$— group and at least one instance of $R_d$ comprises the —C(O)—$(CH_2)_2$—$X^4$— group. In several embodiments, the hyperbranched compound comprises at least one of the following NO donating moieties:

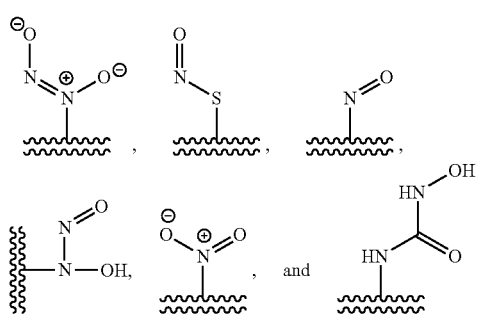

In several embodiments, the hyperbranched compound does not comprise an aminoglycoside or glycoside unit.

In several embodiments, the hyperbranched NO donating compound comprises at least one instance of the following structure:

In several embodiments, the hyperbranched NO donating compound further comprises an end group selected from the group consisting of:

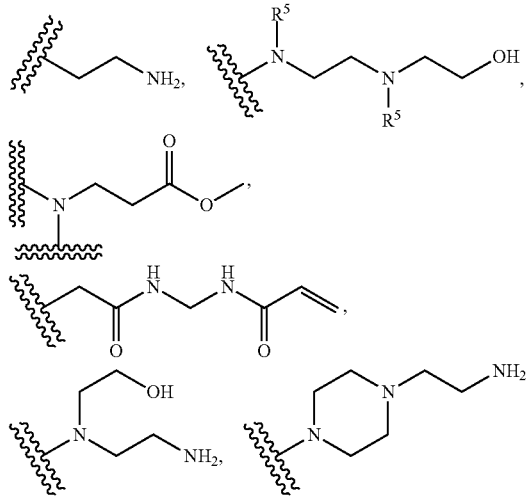

-continued

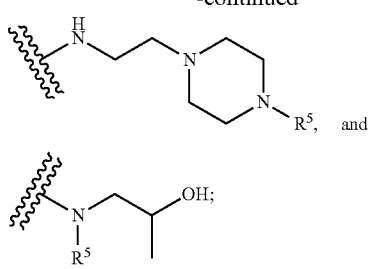

wherein each instance of R⁵ is H or —N⁺(=N—O⁻)O⁻.

In several embodiments, the hyperbranched NO donating compound further comprises an end group selected from the group consisting of:

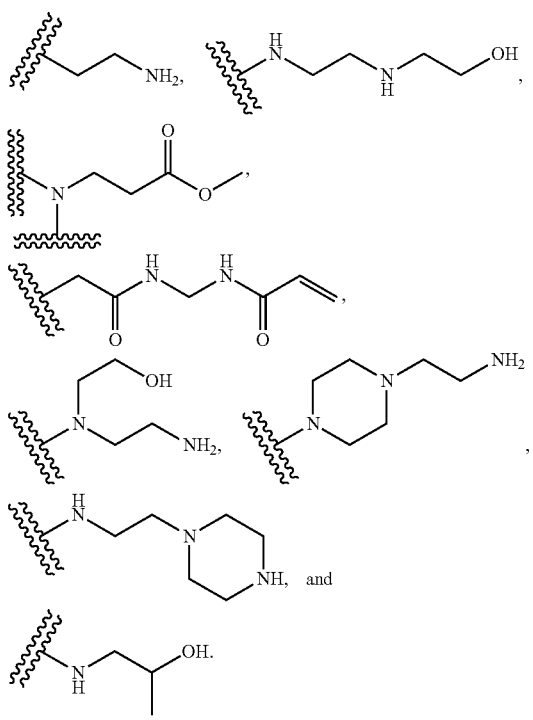

In several embodiments, the hyperbranched NO donating compound further comprises one or more of the following groups:

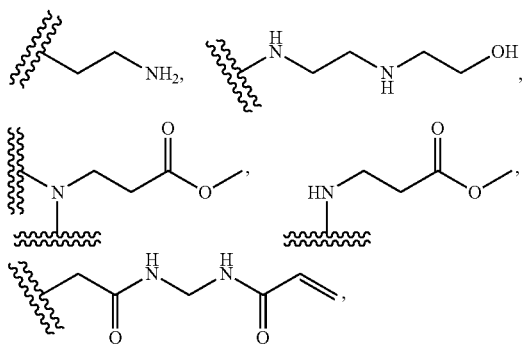

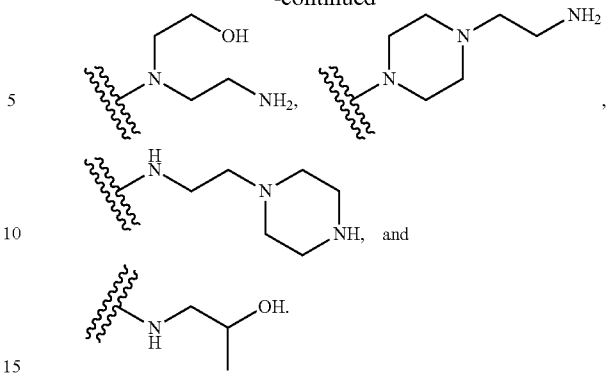

In several embodiments, the hyperbranched structure lacks a dendritic core having any symmetric dendrons.

In several embodiments, each instance of an optional substitution is selected from $C_1$-$C_6$ alkyl or —OH.

Several embodiments pertain to a hyperbranched nitric oxide (NO) donating compound, comprising:
a linking group of Formula A or Formula B:

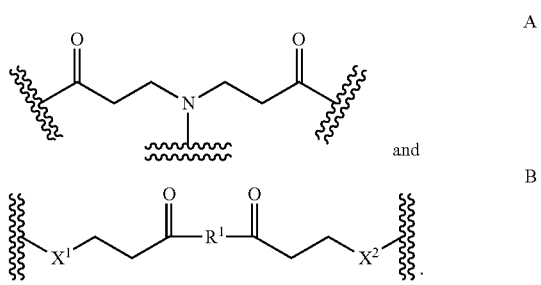

In several embodiments, "⁓" indicates an attachment to another portion of the hyperbranched NO donating compound.

In several embodiments, $X^1$ and $X^2$ are as disclosed elsewhere herein and/or are independently selected from the group consisting of —NH—, —N($R_a$)—, —O—, and —S—.

In several embodiments, each instance of $R_a$ is as disclosed elsewhere herein and/or is selected from a NO donating moiety or —H.

In several embodiments, $R^1$ is as disclosed elsewhere herein and/or is independently selected from the group consisting of —N($R_c$)$R_a$—N($R_c$)—, —$R_b$(O$R_d$—)$_n$O—$R_b$—, and $C_1$-$C_6$ alkyl.

In several embodiments, each instance of $R_c$ is as disclosed elsewhere herein and/or is independently selected from a NO donating moiety or —H, an optionally substituted $C_1$-$C_6$ alkyl group, or an optionally substituted polyether having 1 to 6 repeat units.

In several embodiments, $R_b$ is as disclosed elsewhere herein and/or is a single bond or an optionally substituted $C_1$-$C_6$ alkylene group.

In several embodiments, $R_d$ is as disclosed elsewhere herein and/or is —$CH_2$— or —$CH_2$—$CH_2$—.

In several embodiments, n is as disclosed elsewhere herein and/or is an integer selected from 0, 1, 2, 3, 4, 5, or 6.

In several embodiments, the hyperbranched compound comprises at least one of the following NO donating moieties:

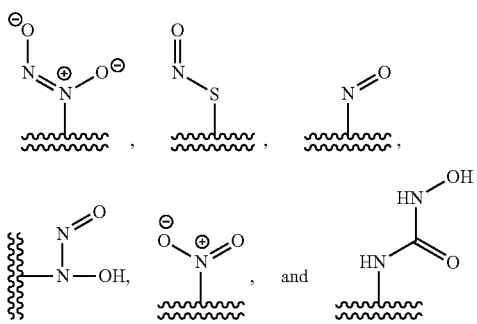

In several embodiments, the hyperbranched NO donating compound further comprises at least one instance of the following structure:

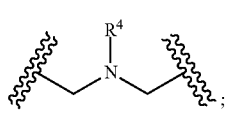

In several embodiments, $R^4$ is $-N^+(=N-O^-)O^-$.

In several embodiments, the hyperbranched NO donating compound comprises Formula A.

In several embodiments, the hyperbranched NO donating compound comprises Formula B wherein: $R^1$ is as disclosed elsewhere herein and/or is $-N(R_c)R_a-N(R_c)-$; $R_d$ is as disclosed elsewhere herein and/or is $-CH_2-$; and each $R_c$ is as disclosed elsewhere herein and/or is H.

In several embodiments, the hyperbranched NO donating compound further comprises a linking group represented by the following structure:

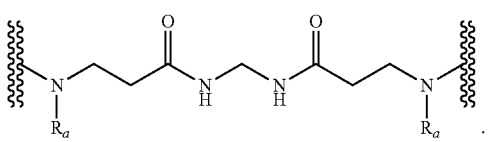

In several embodiments, each instance of $R_a$ is the NO donating moiety or $-H$.

In several embodiments, the linking group comprises Formula A and is represented by the following structure:

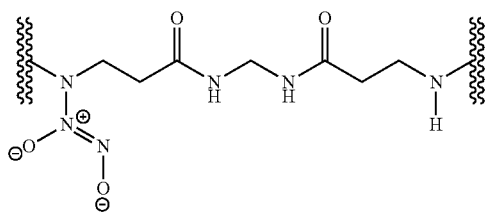

In several embodiments, the hyperbranched NO donating compound further comprises an end group selected from the group consisting of:

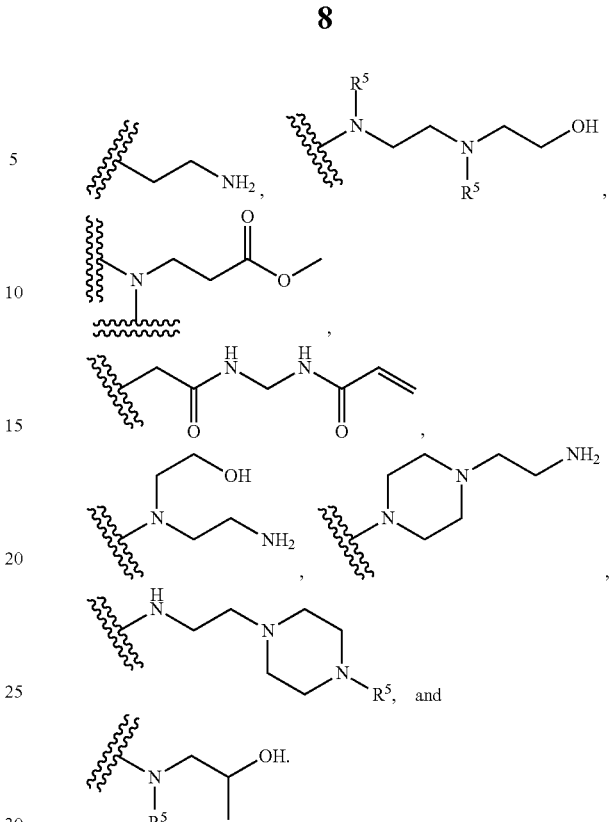

In several embodiments, each instance of $R^5$ is H or $-N^+(=N-O^-)O^-$.

In several embodiments, the hyperbranched NO donating compound further comprises an end group selected from the group consisting of:

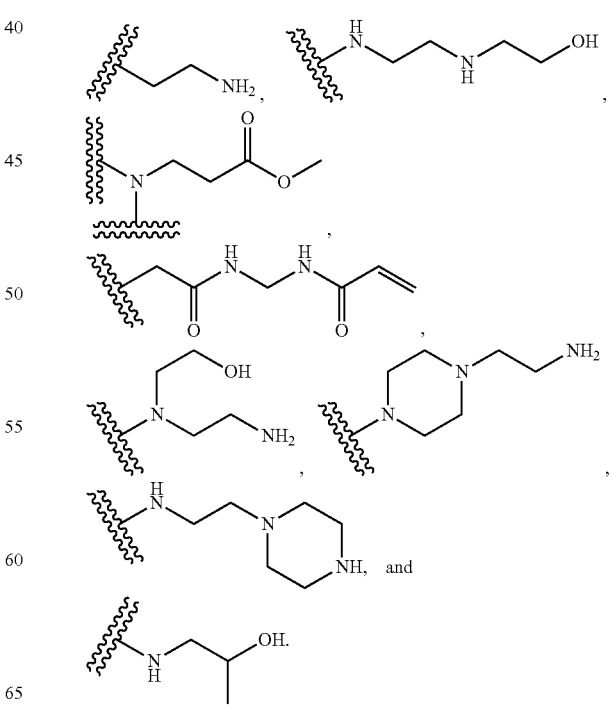

In several embodiments, the hyperbranched NO donating compound further comprises one or more of the following groups:

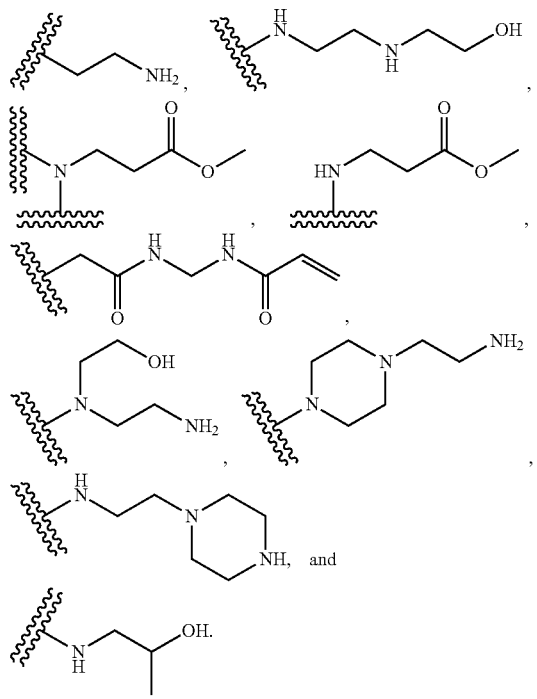

In several embodiments, the hyperbranched NO donating compound lacks a dendritic core having any symmetric dendrons.

In several embodiments, the hyperbranched NO donating compound does not comprise an aminoglycoside or glycoside unit In several embodiments, each instance of an optional substitution is selected from $C_1$-$C_6$ alkyl or —OH or is as disclosed elsewhere herein.

In several embodiments, the hyperbranched NO donating compound includes a dendritic unit, a linear unit, and/or a terminal unit, the dendritic unit comprising a tertiary amine, the linear unit comprising a secondary amine, and the terminal unit comprising a primary amine.

In several embodiments, the hyperbranched NO donating compound N-diazeniumdiolate exhibits intramolecular hydrogen bonding with the primary amine of the terminal unit. In several embodiments, a portion of the amines modified by the N-diazeniumdiolate moieties are secondary amines.

In several embodiments, the hyperbranched NO donating compound comprises at least about 2% by weight NO. In several embodiments, the hyperbranched NO donating compound comprises at least about 1 µmol of NO per mg of the compound as measured by real-time NO release in PBS (10 mM, pH 7.4, 37° C.). In several embodiments, the hyperbranched NO donating compound comprises at least about 2 µmol of NO per mg of the compound as measured by real-time NO release in PBS (10 mM, pH 7.4, 37° C.). In several embodiments, the hyperbranched NO donating compound comprises greater than about 2 µmol of NO per mg of the copolymer as measured by real-time NO release in PBS (10 mM, pH 7.4, 37° C.).

In several embodiments, the hyperbranched NO donating compound comprises hydroxy moieties. In several embodiments, the hydroxy moieties are linked to amine moieties through alkyl moieties such that the amine moieties are secondary amines.

In several embodiments, the hyperbranched compound has a weight-average molecular weight (MW) of between about $2\times10^3$ g mol$^{-1}$ and about $15\times10^3$ g mol$^{-1}$ as determined through size exclusion chromatography with a multi-angle light scattering (SEC-MALS) detector. In several embodiments, the hyperbranched compound has a weight-average molecular weight (MW) of between about $3\times10^3$ g mol$^{-1}$ and about $10\times10^3$ g mol$^{-1}$ as determined through size exclusion chromatography with a multi-angle light scattering (SEC-MALS) detector. In several embodiments, the hyperbranched compound has a weight-average molecular weight (MW) of between about $3\times10^3$ g mol$^{-1}$ and about $6\times10^3$ g mol$^{-1}$ as determined through size exclusion chromatography with a multi-angle light scattering (SEC-MALS) detector.

Several embodiments pertain to a method for preparing the hyperbranched NO donating compound as disclosed herein. In several embodiments, an acrylate is contacted with a nucleophilic agent to form a hyperbranched compound.

In several embodiments, the acrylate is a monoacrylate, a diacrylate, a triacrylate, or a tetraacrylate. In several embodiments, the nucleophilic agent is a bifunctional, trifunctional, or tetrafunctional molecule. In several embodiments, the nucleophilic agent comprises H—$R_h$N($R_e$)$R_f$—(N($R_e$))$_n$ ($R_g$O—)$_m$$R_h$—H, wherein each instance of $R_e$ is independently —H, an optionally substituted $C_1$-$C_6$ alkyl group, an optionally substituted polyether having 1 to 6 repeat units and/or is optionally substituted as disclosed elsewhere herein. In several embodiments, each instance of $R_h$ is a single bond or an optionally substituted $C_1$-$C_6$ alkylene group. In several embodiments, $R_f$ and $R_g$ are independently optionally substituted $C_1$-$C_6$ alkylene groups. In several embodiments, the nucleophilic agent comprises one or more of $H_2N$—$((CH_2)_aNH)_b$—H, $H_2N$—$((CH_2)_aNH)_b$—$(CH_2)_c$H, $H_2N$—$((CH_2)_aX^5)_b$—$(CH_2)_c$H, and $HX^5$—$((CH_2)_aX^6)_b$ $((CH_2)_cX^7)_d$—$(CH_2)_e$H. In several embodiments, each instance of a, b, c, d, or e is independently selected from an integer from 0 to 10. In several embodiments, each instance of $X^5$, $X^6$, and $X^7$ is independently selected from O, S, or NH.

In several embodiments, the nucleophilic agent comprises one or more of $H_2NCH_2CH_2NHCH_2CH_2NH_2$, $H_2NCH_2CH_2NHCH_2CH_2OH$, and

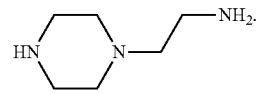

In several embodiments, the acrylate comprises one or more of N,N'-methylene bis(acrylamide), ethylene glycol diacrylate, propane diol diacrylate, butandiol diacrylate, trimethylolpropane triacrylate, pentaerythritol triacrylate, pentaerythritol triacrylate, glycerol propoxylate (1PO/OH) triacrylate, or trimethylolpropane propoxylate triacrylate.

In several embodiments, the acrylate comprises one or more of the following structures:

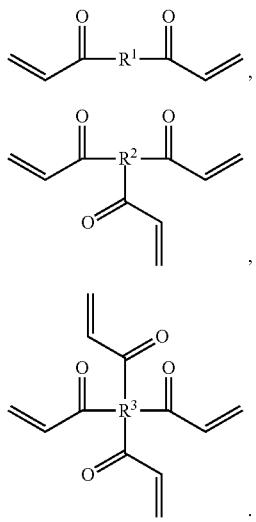

In several embodiments, $R^1$, $R^2$, and $R^3$ are independently selected from the group consisting of —$R_b$N($R_c$)$R_a$—(N($R_c$))$_n$—$R_b$—, —$R_b$(O$R_d$—)$_n$O—$R_b$—, and $C_1$-$C_6$ alkyl. In several embodiments, each instance of $R_c$ is independently selected from a NO donating moiety, —H, an optionally substituted $C_1$-$C_6$ alkyl group, or an optionally substituted polyether having 1 to 6 repeat units. In several embodiments, $R_b$ is a single bond or an optionally substituted $C_1$-$C_6$ alkylene group. In several embodiments, $R_d$ is an optionally substituted $C_1$-$C_6$ alkylene group. In several embodiments, n is an integer selected from 0, 1, 2, 3, 4, 5, or 6. In several embodiments, where $R^2$ is present, at least one instance of R comprises the —C(O)—CH=$CH_2$ group. In several embodiments, where $R^3$ is present, at least one instance of carbon of R comprises the —C(O)—CH=$CH_2$ groups. In several embodiments, the acrylate is N,N'-methylenebis(acrylamide).

In several embodiments, the hyperbranched compound is exposed to a NO source to provide the hyperbranched NO donating compound. In several embodiments, the NO exposing step is carried out in alkaline conditions.

In several embodiments, a molar ratio of the nucleophile to acrylate of between about 2:1 and about 5:1 is used. In several embodiments, a molar ratio of the amine to acrylate of between about 3:1 and about 4:1 is used.

Several embodiments pertain to a method of decreasing microbial contamination. In several embodiments, a surface contaminated with a plurality of microbes is contacted with a hyperbranched NO donating compound as disclosed herein. In several embodiments, the NO donor generates nitric oxide and induces damage to the membrane and/or DNA of the microbes, thereby reducing the number of viable microbes.

In several embodiments, the plurality of microbes comprises one or more of viruses, gram positive bacteria, gram negative bacteria, drug resistant bacteria, molds, yeasts, fungi, and combinations thereof.

In several embodiments, the surface is an organic surface. In several embodiments, the surface is human skin or animal skin. In several embodiments, the surface is in the mouth. In several embodiments, the application does not induce skin irritation.

In several embodiments, the surface an inorganic surface. In several embodiments, the inorganic surface is an external or internal surface of a medical device. In several embodiments, the device is a dental device.

In several embodiments, the microbial load comprises drug-resistant bacteria. In several embodiments, the microbial load comprises one or more dental pathogens. In several embodiments, the microbial load comprises one or more of P. aeruginosa, S. aureus P. gingivalis, A. actinomycetemcomitans, A. viscosus, and/or S. mutans.

Several embodiments pertain to a method of treating and/or preventing dental caries. In several embodiments, a surface of a patient's mouth that is contaminated with one or more dental pathogens is contacted with a hyperbranched NO donating compound as disclosed elsewhere herein. In several embodiments, the hyperbranched NO donating compound generates nitric oxide and induces damage to the membrane and/or DNA of the pathogens, thereby reducing the number of viable pathogens. In several embodiments, the microbial load comprises one or more of P. aeruginosa, S. aureus P. gingivalis, A. actinomycetemcomitans, A. viscosus, and/or S. mutans.

Several embodiments pertain to a use of a hyperbranched NO donating compound as disclosed elsewhere herein in the preparation of a medicament for decreasing microbial contamination. In several embodiments, the hyperbranched NO donating compound generates nitric oxide and induces damage to the membrane and/or DNA of the microbes, thereby reducing the number of viable microbes. In several embodiments, the compound is formulated to treat a plurality of microbes comprising one or more of viruses, gram positive bacteria, gram negative bacteria, drug resistant bacteria, molds, yeasts, fungi, and combinations thereof.

In several embodiments, the compound is formulated to be delivered to an organic surface. In several embodiments, the compound is formulated to be delivered to human skin or animal skin. In several embodiments, the surface is in the mouth. In several embodiments, the compound is formulated to be delivered to an inorganic surface. In several embodiments, the surface is an external or internal surface of a medical device. In several embodiments, the device is a dental device.

Some embodiments pertain to a polyamidoamine PAMAM composition, comprising a hyperbranched copolymer of an amine and an acrylate, wherein at least a portion of the amines are modified with N-diazeniumdiolate moieties. In several embodiments, the hyperbranched copolymer includes a dendritic unit, a linear unit, and a terminal unit, the dendritic unit comprising a tertiary amine, the linear unit comprising a secondary amine, and the terminal unit comprising a primary amine.

In several embodiments, the N-diazeniumdiolate exhibits intramolecular hydrogen bonding with the primary amine of the terminal unit. In several embodiments, the portion of the amines modified by the N-diazeniumdiolate moieties are secondary amines.

In several embodiments, the amine is derived from a polyfunctional amine monomer having the following structure: $H_2N$-$A_1$-(NH)-$A_2$-$NH_2$. In several embodiments, $A_1$ and $A_2$ are independently selected from alkyl moieties or hydrogen. In several embodiments, the acrylate is derived from the following monomer:

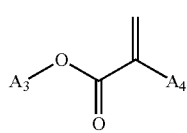

wherein $A_3$ and $A_4$ are independently selected from alkyl moieties or hydrogen.

In several embodiments, the composition comprises at least about 2% by weight NO. In several embodiments, composition comprises at least about 1 µmol of NO per mg of the copolymer as measured by real-time NO release in PBS (10 mM, pH 7.4, 37° C.). In several embodiments, composition comprises at least about 2 µmol of NO per mg of the copolymer as measured by real-time NO release in PBS (10 mM, pH 7.4, 37° C.). In several embodiments, the composition comprises greater than about 2 µmol of NO per mg of the copolymer as measured by real-time NO release in PBS (10 mM, pH 7.4, 37° C.).

In several embodiments, the co-polymer further includes hydroxy moieties. In several embodiments, the hydroxy moieties are linked to amine moieties through alkyl moieties such that the amine moieties are secondary amines.

In several embodiments, a molar ratio of the amine to acrylate is between about 2:1 and about 5:1. In several embodiments, a molar ratio of the amine to acrylate is between about 3:1 and about 4:1.

In several embodiments, the hyperbranched copolymer has a weight-average molecular weight (MW) of between about $2 \times 10^3$ g mol$^{-1}$ and about $15 \times 10^3$ g mol$^{-1}$ as determined through size exclusion chromatography with a multi-angle light scattering (SEC-MALS) detector. In several embodiments, the hyperbranched copolymer has a weight-average molecular weight (MW) of between about $3 \times 10^3$ g mol$^{-1}$ and about $10 \times 10^3$ g mol$^{-1}$ as determined through size exclusion chromatography with a multi-angle light scattering (SEC-MALS) detector. In several embodiments, the hyperbranched copolymer has a weight-average molecular weight (MW) of between about $3 \times 10^3$ g mol$^{-1}$ and about $6 \times 10^3$ g mol$^{-1}$ as determined through size exclusion chromatography with a multi-angle light scattering (SEC-MALS) detector.

In several embodiments, the hyperbranched co-polymer of a polyfunctional amine and an acrylate is soluble in water at a level greater than about 1 mg/mL, about 10 mg/mL, about 20 mg/mL, about 50 mg/mL or about 100 mg/mL. In several embodiments, the acrylate is derived from a monomer selected from the salt, ester, and conjugate bases of acrylic acid and its derivatives. In several embodiments, the acrylate is derived from a monomeric methacrylate. In several embodiments, the acrylate is derived from a monomer selected from the group consisting of a methyl acrylate, ethyl acrylate, methyl methacrylate, acrylamide, ethyl methacrylate, 2-chloroethyl vinyl ether, 2-ethylehexyl acrylate, hydroxyethyl methacrylate, hydroxethyl acrylate, butyl acrylate, butyl methacrylate, N-(2-hydroxypropyl)methacrylamide, N-(3-Aminopropyl)methacrylamide hydrochloride, N-(3-BOC-aminopropyl)methacrylamide, 2-Aminoethyl methacrylate hydrochloride, 2-(tert-Butylamino)ethyl methacrylate, n-iso-propylacrylamide, 2-methoxyethyl acrylate, n-ethylmethacrylamide, n-vinyl acetamide, 2-N-morpholinoethyl acrylate, methacryloyl-L-Lysine, 2-(methylamino) ethyl acrylate, and 2-(methylamino)ethyl methacrylate. In several embodiments, the acrylate is derived from a diacrylate. In several embodiments, diacrylate is selected from the group consisting of ethylene glycol diacrylate, triethylene glycol diacrylate, tetraethylene glycol diacrylate, polyethylene glycol diacrylate, tricyclodecan dimethanol diacrylate, N-acryloxysuccinimide, N-(2-hydroxypropyl)methacrylamide, Bis[2-(methacryloyloxy)ethyl] phosphate, diacrylamide, and N,N'-methylenebisacrylamide.

In several embodiments, the amine is derived from diethylenetriamine. In several embodiments, the amine is derived from a monomer selected from the group consisting of ethylenediamine, diethylenetriamine, triethylenetetramine, tetraethylenepentamine, pentaethylenehexamine, polyetheramine, and bis(hexamethylene)triamine. In several embodiments, the hyperbranched co-polymer, upon release of NO, exhibits characteristics consistent with the following: $^1$H NMR: (400 MHz, CD$_3$OD, δ): 2.22-2.90 (COCH$_2$, NHCH$_2$, and NH$_2$CH$_2$), 3.15-3.58 (CONCH$_2$), 3.60 (CH$_3$O). $^{13}$C (600 MHz, CD$_3$OD, δ): 30-60 (CH$_2$ and CH$_3$), 170-175 (C=O). FTIR (cm$^{-1}$): 3308 (NH$_2$), 2957 (CH$_2$), 2848 (CH$_2$), 1647 (C=O), and 1556 (NH).

In several embodiments, the hyperbranched PAMAM co-polymer has a polydispersity index (PDI) of greater than about 1.1. In several embodiments, the hyperbranched co-polymer has a polydispersity index (PDI) of between 1.1 and 2. In several embodiments, the hyperbranched co-polymer has a polydispersity index (PDI) of between 1.5 and 1.9.

Several embodiments pertain to a PAMAM hyperbranched co-polymer comprising one or more dendritic units comprising one or more tertiary amines, a plurality of terminal units comprising a plurality of primary amines, and a plurality of linear units comprising a plurality of secondary amines, wherein at least a portion of the plurality of secondary amines are bound to a plurality N-diazeniumdiolate moieties. In several embodiments, at least a portion of the dendritic units include the following structure:

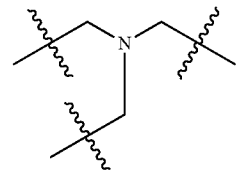 [SMILES: *CN(C*)C*]

and at least a portion of the plurality of linear units include a group selected from the following structures:

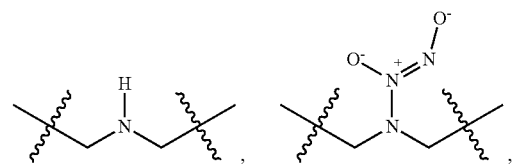

or a combination thereof.

In several embodiments, at least a portion of the plurality of N-diazeniumdiolate moieties are stabilized by hydrogen bonding between oxygen of the N-diazeniumdiolate moieties and hydrogen of at least one of the plurality of primary amines.

Several embodiments pertain to a method of delivering nitric oxide to a subject. In several embodiments, an effective amount of the hyperbranched compound or polyamidoamine composition as disclosed herein is administered to the subject.

Several embodiments pertain to a method of treating a disease state. In several embodiments, an effective amount of the hyperbranched compound or polyamidoamine composition as disclosed herein is administered to a subject in need thereof. In several embodiments, the disease state is selected from the group consisting of a gingivitis, cancer, a cardiovascular disease, a microbial infection, platelet aggregation and platelet adhesion caused by the exposure of blood to a medical device, pathological conditions resulting from abnormal cell proliferation, transplantation rejections, autoimmune diseases, inflammation, vascular diseases, scar tissue, wound contraction, restenosis, pain, fever, gastrointestinal disorders, respiratory disorders, sexual dysfunctions, and sexually transmitted diseases.

Several embodiments pertain to a method of manufacturing a polyamidoamine composition. In several embodiments, a polyfunctional amine (e.g., having 2, 3, 4, 5, or more amines) is mixed with an acrylate monomer in an appropriate solvent to form a reaction mixture. In some embodiments, the reaction mixture is mixed for time sufficient for a significant proportion of the polyfunctional amine to react with the acrylate monomer to form a hyperbranched copolymer. In several embodiments, the reaction mixture is heated to complete polymerization and to remove unreacted monomers to form a base polyamidoamine composition. In several embodiments, the hyperbranched structure is mixed basic conditions with gaseous NO at high pressure for a time sufficient to yield N-diazeniumdiolate moeities on the polyamidoamine composition. The mixing time is greater than about 6 hours, between about 6 hours and about 2 weeks, between about 6 hours and 1 week, between about 12 hours and 5 days, or between about 1 day and about 3 days.

In several embodiments, the heating of the reaction mixture to complete polymerization and to remove unreacted monomers includes heating under sub-atmospheric pressure. In several embodiments, the heating the reaction mixture to complete polymerization and to remove unreacted monomers includes heating to a first temperature of about 50° C. to about 70° C. for a first time of about 30 min to about 2 hours, heating to a second temperature of about 90° C. to about 110° C. for a second time of about 30 min to about 4 hours, heating to a third temperature of about 120° C. to about 150° C. for a third time of about 30 min to about 4 hours. In several embodiments, the heating the reaction mixture to complete polymerization and to remove unreacted monomers includes heating to a first temperature of about 60° C. to about 60° C. for a first time of about 1 hour, heating to a second temperature of about 100° C. for a second time of about 2 hours, heating to a third temperature of about 140° C. for a third time of about 2 hours.

In several embodiments, the polyfunctional amine is selected from the group consisting of ethylenediamine, diethylenetriamine, triethylenetetramine, tetraethylenepentamine, pentaethylenehexamine, a polyetheramine (e.g., a Jeffamine, polyetheramine is an amine of approximately 1700 average molecular weight, based on a PTMEG [poly(tetramethylene ether glycol)], a diamine of approximately 1000 molecular weight, based on a PTMEG [poly(tetramethylene etherglycol)]/PPG (polypropylene glycol) copolymer), and bis(hexamethylene)triamine.

In several embodiments, the polyetheramine is a JEFFAMINE®. In several embodiments, the JEFFAMINE® is selected from M-600, M-2005, M-1000, M-2070, D-230, D-400, D-2000, D-4000, ED-600 amine, ED-900 amine, ED-2003 amine, EDR-148 amine, EDR-176 amine, T-403 amine, T-3000 amine, T-5000 amine, THF-100 amine, THF-170 amine, XTJ568, XTA801, RFD-270, and XTJ-616. In several embodiments, the polyetheramine comprises one of the following structures:

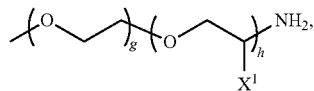

Mw 600 to 1000 to 2000

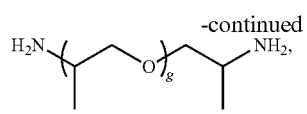

MW 200 to 400 to 2000 to 4000

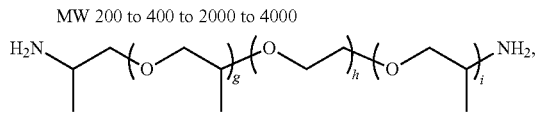

MW 600 to 900 to 2000

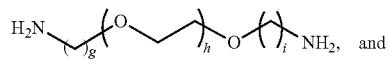

MW 140 to 175 to 200

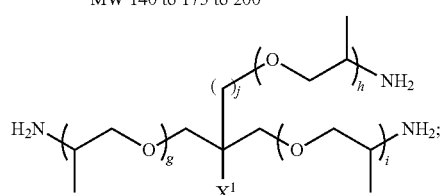

MW 400 to 3000 to 5000 wherein g, h, i, and j are independently an integer from 1 to 100; and wherein $X^1$ is as defined elsewhere herein or is an optionally substituted $C_{1-6}$ alkyl.

In several embodiments, the acrylate monomer is selected from the group consisting of methyl acrylate, ethyl acrylate, methyl methacrylate, acrylamide, ethyl methacrylate, 2-chloroethyl vinyl ether, 2-ethylehexyl acrylate, hydroxethyl methacrylate, hydroxethyl acrylate, butyl acrylate, butyl methacrylate, N-(2-hydroxypropyl)methacrylamide, N-(3-Aminopropyl)methacrylamide hydrochloride, N-(3-BOC-aminopropyl)methacrylamide, 2-Aminoethyl methacrylate hydrochloride, 2-(tert-Butylamino)ethyl methacrylate, n-iso-propylacrylamide, 2-methoxyethyl acrylate, n-ethylmethacrylamide, n-vinyl acetamide, 2-N-morpholinoethyl acrylate, methacryloyl-L-Lysine, 2-(methylamino)ethyl acrylate, and 2-(methylamino)ethylmethacrylate.

In several embodiments, the solvent is an alcohol or mixture of alcohols. In several embodiments, the polyamidoamine compound is modified with hydroxyl moieties by mixing the polyamidoamine composition with a hydroxy containing compound or a hydroxyl forming compound (e.g., an epoxide). In several embodiments, the hydroxy containing compound an epoxide. In several embodiments, the epoxide is propolyene oxide. In several embodiments, the polyfunctional amine is combined with the acrylate monomer at a molar ratio of amine to acrylate of between about 2:1 and about 5:1. In several embodiments, the polyfunctional amine is combined with the acrylate monomer at a molar ratio of amine to acrylate of between about 3:1 and about 4:1.

In several embodiments, a hyperbranched compound or polyamidoamine composition as disclosed elsewhere herein is formed. In several embodiments, the hyperbranched compound has a NO storage capacity of greater than or equal to 0.4 µmol NO/mg hyperbranched compound. In several embodiments, the hyperbranched compound provides greater than or equal to 90% (e.g., 90%, 95%, 97%, 98%, 99% or 100%) bacterial reduction of bacterial viability against one or more of *P. aeruginosa, S. aureus P. gingivalis, A. actinomycetemcomitans, A. viscosus,* and/or *S. mutans*. In several embodiments, such a reduction is achieved at a concentration of less than or equal to 2 mg/mL of the hyperbranched compound.

BRIEF DESCRIPTION OF THE FIGURES

FIGS. 2(b)-(d) provide representative $^1$H NMR spectra for: FIG. 2b h-PAMAM; FIG. 2c h-PAMAM-PO-1; FIG. 2d h-PAMAM-PO-2.

FIG. 5b G3-PAMAM-PO.

FIG. 8a HEDA and FIG. 8b MBA. $^1$H NMR spectra of the polymerization between MBA and HEDA with equal molar ratio at 75° C. for different times: FIG. 8c 10 min, FIG. 8d 2 h, FIG. 8e 6 h, FIG. 8f 12 h, and FIG. 8g 24 h. Solvent: D$_2$O.

FIG. 10a provides a $^1$H NMR spectrum of hydroxyl-terminated HBPMH. Solvent: DMSO. FIG. 10b is a $^{13}$C NMR spectrum of hydroxyl-terminated HBPMH. Solvent: DMSO.

FIG. 11a through FIG. 11d show characterization data for N-diazeniumdiolate NO donor of HBPMH/NO. FIG. 11a is a synthetic route of HBPMH/NO;

FIG. 11b shows a UV-Vis spectra of HBPMH (solid line) and HBPMH/NO (dash line); FIG. 11c shows $^1$H NMR spectra of HBPMH (top) and HBPMH/NO (bottom); FIG. 11(d) shows FTIR spectra of HBPMH (top) and HBPMH/NO (bottom).

FIG. 14a through FIG. 14c show characterization data for HBPMH/NO.

FIG. 14a shows the proposed mechanism for decomposition of N-diazeniumdiolates HBPMH/NO. FIG. 14b shows real-time NO release profile for NO-releasing HBPMH/NO. FIG. 14c shows real-time plot of t[NO] vs time for NO-releasing HBPMH/NO.

FIG. 15a and FIG. 15b show the bactericidal efficacy of NO-releasing hydroxyl-terminated HBPMH against planktonic bacteria over 4 hours' incubation. FIG. 15a is for P. aeruginosa, and FIG. 15b is for S. aureus. NO-releasing HBPMH/NO are the bottom curves, and non-NO-releasing controls are the top curves. Error bars represents standard deviation of the mean viability (CFU/mL). For all measurements, n=3 or more pooled experiments.

FIG. 16a shows cell viability (%) of L929 mouse fibroblasts exposure to both HBPMH and NO-releasing HBPMH/NO at diverse concentrations over 4 hours incubation. Each value represents the mean standard deviation of at least three determinations. FIG. 16b shows cell viability (%) of L929 mouse fibroblasts exposure to both HBPMH and NO-releasing HBPMH/NO at diverse concentrations over 4 hours incubation. Each value represents the mean standard deviation of at least three determinations.

FIG. 19a through FIG. 19c show the functionalization of HBPMA with N-diazeniumdiolates schematically (FIG. 19a) and spectroscopically with $^1$H NMR (FIG. 19b); $^1$H NMR spectra of HBPMA (top) and HBPMA/NO (bottom)) and UV-Vis (FIG. 19c); HBPMA (solid line) and HBPMA/NO (dash line)).

FIG. 20a shows a proposed mechanism for decomposition of N-diazeniumdiolates HBPMA/NO. FIG. 20b shows real-time NO release profile for NO-releasing HBPMA/NO. FIG. 20c shows real-time plot of t[NO] vs time for NO-releasing HBPMA/NO.

DETAILED DESCRIPTION

Figure 1:
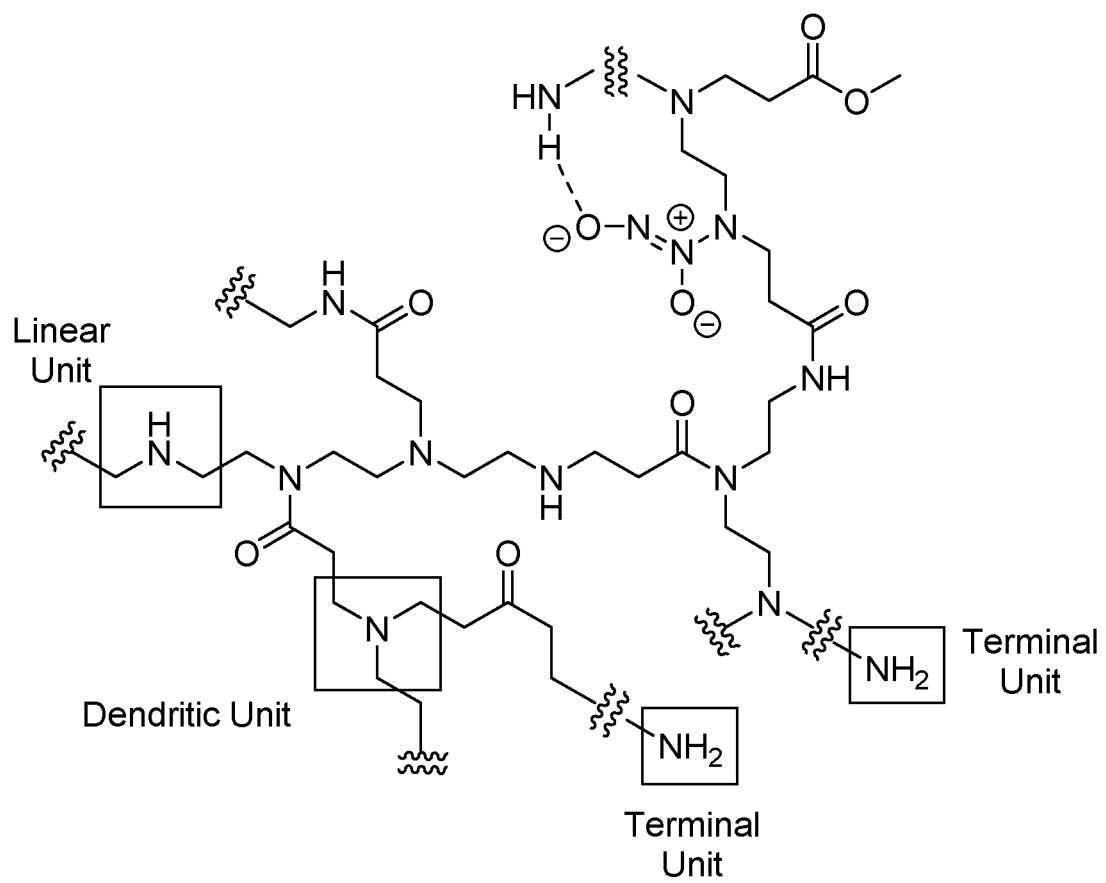
FIG. 1 is a structural representation of portions of a non-limiting embodiment of a N-diazeniumdiolate NO donor-modified hyperbranched PAMAM.

Several embodiments disclosed herein provide the synthesis and characterization of N-diazeniumdiolate NO donor-modified hyperbranched structures. In several embodiments, the hyperbranched structure is a hyperbranched PAMAM (h-PAMAM) polymer. In several embodiments, the h-PAMAM is partially or substantially hydroxylated (e.g., with an epoxide) to provide additional secondary amines that can act as NO donors. In several embodiments, a hyperbranched PAMAM scaffold can release NO both with or without hydroxyl (e.g. propylene oxide (PO)) modification. In several embodiments, the compounds, for example (h-PAMAM-PO-2/NO described below) enables the efficient reduction in viability and/or eradication of microbes (e.g., select oral pathogens) with low and/or minimal toxicity native tissue and mammalian cells (e.g., to human gingival fibroblasts). In several embodiments, despite structural defects (substantially absent in dendrimers and present in hyperbranched structures), the disclosed hyperbranched structures are antimicrobial. In several embodiments, the hyperbranched structures disclosed herein benefit from structural defects relative to pure dendrimeric compounds. In several embodiments, the antibacterial activity of hyperbranched structures (e.g., h-PAMAM-PO-2/NO) is comparable and/or improved relative to dendrimers (e.g., G3-PAMAM-PO/NO). In this regard, the disclosed hyperbranched structures (e.g., h-PAMAM-PO-2/NO) are potentially scalable therapeutics. In several embodiments, a hyperbranched structure as disclosed herein is not a dendrimer or dendron and lacks one or more characteristics of dendrimers and/or dendrons.

The presently disclosed subject matter will now be described more fully hereinafter. However, many modifications and other embodiments of the presently disclosed subject matter set forth herein will come to mind to one skilled in the art to which the presently disclosed subject matter pertains having the benefit of the teachings presented in the foregoing descriptions. Therefore, it is to be understood that the presently disclosed subject matter is not to be limited to the specific embodiments disclosed and that modifications and other embodiments are intended to be included within the scope of the appended claims. In other words, the subject matter described herein covers all alternatives, modifications, and equivalents. In the event that one or more of the incorporated literature, patents, and similar materials differs from or contradicts this application, including but not limited to defined terms, term usage, described techniques, or the like, this application controls. Unless otherwise defined, all technical and scientific terms used herein have the same meaning as commonly understood by one of ordinary skill in this field. All publications, patent applications, patents, and other references mentioned herein are incorporated by reference in their entirety.

As used herein, "and/or" refers to and encompasses any and all possible combinations of one or more of the associated listed items, as well as the lack of combinations when interpreted in the alternative ("or").

As used herin, "a," "an," or "the" can mean one or more than one. For example, "a" NO releasing moiety can mean a single or a multiplicity.

As used herein, the term "about," when referring to a measurable value such as an amount of a compound or agent of the current subject matter, dose, time, temperature, bactericidal efficacy, and the like, is meant to encompass variations of ±20%, ±10%, ±5%, ±1%, ±0.5%, or even ±0.1% of the specified amount.

As used herein, the term "dendrimer" refers to a repetitively branched molecule originating from a core and radiating outwardly in dendrons. A dendrimer is characterized by its perfect or near perfect symmetry. A dendrimer is typically symmetric or substantially symmetric around the core. A dendrimer is characterized by repetitive structural units by virtue of its step-wise synthesis.

As used herein, the term "dendron" refers to a repetitively branched molecule originating from a focal point and radiating outwardly. A dendron is characterized by its perfect or near perfect repetitive units. A dendron is characterized by repetitive structural units originating from the focal point by virtue of its step-wise synthesis.

As used herein, the term "hyperbranched" refers to a branched compound or structure that is not a dendrimer that is symmetric or around a core (e.g., having symmetric or substantially symmetric dendrons) and that lacks dendrons. While a hyperbranched is dendritic As used herein, "functionalized hyperbranched" structures may or may not have a nitric oxide donor moiety attached. Hyperbranched structures can be produced in a one-pot synthesis.

The term "treatment effective amount" or "effective amount," as used herein, refers to that amount of a recited compound that imparts a modulating effect, which, for example, can be a beneficial effect, to a subject afflicted with a disorder, disease or illness, including improvement in the condition of the subject (e.g., in one or more symptoms), delay or reduction in the progression of the condition, prevention or delay of the onset of the disorder, and/or change in clinical parameters, disease or illness, etc., as would be well known in the art. For example, an effective amount can refer to the amount of a composition, compound, or agent that improves a condition in a subject by at least 5%, e.g., at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 100%. In some embodiments, an improvement in a condition can be a reduction in infection. In some embodiments, an improvement can be reduction of bacterial load (e.g., bioburden) on a surface or in a subject. Actual dosage levels of active ingredients in an active composition of the presently disclosed subject matter can be varied so as to administer an amount of the active compound(s) that is effective to achieve the desired response for a particular subject and/or application. The selected dosage level will depend upon a variety of factors including, but not limited to, the activity of the composition, formulation, route of administration, combination with other drugs or treatments, severity of the condition being treated, and the physical condition and prior medical history of the subject being treated. In some embodiments, a minimal dose is administered, and dose is escalated in the absence of dose-limiting toxicity to a minimally effective amount. Determination and adjustment of an effective dose, as well as evaluation of when and how to make such adjustments, are contemplated herein.

"Treat" or "treating" or "treatment" refers to any type of action that imparts a modulating effect, which, for example, can be a beneficial effect, to a subject afflicted with a disorder, disease or illness, including improvement in the condition of the subject (e.g., in one or more symptoms), delay or reduction in the progression of the condition, and/or change in clinical parameters, disease or illness, curing the illness, etc.

The terms "disrupting" and "eradicating" refer to the ability of the presently disclosed hyperbranched structures to combat biofilms. The biofilms may be partially eradicated or disrupted, meaning that the cells no longer attach to one another or to a surface. The biofilm may be completely eradicated, meaning that the biofilm is no longer an interconnected, cohesive or continuous network of cells to a substantial degree.

The terms "nitric oxide donor" or "NO donor" refer to species and/or molecules that donate, release and/or directly or indirectly transfer a nitric oxide species, and/or stimulate the endogenous production of nitric oxide in vivo and/or elevate endogenous levels of nitric oxide in vivo such that the biological activity of the nitric oxide species is expressed at the intended site of action.

The terms "nitric oxide releasing" or "nitric oxide donating" refer to species that donate, release and/or directly or indirectly transfer any one (or two or more) of the three redox forms of nitrogen monoxide (NO+, NO−, NO (e.g., •NO)) and/or methods of donating, releasing and/or directly or indirectly transferring any one (or two or more) of the three redox forms of nitrogen monoxide (NO+, NO−, NO). In some embodiments, the nitric oxide releasing is accomplished such that the biological activity of the nitrogen monoxide species is expressed at the intended site of action.

The term "microbial infection" as used herein refers to bacterial, fungal, viral, yeast infections, as well other microorganisms, and combinations thereof.

The "patient" or "subject" treated as disclosed herein is, in some embodiments, a human patient, although it is to be understood that the principles of the presently disclosed subject matter indicate that the presently disclosed subject matter is effective with respect to all vertebrate species, including mammals, which are intended to be included in the terms "subject" and "patient." Suitable subjects are generally mammalian subjects. The subject matter described herein finds use in research as well as veterinary and medical applications. The term "mammal" as used herein includes, but is not limited to, humans, non-human primates, cattle, sheep, goats, pigs, horses, cats, dog, rabbits, rodents (e.g., rats or mice), monkeys, etc. Human subjects include neonates, infants, juveniles, adults and geriatric subjects. The subject can be a subject "in need of" the methods disclosed herein can be a subject that is experiencing a disease state and/or is anticipated to experience a disease state, and the methods and compositions of the invention are used for therapeutic and/or prophylactic treatment.

For the general chemical formulas provided herein, if no substituent is indicated, a person of ordinary skill in the art will appreciate that the substituent is hydrogen. A bond that is not connected to an atom, but is shown, indicates that the position of such substituent is variable. A jagged line, wavy line, two wavy lines drawn through a bond or at the end of a bond indicates that some additional structure is bonded to that position. For a great number of the additional monomers disclosed herein, but not explicitly shown in structures, it is understood by those in the art of polymers, that these monomers can be added to change the physical properties of the resultant polymeric materials even where the elemental analysis would not indicate such a distinction could be expected. Such physical properties include solubility, charge, stability, cross-linking, secondary and tertiary structure, and the like. Moreover, if no stereochemistry is indicated for compounds having one or more chiral centers, all enantiomers and diastereomers are included. Similarly, for a recitation of aliphatic or alkyl groups, all structural isomers thereof also are included. Unless otherwise stated, groups shown as $A_1$ through $A_n$ and referred to herein as an alkyl group, in the general formulas provided herein are independently selected from alkyl or aliphatic groups, particularly alkyl having 20 or fewer carbon atoms, and even more typically lower alkyl having 10 or fewer atoms, such as methyl, ethyl, propyl, isopropyl, and butyl. The alkyl may be optionally substituted (e.g., substituted or not substituted, as disclosed elsewhere herein). The alkyl may be a substituted alkyl group, such as alkyl halide (e.g. —$CX_3$ where X is a halide, and combinations thereof, either in the chain or bonded thereto,), alcohols (i.e. aliphatic or alkyl hydroxyl, particularly lower alkyl hydroxyl) or other similarly substituted moieties such as amino-, amino acid-, aryl-, alkyl aryl-, alkyl ester-, ether-, keto-, nitro-, sulfhydryl-, sulfonyl-, sulfoxide modified-alkyl groups.

The term "amino" and "amine" refer to nitrogen-containing groups such as $NR_3$, $NH_3$, $NHR_2$, and $NH_2R$, wherein R can be as described elsewhere herein. Thus, "amino" as used herein can refer to a primary amine, a secondary amine, or a tertiary amine. In some embodiments, one R of an amino group can be a diazeniumdiolate (i.e., NONO).

Whenever a group is described as being "optionally substituted" that group may be unsubstituted or substituted with one or more of the indicated substituents. Likewise, when a group is described as being "unsubstituted or substituted" (or "substituted or unsubstituted") if substituted, the substituent(s) may be selected from one or more the indicated substituents. If no substituents are indicated, it is meant that the indicated "optionally substituted" or "substituted" group may be substituted with one or more group(s) individually and independently selected from alkyl, alkenyl, alkynyl, cycloalkyl, cycloalkenyl, aryl, heteroaryl, heterocyclyl, aryl(alkyl), cycloalkyl(alkyl), heteroaryl(alkyl), heterocyclyl(alkyl), hydroxy, alkoxy, acyl, cyano, halogen, thiocarbonyl, O-carbamyl, N-carbamyl, O-thiocarbamyl, N-thiocarbamyl, C-amido, N-amido, S-sulfonamido, N-sulfonamido, C-carboxy, O-carboxy, nitro, sulfenyl, sulfinyl, sulfonyl, haloalkyl, haloalkoxy, an amino, a mono-substituted amine group, a di-substituted amine group, a mono-substituted amine(alkyl), a di-substituted amine(alkyl), a diamino-group, a polyamino, a diether-group, and a polyether-.

As used herein, "$C_a$ to $C_b$" in which "a" and "b" are integers refer to the number of carbon atoms in a group. The indicated group can contain from "a" to "b", inclusive, carbon atoms. Thus, for example, a "$C_1$ to $C_4$ alkyl" or "$C_1$-$C_4$ alkyl" group refers to all alkyl groups having from 1 to 4 carbons, that is, $CH_3$—, $CH_3CH_2$—, $CH_3CH_2CH_2$—, $(CH_3)_2CH$—, $CH_3CH_2CH_2CH_2$—, $CH_3CH_2CH(CH_3)$— and $(CH_3)_3C$—. If no "a" and "b" are designated, the broadest range described in these definitions is to be assumed.

If two "R" groups are described as being "taken together" the R groups and the atoms they are attached to can form a cycloalkyl, cycloalkenyl, aryl, heteroaryl or heterocycle. For example, without limitation, if $R^a$ and $R^b$ of an $NR^aR^b$ group are indicated to be "taken together," it means that they are covalently bonded to one another to form a ring:

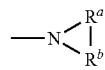

As used herein, the term "alkyl" refers to a fully saturated aliphatic hydrocarbon group. The alkyl moiety may be branched or straight chain. Examples of branched alkyl groups include, but are not limited to, iso-propyl, sec-butyl, t-butyl and the like. Examples of straight chain alkyl groups include, but are not limited to, methyl, ethyl, n-propyl, n-butyl, n-pentyl, n-hexyl, n-heptyl and the like. The alkyl group may have 1 to 30 carbon atoms (whenever it appears herein, a numerical range such as "1 to 30" refers to each integer in the given range; e.g., "1 to 30 carbon atoms" means that the alkyl group may consist of 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 carbon atoms, although the present definition also covers the occurrence of the term "alkyl" where no numerical range is designated). The "alkyl" group may also be a medium size alkyl having 1 to 12 carbon atoms. The "alkyl" group could also be a lower alkyl having 1 to 6 carbon atoms. An alkyl group may be substituted or unsubstituted. By way of example only, "$C_1$-$C_5$ alkyl" indicates that there are one to five carbon atoms in the alkyl chain, i.e., the alkyl chain is selected from methyl, ethyl, n-propyl, isopropyl, n-butyl, isobutyl, tert-butyl, pentyl (branched and straight-chained), etc. Typical alkyl groups include, but are in no way limited to, methyl, ethyl, propyl, isopropyl, butyl, isobutyl, tertiary butyl, pentyl and hexyl.

As used herein, the term "alkylene" refers to a bivalent fully saturated straight chain aliphatic hydrocarbon group. Examples of alkylene groups include, but are not limited to, methylene, ethylene, propylene, butylene, pentylene, hexylene, heptylene and octylene. An alkylene group may be represented by ⁓, followed by the number of carbon atoms, followed by a "*". For example,

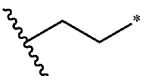 [SMILES: *CC*]

to represent ethylene. The alkylene group may have 1 to 30 carbon atoms (whenever it appears herein, a numerical range such as "1 to 30" refers to each integer in the given range; e.g., "1 to 30 carbon atoms" means that the alkyl group may consist of 1 carbon atom, 2 carbon atoms, 3 carbon atoms, etc., up to and including 30 carbon atoms, although the present definition also covers the occurrence of the term "alkylene" where no numerical range is designated). The alkylene group may also be a medium size alkyl having 1 to 12 carbon atoms. The alkylene group could also be a lower alkyl having 1 to 6 carbon atoms. An alkylene group may be substituted or unsubstituted. For example, a lower alkylene group can be substituted by replacing one or more hydrogen of the lower alkylene group and/or by substituting both hydrogens on the same carbon with a $C_{3-6}$ monocyclic cycloalkyl group (e.g.,

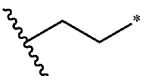 [SMILES: *CC*]

).

The term "alkenyl" used herein refers to a monovalent straight or branched chain radical of from two to twenty carbon atoms containing a carbon double bond(s) including, but not limited to, 1-propenyl, 2-propenyl, 2-methyl-1-propenyl, 1-butenyl, 2-butenyl and the like. An alkenyl group may be unsubstituted or substituted.

The term "alkynyl" used herein refers to a monovalent straight or branched chain radical of from two to twenty carbon atoms containing a carbon triple bond(s) including, but not limited to, 1-propynyl, 1-butynyl, 2-butynyl and the like. An alkynyl group may be unsubstituted or substituted.

As used herein, "cycloalkyl" refers to a completely saturated (no double or triple bonds) mono- or multi-cyclic (such as bicyclic) hydrocarbon ring system. When composed of two or more rings, the rings may be joined together in a fused, bridged or spiro fashion. As used herein, the term "fused" refers to two rings which have two atoms and one bond in common. As used herein, the term "bridged cycloalkyl" refers to compounds wherein the cycloalkyl contains a linkage of one or more atoms connecting non-adjacent atoms. As used herein, the term "spiro" refers to two rings which have one atom in common and the two rings are not linked by a bridge. Cycloalkyl groups can contain 3 to 30 atoms in the ring(s), 3 to 20 atoms in the ring(s), 3 to 10 atoms in the ring(s), 3 to 8 atoms in the ring(s) or 3 to 6 atoms in the ring(s). A cycloalkyl group may be unsubstituted or substituted. Examples of mono-cycloalkyl groups include, but are in no way limited to, cyclopropyl, cyclobutyl, cyclopentyl, cyclohexyl, cycloheptyl and cyclooctyl. Examples of fused cycloalkyl groups are decahydronaphthalenyl, dodecahydro-1H-phenalenyl and tetradecahydroanthracenyl; examples of bridged cycloalkyl groups are bicyclo[1.1.1]pentyl, adamantanyl and norbornanyl; and examples of spiro cycloalkyl groups include spiro[3.3]heptane and spiro[4.5]decane.

As used herein, "cycloalkenyl" refers to a mono- or multi-cyclic (such as bicyclic) hydrocarbon ring system that contains one or more double bonds in at least one ring; although, if there is more than one, the double bonds cannot form a fully delocalized pi-electron system throughout all the rings (otherwise the group would be "aryl," as defined herein). Cycloalkenyl groups can contain 3 to 10 atoms in the ring(s), 3 to 8 atoms in the ring(s) or 3 to 6 atoms in the ring(s). When composed of two or more rings, the rings may be connected together in a fused, bridged or spiro fashion. A cycloalkenyl group may be unsubstituted or substituted.

As used herein, "aryl" refers to a carbocyclic (all carbon) monocyclic or multicyclic (such as bicyclic) aromatic ring system (including fused ring systems where two carbocyclic rings share a chemical bond) that has a fully delocalized pi-electron system throughout all the rings. The number of carbon atoms in an aryl group can vary. For example, the aryl group can be a $C_6$-$C_{14}$ aryl group, a $C_6$-$C_{10}$ aryl group or a $C_6$ aryl group. Examples of aryl groups include, but are not limited to, benzene, naphthalene and azulene. An aryl group may be substituted or unsubstituted. As used herein, "heteroaryl" refers to a monocyclic or multicyclic (such as bicyclic) aromatic ring system (a ring system with fully delocalized pi-electron system) that contain(s) one or more heteroatoms (for example, 1, 2 or 3 heteroatoms), that is, an element other than carbon, including but not limited to, nitrogen, oxygen and sulfur. The number of atoms in the ring(s) of a heteroaryl group can vary. For example, the heteroaryl group can contain 4 to 14 atoms in the ring(s), 5 to 10 atoms in the ring(s) or 5 to 6 atoms in the ring(s), such as nine carbon atoms and one heteroatom; eight carbon atoms and two heteroatoms; seven carbon atoms and three heteroatoms; eight carbon atoms and one heteroatom; seven carbon atoms and two heteroatoms; six carbon atoms and three heteroatoms; five carbon atoms and four heteroatoms; five carbon atoms and one heteroatom; four carbon atoms and two heteroatoms; three carbon atoms and three heteroatoms; four carbon atoms and one heteroatom; three carbon atoms and two heteroatoms; or two carbon atoms and three heteroatoms. Furthermore, the term "heteroaryl" includes fused ring systems where two rings, such as at least one aryl ring and at least one heteroaryl ring or at least two heteroaryl rings, share at least one chemical bond. Examples of heteroaryl rings include, but are not limited to, furan, furazan, thiophene, benzothiophene, phthalazine, pyrrole, oxazole, benzoxazole, 1,2,3-oxadiazole, 1,2,4-oxadiazole, thiazole, 1,2,3-thiadiazole, 1,2,4-thiadiazole, benzothiazole, imidazole, benzimidazole, indole, indazole, pyrazole, benzopyrazole, isoxazole, benzoisoxazole, isothiazole, triazole, benzotriazole, thiadiazole, tetrazole, pyridine, pyridazine, pyrimidine, pyrazine, purine, pteridine, quinoline, isoquinoline, quinazoline, quinoxaline, cinnoline and triazine. A heteroaryl group may be substituted or unsubstituted.

As used herein, "heterocyclyl" or "heteroalicyclyl" refers to three-, four-, five-, six-, seven-, eight-, nine-, ten-, up to 18-membered monocyclic, bicyclic and tricyclic ring system wherein carbon atoms together with from 1 to 5 heteroatoms constitute said ring system. A heterocycle may optionally contain one or more unsaturated bonds situated in such a way, however, that a fully delocalized pi-electron system does not occur throughout all the rings. The heteroatom(s) is an element other than carbon including, but not limited to, oxygen, sulfur and nitrogen. A heterocycle may further contain one or more carbonyl or thiocarbonyl functionalities, so as to make the definition include oxo-systems and thio-systems such as lactams, lactones, cyclic imides, cyclic thioimides and cyclic carbamates. When composed of two or more rings, the rings may be joined together in a fused, bridged or spiro fashion. As used herein, the term "fused" refers to two rings which have two atoms and one bond in common. As used herein, the term "bridged heterocyclyl" or "bridged heteroalicyclyl" refers to compounds wherein the heterocyclyl or heteroalicyclyl contains a linkage of one or more atoms connecting non-adjacent atoms. As used herein, the term "spiro" refers to two rings which have one atom in common and the two rings are not linked by a bridge. Heterocyclyl and heteroalicyclyl groups can contain 3 to 30 atoms in the ring(s), 3 to 20 atoms in the ring(s), 3 to 10 atoms in the ring(s), 3 to 8 atoms in the ring(s) or 3 to 6 atoms in the ring(s). For example, five carbon atoms and one heteroatom; four carbon atoms and two heteroatoms; three carbon atoms and three heteroatoms; four carbon atoms and one heteroatom; three carbon atoms and two heteroatoms; two carbon atoms and three heteroatoms; one carbon atom and four heteroatoms; three carbon atoms and one heteroatom; or two carbon atoms and one heteroatom. Additionally, any nitrogens in a heteroalicyclic may be quaternized. Heterocyclyl or heteroalicyclic groups may be unsubstituted or substituted. Examples of such "heterocyclyl" or "heteroalicyclyl" groups include but are not limited to, 1,3-dioxin, 1,3-dioxane, 1,4-dioxane, 1,2-dioxolane, 1,3-dioxolane, 1,4-dioxolane, 1,3-oxathiane, 1,4-oxathiin, 1,3-oxathiolane, 1,3-dithiole, 1,3-dithiolane, 1,4-oxathiane, tetrahydro-1,4-thiazine, 2H-1,2-oxazine, maleimide, succinimide, barbituric acid, thiobarbituric acid, dioxopiperazine, hydantoin, dihydrouracil, trioxane, hexahydro-1,3,5-triazine, imidazoline, imidazolidine, isoxazoline, isoxazolidine, oxazoline, oxazolidine, oxazolidinone, thiazoline, thiazolidine, morpholine, oxirane, piperidine N-Oxide, piperidine, piperazine, pyrrolidine, azepane, pyrrolidone, pyrrolidione, 4-piperidone, pyrazoline, pyrazolidine, 2-oxopyrrolidine, tetrahydropyran, 4H-pyran, tetrahydrothiopyran, thiamorpholine, thiamorpholine sulfoxide, thiamorpholine sulfone and their benzo-fused analogs (e.g., benzimidazolidinone, tetrahydroquinoline and/or 3,4-methylenedioxyphenyl). Examples of spiro heterocyclyl groups include 2-azaspiro[3.3]heptane, 2-oxaspiro[3.3]heptane, 2-oxa-6-azaspiro[3.3]heptane, 2,6-diazaspiro[3.3]heptane, 2-oxaspiro[3.4]octane and 2-azaspiro[3.4]octane.

As used herein, "aralkyl" and "aryl(alkyl)" refer to an aryl group connected, as a substituent, via a lower alkylene group. The lower alkylene and aryl group of an aralkyl may be substituted or unsubstituted. Examples include but are not limited to benzyl, 2-phenylalkyl, 3-phenylalkyl and naphthylalkyl.

As used herein, "cycloalkyl(alkyl)" refer to an cycloalkyl group connected, as a substituent, via a lower alkylene group. The lower alkylene and cycloalkyl group of a cycloalkyl(alkyl) may be substituted or unsubstituted.

As used herein, "heteroaralkyl" and "heteroaryl(alkyl)" refer to a heteroaryl group connected, as a substituent, via a lower alkylene group. The lower alkylene and heteroaryl group of heteroaralkyl may be substituted or unsubstituted. Examples include but are not limited to 2-thienylalkyl, 3-thienylalkyl, furylalkyl, thienylalkyl, pyrrolylalkyl, pyridylalkyl, isoxazolylalkyl and imidazolylalkyl and their benzo-fused analogs.

A "heteroalicyclyl(alkyl)" and "heterocyclyl(alkyl)" refer to a heterocyclic or a heteroalicyclic group connected, as a substituent, via a lower alkylene group. The lower alkylene and heterocyclyl of a (heteroalicyclyl)alkyl may be substituted or unsubstituted. Examples include but are not limited tetrahydro-2H-pyran-4-yl(methyl), piperidin-4-yl(ethyl), piperidin-4-yl(propyl), tetrahydro-2H-thiopyran-4-yl (methyl) and 1,3-thiazinan-4-yl(methyl).

As used herein, the term "hydroxy" refers to a —OH group.

As used herein, "alkoxy" refers to the Formula —OR wherein R is an alkyl, an alkenyl, an alkynyl, a cycloalkyl, a cycloalkenyl, aryl, heteroaryl, heterocyclyl, cycloalkyl (alkyl), aryl(alkyl), heteroaryl(alkyl) or heterocyclyl(alkyl) is defined herein. A non-limiting list of alkoxys are methoxy, ethoxy, n-propoxy, 1-methylethoxy (isopropoxy), n-butoxy, iso-butoxy, sec-butoxy, tert-butoxy, phenoxy and benzoxy. An alkoxy may be substituted or unsubstituted.

As used herein, "acyl" refers to a hydrogen, alkyl, alkenyl, alkynyl, aryl, heteroaryl, heterocyclyl, aryl(alkyl), heteroaryl(alkyl) and heterocyclyl(alkyl) connected, as substituents, via a carbonyl group. Examples include formyl, acetyl, propanoyl, benzoyl and acryl. An acyl may be substituted or unsubstituted.

As used herein, a "cyano" group refers to a "—CN" group.

The term "halogen atom" or "halogen" as used herein, means any one of the radio-stable atoms of column 7 of the Periodic Table of the Elements, such as, fluorine, chlorine, bromine and iodine.

A "thiocarbonyl" group refers to a "—C(=S)R" group in which R can be the same as defined with respect to O-carboxy. A thiocarbonyl may be substituted or unsubstituted.

An "O-carbamyl" group refers to a "—OC(=O)N(R$_A$R$_B$)" group in which R$_A$ and R$_B$ can be independently hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl). An O-carbamyl may be substituted or unsubstituted.

An "N-carbamyl" group refers to an "ROC(=O)N (R$_A$)—" group in which R and R$_A$ can be independently hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl). An N-carbamyl may be substituted or unsubstituted.

An "O-thiocarbamyl" group refers to a "—OC(=S)—N (R$_A$R$_B$)" group in which R$_A$ and R$_B$ can be independently hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl). An O-thiocarbamyl may be substituted or unsubstituted.

An "N-thiocarbamyl" group refers to an "ROC(=S)N (R$_A$)—" group in which R and R$_A$ can be independently hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl). An N-thiocarbamyl may be substituted or unsubstituted.

A "C-amido" group refers to a "—C(=O)N(R$_A$R$_B$)" group in which R$_A$ and R$_B$ can be independently hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl). A C-amido may be substituted or unsubstituted.

An "N-amido" group refers to a "RC(=O)N($R_A$)—" group in which R and $R_A$ can be independently hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl). An N-amido may be substituted or unsubstituted.

An "S-sulfonamido" group refers to a "—$SO_2$N($R_AR_B$)" group in which $R_A$ and $R_B$ can be independently hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl). An S-sulfonamido may be substituted or unsubstituted.

An "N-sulfonamido" group refers to a "R$SO_2$N($R_A$)—" group in which R and $R_A$ can be independently hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl). An N-sulfonamido may be substituted or unsubstituted.

An "O-carboxy" group refers to a "RC(=O)O—" group in which R can be hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl), as defined herein. An O-carboxy may be substituted or unsubstituted.

The terms "ester" and "C-carboxy" refer to a "—C(=O)OR" group in which R can be the same as defined with respect to O-carboxy. An ester and C-carboxy may be substituted or unsubstituted.

A "nitro" group refers to an "—$NO_2$" group.

A "sulfenyl" group refers to an "—SR" group in which R can be hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl). A sulfenyl may be substituted or unsubstituted.

A "sulfinyl" group refers to an "—S(=O)—R" group in which R can be the same as defined with respect to sulfenyl. A sulfinyl may be substituted or unsubstituted.

A "sulfonyl" group refers to an "$SO_2$R" group in which R can be the same as defined with respect to sulfenyl. A sulfonyl may be substituted or unsubstituted.

As used herein, "haloalkyl" refers to an alkyl group in which one or more of the hydrogen atoms are replaced by a halogen (e.g., mono-haloalkyl, di-haloalkyl, tri-haloalkyl and polyhaloalkyl). Such groups include but are not limited to, chloromethyl, fluoromethyl, difluoromethyl, trifluoromethyl, 1-chloro-2-fluoromethyl, 2-fluoroisobutyl and pentafluoroethyl. A haloalkyl may be substituted or unsubstituted.

As used herein, "haloalkoxy" refers to an alkoxy group in which one or more of the hydrogen atoms are replaced by a halogen (e.g., mono-haloalkoxy, di-haloalkoxy and tri-haloalkoxy). Such groups include but are not limited to, chloromethoxy, fluoromethoxy, difluoromethoxy, trifluoromethoxy, 1-chloro-2-fluoromethoxy and 2-fluoroisobutoxy. A haloalkoxy may be substituted or unsubstituted.

The terms "amino" and "unsubstituted amino" as used herein refer to a —$NH_2$ group.

A "mono-substituted amine" group refers to a "—NH$R_A$" group in which $R_A$ can be an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl), as defined herein. The $R_A$ may be substituted or unsubstituted. A mono-substituted amine group can include, for example, a mono-alkylamine group, a mono-$C_1$-$C_6$ alkylamine group, a mono-arylamine group, a mono-$C_6$-$C_{10}$ arylamine group and the like. Examples of mono-substituted amine groups include, but are not limited to, —NH(methyl), —NH(phenyl) and the like.

A "di-substituted amine" group refers to a "—N$R_AR_B$" group in which $R_A$ and $R_B$ can be independently an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl), as defined herein. $R_A$ and $R_B$ can independently be substituted or unsubstituted. A di-substituted amine group can include, for example, a di-alkylamine group, a di-$C_1$-$C_6$ alkylamine group, a di-arylamine group, a di-$C_6$-$C_{10}$ arylamine group and the like. Examples of di-substituted amine groups include, but are not limited to, —N(methyl)$_2$, —N(phenyl)(methyl), —N(ethyl)(methyl) and the like.

As used herein, "mono-substituted amine(alkyl)" group refers to a mono-substituted amine as provided herein connected, as a substituent, via a lower alkylene group. A mono-substituted amine(alkyl) may be substituted or unsubstituted. A mono-substituted amine(alkyl) group can include, for example, a mono-alkylamine(alkyl) group, a mono-$C_1$-$C_6$ alkylamine($C_1$-$C_6$ alkyl) group, a mono-arylamine(alkyl group), a mono-$C_6$-$C_{10}$ arylamine($C_1$-$C_6$ alkyl) group and the like. Examples of mono-substituted amine(alkyl) groups include, but are not limited to, —$CH_2$NH(methyl), —$CH_2$NH(phenyl), —$CH_2CH_2$NH(methyl), —$CH_2CH_2$NH(phenyl) and the like.

As used herein, "di-substituted amine(alkyl)" group refers to a di-substituted amine as provided herein connected, as a substituent, via a lower alkylene group. A di-substituted amine(alkyl) may be substituted or unsubstituted. A di-substituted amine(alkyl) group can include, for example, a dialkylamine(alkyl) group, a di-$C_1$-$C_6$ alkylamine($C_1$-$C_6$ alkyl) group, a di-arylamine(alkyl) group, a di-$C_6$-$C_{10}$ arylamine($C_1$-$C_6$ alkyl) group and the like. Examples of di-substituted amine(alkyl)groups include, but are not limited to, —$CH_2$N(methyl)$_2$, —$CH_2$N(phenyl)(methyl), —$CH_2$N(ethyl)(methyl), —$CH_2CH_2$N(methyl)$_2$, —$CH_2CH_2$N(phenyl)(methyl), —N$CH_2CH_2$(ethyl)(methyl) and the like.

As used herein, the term "diamino-" denotes an a "—N($R_A$)$R_B$—N($R_C$)($R_D$)" group in which $R_A$, $R_C$, and $R_D$ can be independently a hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl), as defined herein, and wherein $R_B$ connects the two "N" groups and can be (independently of $R_A$, $R_C$, and $R_D$) a substituted or unsubstituted alkylene group. $R_A$, $R_B$, $R_C$, and $R_D$ can independently further be substituted or unsubstituted.

As used herein, the term "polyamino" denotes a "—(N($R_A$)$R_B$—)$_n$—N($R_C$)($R_D$)". For illustration, the term polyamino can comprise —N($R_A$)alkyl-N($R_A$)alkyl-N($R_A$)alkyl-N($R_A$)alkyl-H. In some embodiments, the alkyl of the polyamino is as disclosed elsewhere herein. While this example has only 4 repeat units, the term "polyamino" may consist of 1, 2, 3, 4, 5, 6, 7, 8, 9, or 10 repeat units. $R_A$, $R_C$, and $R_D$ can be independently a hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl), as defined herein, and wherein $R_B$ connects the two "N" groups and can be (independently of $R_A$, $R_C$, and $R_D$) a substituted or unsubstituted alkylene group. $R_A$, $R_C$, and $R_D$ can independently further be substituted or unsubstituted. As noted here, the polyamino comprises amine groups with intervening alkyl groups (where alkyl is as defined elsewhere herein).

As used herein, the term "diether-" denotes an a "—$OR_BO$—$R_A$" group in which $R_A$ can be a hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl), as defined herein, and wherein $R_B$ connects the two "O" groups and can be a substituted or unsubstituted alkylene group. $R_A$ can independently further be substituted or unsubstituted.

As used herein, the term "polyether" denotes a repeating —$(OR_B$—$)_nOR_A$ group. For illustration, the term polyether can comprise -Oalkyl-Oalkyl-Oalkyl-Oalkyl-$OR_A$. In some embodiments, the alkyl of the polyether is as disclosed elsewhere herein. While this example has only 4 repeat units, the term "polyether" may consist of 1, 2, 3, 4, 5, 6, 7, 8, 9, or 10 repeat units. $R_A$ can be a hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl), as defined herein. $R_B$ can be a substituted or unsubstituted alkylene group. $R_A$ can independently further be substituted or unsubstituted. As noted here, the polyether comprises ether groups with intervening alkyl groups (where alkyl is as defined elsewhere herein and can be optionally substituted).

Where the number of substituents is not specified (e.g. haloalkyl), there may be one or more substituents present. For example, "haloalkyl" may include one or more of the same or different halogens. As another example, "$C_1$-$C_3$ alkoxyphenyl" may include one or more of the same or different alkoxy groups containing one, two or three atoms.

As used herein, a radical indicates species with a single, unpaired electron such that the species containing the radical can be covalently bonded to another species. Hence, in this context, a radical is not necessarily a free radical. Rather, a radical indicates a specific portion of a larger molecule. The term "radical" can be used interchangeably with the term "group."

When a range of integers is given, the range includes any number falling within the range and the numbers defining ends of the range. For example, when the terms "integer from 1 to 20" is used, the integers included in the range are 1, 2, 3, 4, 5, 6, 7, 8, 9, 10, etc., up to and including 20.

Also as used herein, "and/or" refers to and encompasses any and all possible combinations of one or more of the associated listed items, as well as the lack of combinations when interpreted in the alternative ("or").

Furthermore, the term "about," as used herein when referring to a measurable value such as an amount of a compound or agent of this invention, dose, time, temperature, and the like, is meant to encompass variations of 20%, ±10%, ±5%, ±1%, ±0.5%, or even ±0.1% of the specified amount. The term "consists essentially of" (and grammatical variants), shall be given its ordinary meaning and shall also mean that the composition or method referred to can contain additional components as long as the additional components do not materially alter the composition or method. The term "consists of" (and grammatical variants), shall be given its ordinary meaning and shall also mean that the composition or method referred to is closed to additional components. The term "comprising" (and grammatical variants), shall be given its ordinary meaning and shall also mean that the composition or method referred to is open to contain additional components.

Nitric oxide (NO) is an endogenously produced diatomic free radical that mediates angiogenesis. It has a relatively short biological half-life (seconds) and is reactive in nature. As disclosed herein, the synthesis of scaffolds capable of controlled NO storage and release is important for taking advantage of NO's role in physiology and for developing NO-based therapeutics. In addition to the effects of NO disclosed above, NO is also a potent antibacterial agent that acts on bacteria via nitrosative and oxidative stress. NO is a broad-spectrum antibacterial agent and in some embodiments, scaffolds that deliver NO are capable of eradicating both bacteria and biofilms, primarily through the formation of reactive NO byproducts (e.g., peroxynitrite and dinitrogen trioxide) that cause oxidative and nitrosative damage to microbial DNA and/or membrane structures. Advantageously, the wide range of mechanisms by which NO exerts its antibacterial effects reduces the risk that bacteria will develop resistance. Thus, NO-releasing materials may be good targets to battle bacterial infection. The antibacterial efficacy of NO-releasing materials may be dependent on both NO payloads and associated release kinetics.

Nitric oxide, an endogenously produced diatomic free radical, is associated with numerous biological processes, including platelet aggregation and adhesion, vasodilation, wound repair, the immune response, and carcinogenesis. Deficiency of NO can lead to some degree of malfunction of NO-relevant physiological systems. Exogenous NO delivery may be an effective strategy for the resolution of biomedical therapies ranging from cardiovascular diseases to antibacterial and anticancer therapies. However, the difficulty in regulating gaseous NO for therapeutics warrants the use of assorted synthetic NO donors (e.g., N-diazeniumdiolates, S-nitrosothiols, metal nitrosyls, organic nitrates), in order to control NO delivery. N-diazeniumdiolates (NONOates) may be useful as NO donors because of their good stability and their capacity for proton-triggered NO delivery under physiological conditions. In some instances, high NO total is an important parameter to effectively evaluate storage capability of good scaffolds. Additionally, a high density of secondary amine groups imbues certain donors with a high NO storage capacity. However, NO release that is too fast and high NO storage may result in undesired toxicity to mammalian cells. Therefore, challenges exist in preparing biocompatible NO-releasing materials with high NO storage and low cytotoxicity, and such challenges, among others, are addressed according to several embodiments disclosed herein. Several embodiments of the invention have one or more of the following advantages: efficient and unique synthesis routes and resultant chemical composition of hyperbranched constructs. Controllable amounts of secondary-amines and diverse exterior terminal groups (e.g., hydroxyl, methyl, hydroxymethyl, and primary amine) can be provided. The NO storage and NO-release kinetics of the generated nitric-oxide releasing scaffolds can be tuned for a particular application. This tuning is achieved, in several embodiments, by altering the type and/or number of functionalized monomers of the formulae disclosed herein. In several embodiments, additional functionalization of the amines in the generated nitric-oxide releasing scaffolds, for example, by compounds with different compositions further enables the control over NO-release kinetics. In some embodiments, the secondary amine group directly influences the stability of the N-diazeniumdiolate (or other NO carrier group), allowing for control over both NO storage and release kinetics.

Nitric oxide, an endogenously produced diatomic free radical, not only plays fundamental roles in several important biological processes, but also exhibits emerging function as antibacterial or anticancer agent. Various NO donors (e.g., N-diazeniumdiolates, S-nitrosothiols, metal nitrosyls, organic nitrates) can be used for the controlled exogenous NO delivery. Delivery agents are beneficial because it is difficult to regulate of gaseous NO. N-bound diazeniumdiolates (NONOates) are particularly attractive because of their good stability and facile storage, which spontaneously proton-triggered dissociate under physiological condition to regenerate the NO radicals. Progress has been made in discovering biocompatible N-diazeniumdiolate-modified scaffolds, including linear and dendritic polymers, silicone nanoparticles, chitosan, liposome, metal organic frameworks, etc.

Among hyperbranched materials, dendrimers, a family of globular macromolecules with theoretically perfect branched architecture and well-defined molecular weight, are attractive due to a high density of exterior functional groups available for further modification and NO loading. NO-releasing dendrimers and hyperbranched structures as disclosed herein are characterized by large NO payloads and antibacterial activities against a wide range of pathogenic bacteria, including *Pseudomonas aureginosa* and *Staphylococcus aureus*. NO-releasing generation 1 (G1)-polyamidoamine (PAMAM) dendrimers may be efficacious against certain periodontal pathogens (e.g., *P. gingivalis* and *A. actinomycetemcomitans*). Unfortunately, these dendrimers may exhibit poor biocidal action against cariogenic bacteria (e.g., *S. mutans* and *S. sanguinis*). While these PAMAM dendrimers can be modified with long alkyl chains to facilitate antibacterial activity against the cariogenic bacteria by both membrane disruption and NO-related stress, the use of these dual-action dendrimers results in toxicity to human gingival fibroblast cells, limiting their clinical application. Higher generation NO-releasing PAMAM dendrimers could facilitate enhanced antibacterial activity against pathogens without compromising the viability of mammalian cells. Unfortunately, the synthesis of higher generation PAMAM dendrimers is difficult, being both time and labor intensive due to multistep purification. These synthetic challenges limit scale-up and potential clinical use of these agents. The repeated growth or purification steps for dendrimers and modification for secondary-amines lead to tedious work, undesired expense cost and high synthetic skills, further hindering their commercial application. Additionally, residual primary amine groups that are used to synthesize imperative secondary amine for N-diazeniumdiolate storage also result in unexpected cytotoxicity. One effective strategy for decreasing cytotoxicity is to functionalize a dendrimer with PEGylated exterior surface, but this strategy is accompanied by some disadvantages, including both tedious modification routes and decreased NO storage capability. Some embodiments disclosed herein solve these or other problems and provide, in some embodiments, low-cost and biocompatible macromolecular scaffolds for exogenous NO delivery.

In some embodiments, hyperbranched polymers (HBPs) are a category of dendritic polymers, but are of irregular three-dimensional highly branched architectures. Distinguished with dendrimers, in some embodiments, HBPs are composed of dendritic units, linear units and terminal units, which are randomly dispersed in the macromolecular backbone. In some embodiments, HBPs can advantageously be synthesized using a "one-pot" polymerization, immensely reducing the polymerization steps and time or material consumption. Benefited from unique physical and chemical properties and facile polymerization, HBPs that may make them attractive in diverse fields, such as in the biomedical field.

In some embodiments, hyperbranched polymers can be polymerized through Michael addition polycondensation between a multifunctional amine (e.g., diamines, triamines, tetraamines, etc.) monomers and diacrylamide/diacrylate/divinylsulfone monomers to provide promising and biocompatible materials for biomedicine applications. For instance, cationic hyperbranched poly(amidoamines) (HBPAAs). In some embodiments, HBPs such as HBPAAs can be used as biocompatible scaffold to deliver N-diazeniumdiolate NO donors, because of numerous secondary amines in the macromolecular backbones. Some embodiments disclosed herein pertain to NO-donating hyperbranched polymer structures. In some embodiments, these hyperbranched polymer structures are low-cost and efficient "one-pot" polymerization. In some embodiments, the synthetic sequences disclosed herein can be performed to yield hydroxyl-terminated hyperbranched polymer structures (e.g., hyperbranched poly(methylene bisacrylamide-hydroxyethyl ethylenediamine (HBPMH)). In some embodiments, resulting secondary-amines-abundant hyperbranched polymer structures can be reacted with NO gas to form N-diazeniumdiolates in the polymeric backbone. In some embodiments, the hyperbranched polymer structures are antibacterial against were evaluated against Gram-negative bacteria (e.g., *Pseudomonas aeruginosa*, etc.) and/or Gram-positive (e.g., *Staphylococcus aeruginosa*, etc.). in some embodiments, the hyperbranched structures have low cytotoxicity against mammalian cells (e.g., L929 mouse fibroblast, etc.) in vitro and in vivo.

Dental caries (e.g., tooth decay) affects 60%-70% school age children and the majority of adults in most industrialized countries. Worldwide, 11% of the total population suffers from severe periodontitis, which contributes to tooth loss and systematic diseases such as coronary, cardiovascular, stroke, and adverse pregnancy outcomes. Of >700 microorganisms in the oral cavity, cariogenic bacteria (e.g., *Streptococcus mutans, Actinomyces viscosus*) and periodontal pathogens (e.g., *Porphyromonas gingivalis, Aggregatibacter actinomycetemcomitans*) play a major role in the initiation and progression of oral diseases. Oral disease is among the most prevalent health problems faced by humans. Gram-positive cariogenic (e.g., *Streptococcus mutans, Actinomyces viscosus*) and Gram-negative periodontal (e.g., *Porphyromonas gingivalis, Aggregatibacter actinomycetemcomitans*) bacteria represent the main aggravators associated with the evolution and progression of dental caries and periodontal disease, respectively. Unfortunately, current treatments to combat these pathogens come with undesirable side effects. For example, the systemic use of antibiotics may result in gastrointestinal disturbance and foster bacterial resistance. Chlorhexidine, a common oral antiseptic, can alter taste, stain teeth and tongue, and irritate buccal mucosa. Macromolecule NO-delivering vehicles (e.g., silica nanoparticles, gold, etc.) kill Gram-negative periodontal pathogens. However, these materials have not been demonstrated to kill Gram-positive cariogenic bacteria at a safe concentration (e.g., a concentration that is bacteriocidal but non-toxic towards mammalian cells). Similar with those nanomaterials, the lack of biodegradability and potential cytotoxicity of the silica nanoparticles also hinders their future for biomedical application. Current research also focuses on utilizing nanomaterials including silver, gold, zinc, and copper, as replacement for traditional antibiotics that suffered from fostering bacterial resistance. However, these nanomaterials may accumulate inside the body and may cause accumulative toxicity, limiting their future for certain applications. Developing oral therapeutics that are capable of killing those disease-causing bacteria is important to maintain a healthy oral cavity. The hyperbranched structures (e.g., NO carrying HBPs) as disclosed herein, resolve one or more of these issues or others. The hyperbranched structures, as disclosed herein are advantageously easy to synthesis, afford unique three-dimensional dendritic shapes, and can have low cytotoxicity.

As disclosed herein, hyperbranched polymers, are an important subclass of compounds. In some embodiments, hyperbranched polymers have similar properties to dendritic polymers, but are advantageously readily prepared in bulk via one-pot reactions with minimal purification. Compared to their substantially structurally defect-free dendrimer counterparts (which comprise identical dendrons originating from a common core of the dendrimer), hyperbranched polymers are irregular in structure. However, as disclosed herein, in some embodiments, hyperbranched polymers still retain a high density of exterior functional groups.

Despite both having globular structures, dendrimers and hyperbranched polymers are distinct in their structures. For example, a dendrimer has two types of structural units: terminal units on the surface and dendritic units inside a globular structure. Except for defects, dendrimers have consistent and definitive structures. In contrast to this definitive structure, a hyperbranched polymer has three types of structural units: dendritic units, linear units and terminal units which are not consistently oriented across a given population. While the terminal units for hyperbranched structures are located at the termini, the dendritic units and linear units are distributed throughout the macromolecular framework, resulting in irregular structures. The structural differences are related to the different formation mechanisms, and can be further related to their different synthetic approaches. Dendrimers are synthesized using step-by-step iterations, most generally by a divergent process starting from a multifunctional core. In some embodiments, hyperbranched polymers can be synthesized in one step, by a polymerization reaction. For example, in some embodiments, hyperbranched polyamidoamine (h-PAMAM) can be synthesized with similar unit structure and molecular weight to G3-PAMAM dendrimers. In some embodiments, hyperbranched structures elicit low toxicity towards mammalian cells.

In some embodiments, a polyamidoamine composition including a hyperbranched co-polymer of an amine and an acrylate is provided. In some embodiments, at least a portion of the amines are modified with N-diazeniumdiolate moieties. In some embodiment, the hyperbranched co-polymer includes a dendritic unit, a linear unit, and a terminal unit, the dendritic unit comprising a tertiary amine, the linear unit comprising a secondary amine, and the terminal unit comprising a primary amine. In one embodiment, the N-diazeniumdiolate moieties may be bound through the secondary amines and exhibits intramolecular hydrogen bonding with the primary amine of the terminal unit. In one embodiment, the amine is derived from a polyfunctional amine monomer having the following structure: $H_2N-A_1-(NH)-A_2-NH_2$, wherein $A_1$ and $A_2$ are independently selected alkyl moieties. In a further embodiment, the acrylate is derived from the following monomer:

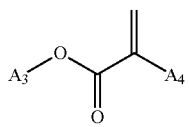

wherein $A_3$ and $A_4$ are independently selected alkyl moieties or hydrogen.

In further embodiments, the polyamidoamine composition has been further modified to include hydroxy moieties. The hydroxy moieties may be linked to amine moieties through alkyl moieties such that the amine moieties are secondary amines. In several embodiments, the polyamidoamine composition can include a molar ratio of the amine to the acrylate of between about 2:1 and about 5:1. In several embodiments, the molar ratio of the amine to acrylate is between about 3:1 and about 4:1. Ratios between those listed are used, in several embodiments.

In several embodiments, the acrylate residues in the hyperbranched co-polymer are derived from a monomer selected from the salt, ester, and conjugate bases of acrylic acid and its derivatives. In several embodiments, the acrylate is derived from a monomeric methacrylate. In several embodiments, the acrylate is derived from a monomer selected one or more of a methyl acrylate, ethyl acrylate, methyl methacrylate, acrylamide, ethyl methacrylate, 2-chloroethyl vinyl ether, 2-ethylehexyl acrylate, hydroxethyl methacrylate, hydroxethyl acrylate, butyl acrylate, butyl methacrylate, N-(2-hydroxypropyl)methacrylamide, N-(3-Aminopropyl)methacrylamide hydrochloride, N-(3-BOC-aminopropyl)methacrylamide, 2-Aminoethyl methacrylate hydrochloride, 2-(tert-Butylamino)ethyl methacrylate, n-iso-propylacrylamide, 2-methoxyethyl acrylate, n-ethylmethacrylamide, n-vinyl acetamide, 2-N-morpholinoethyl acrylate, methacryloyl-L-Lysine, 2-(methylamino) ethyl acrylate, and 2-(methylamino)ethyl methacrylate. In another embodiment, the acrylate is derived from a diacrylate. For example, the diacrylate may be ethylene glycol diacrylate, triethylene glycol diacrylate, tetraethylene glycol diacrylate, polyethylene glycol diacrylate, tricyclodecan dimethanol diacrylate, N-acryloxysuccinimide, N-(2-hydroxypropyl)methacrylamide, Bis[2-(methacryloyloxy) ethyl] phosphate, diacrylamide, and N,N'-methylenebisacrylamide.

In several embodiments, the amine residues are derived from (e.g., synthesized using) diethylenetriamine. In several embodiments, the amine residues are derived from (e.g., synthesized using) one or more of ethylenediamine, diethylenetriamine, triethylenetetramine, tetraethylenepentamine, pentaethylenehexamine, polyetheramine and bis(hexamethylene)triamine.

In several embodiments, a polyamidoamine hyperbranched co-polymer includes one or more dendritic units which include tertiary amines, a plurality of terminal units which include primary amines, and a plurality of linear units including secondary amines. N-diazeniumdiolates moieties can be reversibly bound to secondary amines present in the linear units. In one embodiment, the polyamidoamine hyperbranched co-polymer has dendritic units include the following structure:

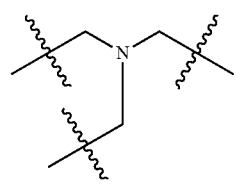 [SMILES: *CN(C*)C*]

and at least a portion of the plurality of linear units include a group selected from the following structures:

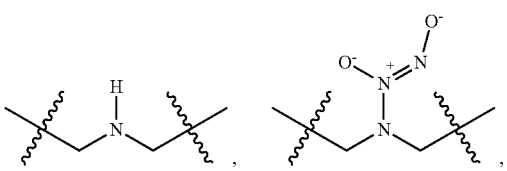

or a combination thereof. In several embodiments, the amine residues are derived from (e.g., synthesized using) the polyamidoamine hyperbranched co-polymer incorporates high levels of N-diazeniumdiolate moieties as they are stabilized by hydrogen bonding between oxygen of the N-diazeniumdiolate moieties and hydrogen of at least one of the plurality of primary amines.

In several embodiments, the hyperbranched polyamidoamine (h-PAMAM) is synthesized by the polymerization of diethylenetriamine (DETA) and methyl acrylate (MA). In several embodiments, the hyperbranched structure is synthesized through the addition of any of the nucleophilic amine compounds disclosed elsewhere herein with one or more acrylates.

In several embodiments, size exclusion chromatography (SEC) can be used to measure the molecular weight of the hyperbranched structures disclosed herein. In several embodiments, with a multi-angle light scattering (SEC-MALS) detectors are used. In several embodiments, the weight-average molecular weight ($M_w$) of hyperbranched structures disclosed herein are greater than or equal to about: 2,500, g/mol, 5,000 g/mol, 6,000 g/mol, 7,000, g/mol, 8,000 g/mol, 10000 g/mol, 15,000 g/mol, or ranges including and/or spanning the aforementioned values. In several embodiments, the $M_w$ of hyperbranched structures disclosed herein are greater than or equal to about $6.39 \times 10^3$ g/mol. In several embodiments, the number-average molecular weight ($M_n$) of hyperbranched structures disclosed herein are greater than or equal to about: 2,500, g/mol, 5,000 g/mol, 6,000 g/mol, 7,000, g/mol, 8,000 g/mol, 10000 g/mol, 15,000 g/mol, or ranges including and/or spanning the aforementioned values. In several embodiments, the $M_n$ of hyperbranched structures disclosed herein are greater than or equal to about $6.39 \times 10^3$ g/mol. The size of the hyperbranched copolymer may be described as a weight-average molecular weight (MW) of between about $2 \times 10^3$ g mol$^{-1}$ and about $15 \times 10^3$ g mol$^{-1}$ as determined through size exclusion chromatography with a multi-angle light scattering (SEC-MALS) detector. With such a size, such compounds may be referred to as oligomers. In other embodiments, the size of the hyperbranched copolymer may be described as a weight-average molecular weight (MW) of between about $3 \times 10^3$ g mol$^{-1}$ and about $10 \times 10^3$ g mol$^{-1}$. In another embodiment, the size may be between about $3 \times 10^3$ g mol$^{-1}$ and about $6 \times 10^3$ g mol$^{-1}$. The hyperbranched copolymer may include a population of molecules having different shapes and sizes. For example, the hyperbranched co-polymer may have a polydispersity index (PDI) of greater than about 1.1. In another embodiment, the hyperbranched co-polymer has a PDI of between 1.1 and 2. In another embodiment, the PDI may be between 1.5 and 1.9.

In several embodiments, the hyperbranched structures can be characterized using their polydispersity index. The polydispersity index (PDI) is a measure of the distribution of molecular mass in a given polymer sample. PDI can be calculated by dividing the weight average molecular weight and the number average molecular weight. In several embodiments, the hyperbranched structures have a PDI of greater than or equal to about: 1.05, 1.1, 1.2, 1.3, 1.5, 1.7, 1.8, 1.9, 2.0, or ranges including and/or spanning the aforementioned values. In several embodiments, the hyperbranched structures have a PDI of greater than or equal to about 1.89. In several embodiments, the hyperbranched structures have a polydispersity (PDI) that is greater than that of a dendrimer. In several embodiments, as disclosed elsewhere herein, third generation PAMAM (G3-PAMAM; theoretical molecular weight of 6909 g mol$^{-1}$) dendrimer was also prepared to investigate the influence of architecture on the properties of PAMAM scaffolds independent of molecular weight. The measured MW of G3-PAMAM dendrimer was $7.19 \times 10^3$ g mol$^{-1}$ with PDI of 1.04.

In several embodiments, relative to dendrimer and at approximately the same molecular weight the hyperbranched structures (e.g., polymers) disclosed herein contain fewer terminal groups (e.g., primary amines). In several embodiments, per each 1000 g/mol molecular weight of hyperbranched molecule the number of terminal groups on that hyperbranched molecule is less than or equal to about: 0.5, 1, 2, 3, 5, or ranges including and/or spanning the aforementioned values. In several embodiments, relative to G3-PAMAM dendrimer (i.e., 32 primary amines per scaffold with about 7,200 g/mol), the h-PAMAM polymer contained fewer primary amine groups (~8 primary amines per scaffold at about 6,400 g/mol). This result is based on the structural differences between the two materials. As is shown in FIG. 1, h-PAMAM polymer is composed of dendritic, linear, and terminal units. In several embodiments, the linear units induce structural defects in the polymeric structure. In several embodiments, the incorporation of linear units decreases the number of exterior primary amines while increasing secondary amines along the polymer backbone. In contrast, the dendrimer (e.g., G3-PAMAM dendrimer), which should theoretically be structurally perfect, consists only of dendritic and terminal units. As such, the G3-PAMAM dendrimer is devoid of linear units, which in the examples shown here, contain the secondary amines most available for binding N-diazeniumdiolate moieties. In several embodiments, secondary amine functionalities are necessary for forming stable N-diazeniumdiolate nitric oxide (NO) donors. In contrast to PAMAM dendrimer that requires a subsequent reaction to produce secondary amines prior to NO loading, h-PAMAM polymer is capable of direct reaction with NO gas to form N-diazeniumdiolates because of the secondary amines present on the linear units along the polymer backbone.

In some embodiments, NO payloads can be even further enhanced on the hyperbranched structures through further modification of the terminal primary amine units. In some embodiments, the primary amines of h-PAMAM polymer (for the exemplary h-PAMAM polymer, there are ~8 primary amines per scaffold) were modified with one molar equivalent of a hydroxy containing compound. One exemplary compound used was propylene oxide (PO), which is an epoxide that yields a hydroxy functional group subsequent to the ring opening reaction, yielding a compound described herein as h-PAMAM-PO-1. For the comparative study, h-PAMAM polymer and G3-PAMAM dendrimer were modified with one molar equivalent of PO with respect to the primary amines of G3-PAMAM dendrimer (32 primary amine per scaffold), yielding h-PAMAM-PO-2 and G3-PAMAM-PO, respectively. In this manner, the impact of exterior modification on NO release properties (e.g., payloads and release kinetics) of h-PAMAM polymer could be manipulated.

Several embodiments pertain to a method of delivering nitric oxide to a subject, comprising administering an effective amount of the hyperbranched structure to the subject. In several embodiments, disclosed is a method of treating a disease state comprising administering an effective amount of the hyperbranched structure to a subject in need thereof, wherein the disease state is selected from the group consisting of a gingivitis, cancer, a cardiovascular disease, a microbial infection, platelet aggregation and platelet adhesion caused by the exposure of blood to a medical device, pathological conditions resulting from abnormal cell proliferation, transplantation rejections, autoimmune diseases, inflammation, vascular diseases, scar tissue, wound contraction, restenosis, pain, fever, gastrointestinal disorders, respiratory disorders, sexual dysfunctions, and sexually transmitted diseases.

In some embodiments, the hyperbranched structures disclosed herein are employed in methods of treating patients and/or methods of killing bacteria (e.g., as antimicrobials). Also provided herein are methods for delivering nitric oxide to a subject, comprising administering an effective amount of any of the functionalized hyperbranched structures disclosed herein to the subject. Methods of treating a disease state are also provided for herein, the methods comprising, in several embodiments administering an effective amount of any of the functionalized hyperbranched structures disclosed herein to a subject in need of treatment, wherein the disease state is selected from the group consisting of a cancer, a cardiovascular disease, a microbial infection; platelet aggregation and platelet adhesion caused by the exposure of blood to a medical device; pathological conditions resulting from abnormal cell proliferation; transplantation rejections, autoimmune diseases, inflammation, vascular diseases; scar tissue; wound contraction, restenosis, pain, fever, gastrointestinal disorders, respiratory disorders, sexual dysfunctions, and sexually transmitted diseases. In several embodiments, the disease state is a microbial infection. In several embodiments, the disease state is dental caries or another disease of the mouth (gingivitis, periodontitis, etc.).

In several embodiments, there is provided for herein a method of reducing microbial load on a surface comprising applying a compound to a surface contaminated with a plurality of microbes wherein the compound comprises a nitric oxide (NO) releasing hyperbranched structure, the functionalized hyperbranched structure comprising an NO donor, wherein the NO donor generates NO and induces oxidative and/or nitrosative damage to microbial DNA and membrane structures, thereby reducing microbial load, and wherein the plurality of microbes comprises two or more of the following: gram-positive bacteria, gram-negative bacteria, fungi, yeast, and viruses. In several embodiments, the surface is an organic surface. In several embodiments, the surface is human skin or mucosal surface. In several embodiments, application of the compound does not induce skin irritation or irritation of the mucosa. In several embodiments, the surface is animal skin. In several embodiments, the surface is in the mouth or surrounding tissue of a human or an animal. In several embodiments, application of the compound does not induce skin irritation or irritation of the mouth or surrounding tissue. In several embodiments, the surface is human airway tissue. In several embodiments, application of the compound (e.g., inhalation) does not induce irritation of airway epithelial cells. In several embodiments, the surface is an inorganic surface. In several embodiments, the inorganic surface is an external or internal surface of a medical device. In several embodiments, the medical device is a dental tool. In several embodiments, the application of the compound generates an antimicrobial coating on the external or internal surface of the medical device. In several embodiments, the medical device comprises an endoscope, dental drill or other dental device, a dental implant, or dental fixture.

In several embodiments, the microbial load to be reduced and/or eliminated comprises drug-resistant bacteria. In several embodiments, the drug-resistant bacteria comprise carbapenem-resistant Enterobacteriaceae. In several embodiments, the drug-resistant bacteria comprise Methicillin-resistant *Staphylococcus aureus*. In several embodiments, the microbe comprises human immunodeficiency virus, herpes simplex virus, papilloma virus, parainfluenza virus, influenza, hepatitis, Coxsackie Virus, herpes zoster, measles, mumps, rubella, rabies, pneumonia, hemorrhagic viral fevers, H1N1, and the like), prions, parasites, fungi, mold, yeast and bacteria (both gram-positive and gram-negative) including, among others, *Candida albicans, Aspergillus niger, Escherichia coli* (*E. coli*)*, Pseudomonas aeruginosa* (*P. aeruginosa*), and *Staphylococcus aureus* (*S. aureus*), Group A streptococci, *S. pneumoniae, Mycobacterium tuberculosis, Campylobacter jejuni, Salmonella, Shigella, P. gingivalis, A. actinomycetemcomitans, A. viscosus,* and/or *S. mutans* and a variety of drug resistant bacteria. The terms microorganism and microbe shall be used interchangeably. Microbes can include wild-type, genetically-engineered or modified organisms. In several embodiments, the formulations and methods disclosed herein are for topical use or treatment of a surface, such as the oral mucosa.

In several embodiments, there is provided a treating and/or preventing a microbial infection and/or proliferation comprising, contacting a surface (that is either contaminated with a plurality of microbes or that is susceptible to contamination, e.g., the mouth) with a compound comprising a nitric oxide (NO) releasing hyperbranched structure, the functionalized hyperbranched structure comprising an NO donor, wherein the NO donor generates NO and induces damage to the membrane and/or DNA of the microbes, thereby reducing the number of viable microbes and treating and/or preventing the infection or invasion, and wherein the plurality of microbes comprises one or more of viruses, gram positive bacteria, gram negative bacteria, drug resistant bacteria, molds, yeasts, fungi, and combinations thereof.

In several embodiments, the methods and uses employ compounds disclosed herein that are formulated for administration via a topical route, oral administration, oral-topical (e.g., an oral rinse, mouth wash, liquid, solid, gel, paste, etc.), via irrigation (such as dental irrigation), via injection, via spray, via solid depots, via ingestion, or via inhalation. In several embodiments, a strip or other substrate is used for application of the formulation. The strip, in some embodiments, is made from a polymer including but not limited to polyethylene. In several embodiments, the route is topical and the methods and uses of the NO-releasing hyperbranched structures are for the treatment of dental pathogens (e.g., one or more of *Porphyromonas gingivalis, Aggregatibacter actinomycetemcomitans, Streptococcus mutans*, and *Actinomyces viscosus*). In several embodiments, the NO-releasing hyperbranched structures do not substantially damage human cells, including gingival fibroblasts, oral mucosa epithelial, or other cells in or around the mouth.

In several embodiments, the methods involve the administration of a composition comprising a hyperbranched structure as disclosed herein. In several embodiments, the compositions used in the disclosed methods can take such forms as suspensions, solutions or emulsions in oily or aqueous vehicles, and can contain formulatory agents, such as suspending, stabilizing and/or dispersing agents. Alternatively, the active ingredient can be in powder form for constitution with a suitable vehicle, e.g., sterile pyrogen-free water, before use.

Illustratively, the hyperbranched co-polymer may be water soluble, for example, it may be soluble in water at a level greater than about 1 mg/mL, about 10 mg/mL, about 20 mg/mL, about 50 mg/mL or about 100 mg/mL.

In several embodiments, the therapeutic compositions can be presented in unit-dose or multi-dose containers, for example sealed ampoules and vials, and can be stored in a frozen or freeze-dried (lyophilized) condition requiring only the addition of sterile liquid carrier immediately prior to use.

In several embodiments, for oral administration, the compositions can take the form of, for example, tablets or capsules prepared by a conventional technique with pharmaceutically acceptable excipients, such as binding agents (e.g., pregelatinized maize starch, polyvinylpyrrolidone or hydroxypropyl methylcellulose); fillers (e.g., lactose, microcrystalline cellulose or calcium hydrogen phosphate); lubricants (e.g., magnesium stearate, talc or silica); disintegrants (e.g., potato starch or sodium starch glycollate); or wetting agents (e.g., sodium lauryl sulphate). The tablets can be coated by methods known in the art. For example, a therapeutic agent can be formulated in combination with hydrochlorothiazide, and as a pH stabilized core having an enteric or delayed release coating which protects the therapeutic agent until it reaches the target organ.

In several embodiments, liquid preparations for oral administration can take the form of, for example, solutions, syrups or suspensions, or they can be presented as a dry product for constitution with water or other suitable vehicle before use. Such liquid preparations can be prepared by conventional techniques with pharmaceutically acceptable additives, such as suspending agents (e.g., sorbitol syrup, cellulose derivatives or hydrogenated edible fats); emulsifying agents (e.g., lecithin or acacia); non-aqueous vehicles (e.g., almond oil, oily esters, ethyl alcohol or fractionated vegetable oils); and preservatives (e.g., methyl or propyl-p-hydroxybenzoates or sorbic acid). The preparations also can contain buffer salts, flavoring, coloring and sweetening agents as appropriate. Preparations for oral administration can be suitably formulated to give controlled release of the active compound. For buccal administration the compositions can take the form of tablets or lozenges formulated in conventional manner.

In several embodiments, the disclosed compounds also can be formulated as a preparation for implantation or injection. Thus, for example, the compounds can be formulated with suitable polymeric or hydrophobic materials (e.g., as an emulsion in an acceptable oil) or ion exchange resins, or as sparingly soluble derivatives (e.g., as a sparingly soluble salt). The compounds also can be formulated in rectal compositions (e.g., suppositories or retention enemas containing conventional suppository bases, such as cocoa butter or other glycerides), creams or lotions, or transdermal patches.

Pharmaceutical formulations also are provided which are suitable for administration as an aerosol by inhalation. In several embodiments, the hyperbranched structures described herein are formulated in solution and/or aerosol form. In several embodiments, these formulations comprise a solution or suspension of a NO-releasing hyperbranched structures (e.g., polyamidomines) described herein. In several embodiments, the desired formulation can be placed in a small chamber and nebulized. Nebulization can be accomplished by compressed air or by ultrasonic energy to form a plurality of liquid droplets or solid particles comprising the NO-releasing hyper-branched polyamidomines. For example, the presently disclosed NO-releasing hyper-branched polyamidomines can be administered via inhalation to treat bacterial infections related to cystic fibrosis. Cystic fibrosis-related bacterial infections include, but are not limited to stenotrophomonis, *Mybacterium avium* intracellulaire and *M. abcessus, burkhoderia cepacia* and *Pseudomonas aeruginosa* (*P. aeruginosa*) infections.

In several embodiments, the hyperbranched structures disclosed herein are composed of dendritic units, linear units, and terminal units along and/or within chain lengths or arms of hyperbranched structures (as shown in FIG. 1). In some embodiments, the linear units and/or chains along the hyperbranched structure provide secondary amines as potential reactive sites for the addition of NO donor moieties. N-diazeniumdiolate NO donor.

In some embodiments, the NO-donating hyperbranched structure comprises NO-donating substituents that decorate the hyperbranched structure, for example, along the chain lengths or arms within the hyperbranched structure, as shown in FIG. 1.

In further embodiments, the present disclosure describes a method of manufacturing a polyamidoamine composition comprising one or more of the following steps: combining a polyfunctional amine with an acrylate monomer (e.g., in an appropriate solvent to form a reaction mixture), mixing the reaction mixture for time sufficient for a significant proportion of the polyfunctional amine to react with the acrylate monomer to form a hyperbranched copolymer, heating the reaction mixture to complete polymerization and to remove unreacted monomers to form a base polyamidoamine composition, and mixing the base polyamidoamine composition under basic conditions with gaseous NO at high pressure for a time sufficient to yield N-diazeniumdiolate moeities on the polyamidoamine composition. In several embodiments, the time sufficient for the significant proportion of the polyfunctional amine to react is greater than or equal to about: 6 hours, 12 hours, 1 day, 3 days, 5 days, 1 week, 2 weeks, or ranges including and/or spanning the aforementioned values.

In several embodiments, the reaction is heated to complete polymerization and to remove unreacted monomers includes heating under sub-atmospheric pressure. In another embodiment, heating the reaction mixture to complete polymerization and to remove unreacted monomers includes heating to a first temperature of about 50° C. to about 70° C. for a first time of about 30 min to about 2 hours, heating to a second temperature of about 90° C. to about 110° C. for a second time of about 30 min to about 4 hours, heating to a third temperature of about 120° C. to about 150° C. for a third time of about 30 min to about 4 hours. In yet another embodiment, heating the reaction mixture to complete polymerization and to remove unreacted monomers includes heating to a first temperature of about 60° C. to about 60° C. for a first time of about 1 hour, heating to a second temperature of about 100° C. for a second time of about 2 hours, heating to a third temperature of about 140° C. for a third time of about 2 hours.

In some embodiments, the electrophilic polymerizing agents are used to prepare the hyperbranched structures. In some embodiments, the electrophilic agents comprise one or more Michael acceptors (e.g., a, unsaturated carbonyl compounds, enolates, etc.) that act as electrophiles. In some embodiments, the polymerizing agent comprises one or more acrylate functionalities. In some embodiments, the Michael acceptor is an acrylate. In some embodiments, the polymerizing agent is a diacrylate (e.g., N,N'-methylenebis(acrylamide), ethylene glycol diacrylate, propane diol diacrylate, butandiol diacrylate, etc.), a triacrylate (e.g., trimethylolpropane triacrylate, pentaerythritol triacrylate, pentaerythritol triacrylate, glycerol propoxylate (1PO/OH) triacrylate, trimethylolpropane propoxylate triacrylate), etc.), a tetraacrylate, or another acrylate having a plurality of acrylate groups (e.g., 5, 6, 7, or more).

In some embodiments, after polymerization with a nucleophile unit, one or more of the hyperbranched structure may comprise an unreacted terminal group. In some embodiments, the terminal groups are end-capped using an epoxide that ring opens to provide a hydroxyl. In some embodiments, the end-capping agent is one or more of ethylene oxide, glycidol, propylene oxide, ethyl-2,3-epoxypropionate, methyl 2-methylglycidate, ethyl glycidyl ether, or the like. In some embodiments, the resulting terminal group comprises an optionally substituted mono-alkylamine group. In some embodiments, the optionally substituted mono-alkylamine group is $—NH(C_1-C_6$ alkyl) wherein the $C_1-C_6$ alkyl is substituted anywhere along the alkyl chain with at least one —OH (resulting from the epoxide ring opening) and is optionally substituted with $C_1-C_6$ alkyls, or a polyether. In some embodiments, those terminal groups can be end-capped by further reacting the hyperbranched structures with an amine end-capping agent. In some embodiments, the end-capping agent comprises one or more of $H_2N—((CH_2)_aNH)_b—H$, $H_2N—((CH_2)_aNH)_b—(CH_2)_cH$, $H_2N—((CH_2)_aX^a)_b—(CH_2)_cH$, $HX^a—((CH_2)_aX^b)_b((CH_2)_cX^c)_d(CH_2)_eH$, $—((CH_2)_aNH)_b—$, $—((CH_2)_aNH)_b—(CH_2)_cX^a$, $—((CH_2)_aX^a)_b—(CH_2)_cX^b$, and $—((CH_2)_aX^a)_b((CH_2)_cX^b)_d—(CH_2)_eX^c$, where each instance of a, b, c, d, or e is independently selected from an integer from 0 to 10 (e.g., 0, 1, 2, 3, 4, 5, 6, 7, 8, 9, 10). In several embodiments, each instance of $X^a$, $X^b$, and $X^c$ is independently selected from O, S, or NH. In some embodiments, the end-capping agent is one or more of $H_2NCH_2CH_2NH_2$ and $H_2NCH_2CH_2OH$. In some embodiments, the end-capping agent results in a substituent selected from one or more of $—NH—((CH_2)_aNH)_b—H$, $—NH—((CH_2)_aNH)_b—(CH_2)_cH$, $—NH—((CH_2)_aX^a)_b—(CH_2)_cH$, $((CH_2)_aX^b)_b((CH_2)_cX^c)_d—(CH_2)_eH$, $—((CH_2)_aNH)_b—$, $—((CH_2)_aNH)_b—(CH_2)_cX^a$, $—((CH_2)_aX^b)_b—(CH_2)_cX^b$, and $—((CH_2)_aX^a)_b((CH_2)_cX^b)_d—(CH_2)_eX^c$. In some embodiments, the end-capping agent results in a substituent selected from one or more of $—NHCH_2CH_2NH_2$ and $—NHCH_2CH_2OH$.

In some embodiments, the NO donor comprises any one of the following nitric oxide releasing moieties:

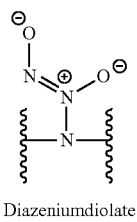
Diazeniumdiolate

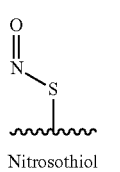
Nitrosothiol

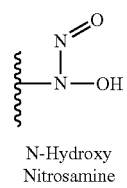
Nitrosamine

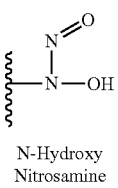
N-Hydroxy Nitrosamine

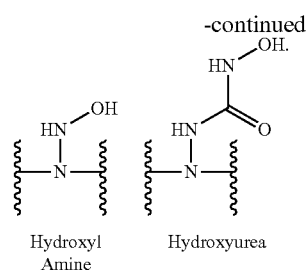
Hydroxyl Amine          Hydroxyurea where indicates attachment to other atoms within the hyperbranched structure (e.g., any instance of —H, —$CH_2$—, —CH—, etc.). In some embodiments, the NO donor is a N-diazeniumdiolate NO donor. In some embodiments, the NO donor is attached along a linear unit.

In some embodiments, the reaction of the hyperbranched structure with NO is performed in basic or alkaline conditions. In some embodiments, alkaline conditions include those having pH values of equal to or at least about: 7.5, 8.0, 9.0, 10.0, 12.0, or ranges including and/or spanning the aforementioned values.

In some embodiments, the methods disclosed herein provide NO-releasing hyperbranched structures having NO storage capacities (in μmol NO/mg hyperbranched structure) of greater than or equal to about: 0.25, 0.4, 0.5, 1.0, 1.5, 2.0, 3.0, or ranges including and/or spanning the aforementioned values. In some embodiments, within 2 h of being added to a PBS buffer solution as described in the Examples, the NO-releasing hyperbranched structures, release greater than or equal to about: 25%, 50%, 75%, 85%, 90%, 95%, 100%, or ranges including and/or spanning the aforementioned values, their total wt % of bound NO. In several embodiments, NO release in use for reducing or eliminating a biofilm occurs in similar amounts, e.g., about 20-25%, about 30-50%, about 60-75%, at least 80%, at least 85%, at least 90%, at least 95%, ranges including and/or spanning the aforementioned values, of the total wt % of bound NO.

In some embodiments, the NO release may occur over a period of about 0.01 hours, 0.1 hours, 0.25 hours, 0.5 hours, 1 hour, 2 hours, 3 hours, 4 hours, 5 hours, 10 hours, 15 hours, 20 hours, 24 hours, 36 hours, 48 hours, or 60 hours. In some embodiments, the NO release occurs in less than or equal to about: 0.01 hours, 0.1 hours, 0.25 hours, 0.5 hours, 1 hour, 2 hours, 3 hours, 4 hours, 5 hours, 10 hours, 15 hours, 20 hours, 24 hours, 36 hours, 48 hours, 60 hours, or ranges including and/or spanning the aforementioned values. In some embodiments, nitrosamine is not present during NO release. As used herein the phrase "nitrosamine is not present" refers to levels nitrosamine which are not detectable as determined by a UV-vis spectrum (or by other accepted methods in the art).

In some embodiments, the disclosed functionalized NO-releasing hyperbranched structures have antimicrobial activity. In some embodiments, the disclosed functionalized NO-releasing hyperbranched structures provide greater than or equal to 90% bacterial reduction in a bacterial viability assay performed under static conditions over 2 hours against one or more of P. aeruginosa, S. aureus P. gingivalis, A.

*actinomycetemcomitans, A. viscosus,* and/or *S. mutans* at a polymer concentration of equal to or less than about: 8 mg/mL, 6 mg/mL, 4 mg/mL, 2 mg/mL, 1 mg/mL, 0.5 mg/mL, or ranges including and/or spanning the aforementioned values. In some embodiments, the disclosed functionalized NO-releasing hyperbranched structures provide greater than or equal to 99% bacterial reduction in a bacterial viability assay performed under static conditions over 2 hours against a gram positive bacteria at a polymer concentration of equal to or less than about: 8 mg/mL, 6 mg/mL, 4 mg/mL, 2 mg/mL, 1 mg/mL, 0.5 mg/mL, or ranges including and/or spanning the aforementioned values. In some embodiments, the disclosed functionalized NO-releasing hyperbranched structures provide greater than or equal to 99% bacterial reduction in a bacterial viability assay performed under static conditions over 2 hours against a gram negative bacteria at a polymer concentration of equal to or less than about: 8 mg/mL, 6 mg/mL, 4 mg/mL, 2 mg/mL, 1 mg/mL, 0.5 mg/mL, or ranges including and/or spanning the aforementioned values. In several embodiments, bacterial reduction is greater than 95%, greater than 98%, or greater than 99%.

Some embodiments, pertain to methods of killing bacteria and/or microbes by applying NO donating hyperbranched structures to the bacteria and/or microbes. In some embodiments, the bacteria are dental bacteria. In some embodiments, the disclosed compounds can be used in methods of preventing cavities.

In some embodiments, the hyperbranched structures disclosed herein lack an core (e.g., from which dendrons originate). In some embodiments, the hyperbranched structures disclosed herein lack an ethylene diamine core. In some embodiments, the hyperbranched structures disclosed herein lack an ethylene diamine core from which one or more dendrons protrude. In some embodiments, the hyperbranched structures disclosed herein lack perfect, near perfect symmetry, lack a symmetry plane or axis, and/or lack symmetry. In some embodiments, the hyperbranched structures disclosed herein lack repetitive structural units that are produced by virtue of a step-wise synthesis.

The subject matter described herein is directed to the following embodiments:

1. A hyperbranched nitric oxide (NO) donating compound, comprising:

a linking group comprising any one or more of Formulas A, B, C, or D:

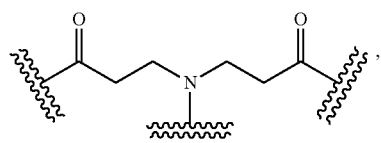

A

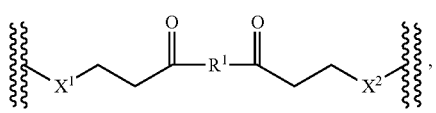

B

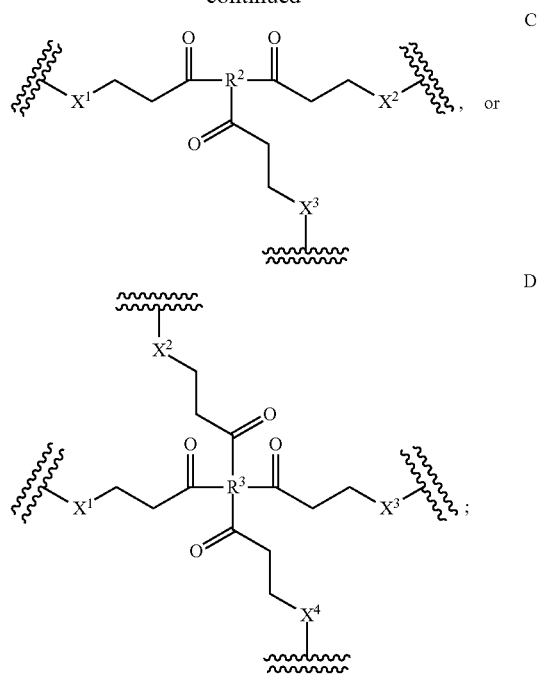

C

D wherein, "〰〰" indicates an attachment to another portion of the hyperbranched NO donating compound;

$X^1$, $X^2$, $X^3$, and $X^4$ are independently selected from the group consisting of —NH—, —N($R_a$)—, —O—, and —S—;

wherein each instance of $R_a$ is selected from a NO donating moiety, —H, an optionally substituted $C_1$-$C_6$ alkyl group, or an optionally substituted polyether having 1 to 6 repeat units;

$R^1$, $R^2$, and $R^3$ are independently selected from the group consisting of —$R_b$N($R_c$)$R_a$—(N($R_c$))$_n$—$R_b$—, —$R_b$(O$R_d$—)$_n$O—$R_b$—, and $C_1$-$C_6$ alkyl;

wherein each instance of $R_c$ is independently selected from a NO donating moiety, —H, an optionally substituted $C_1$-$C_6$ alkyl group, or an optionally substituted polyether having 1 to 6 repeat units;

wherein $R_b$ is a single bond or an optionally substituted $C_1$-$C_6$ alkylene group;

wherein $R_d$ is an optionally substituted $C_1$-$C_6$ alkylene group;

wherein n is an integer selected from 0, 1, 2, 3, 4, 5, or 6;

wherein, where $R^2$ is present, at least one instance of $R_d$ comprises the —C(O)—(CH$_2$)$_2$—X$^3$— group;

wherein, where $R^3$ is present, at least one instance of $R_d$ comprises the —C(O)—(CH$_2$)$_2$—X$^3$— group and at least one instance of $R_d$ comprises the —C(O)—(CH$_2$)$_2$—X$^4$— group;

wherein the hyperbranched compound comprises at least one of the following NO donating moieties:

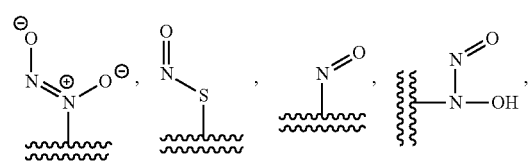

-continued

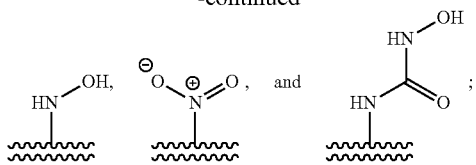

and
wherein the hyperbranched compound does not comprise an aminoglycoside or glycoside unit.

2. The hyperbranched NO donating compound of embodiment 1, further comprising at least one instance of the following structure:

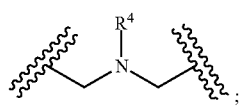

wherein $R^4$ is —N$^+$(=N—O$^-$)O$^-$.

3. The hyperbranched NO donating compound of any above embodiment, wherein the linking group comprises Formula A.
4. The hyperbranched NO donating compound of any above embodiment, wherein the linking group comprises Formula B, wherein:
$R^1$ is —$R_b$N($R_c$)$R_a$—(N($R_c$))$_n$—$R_b$—;
n is 1;
$R_d$ is —CH$_2$—;
$R_b$ is a single bond; and
each $R_c$ is H.
5. The hyperbranched NO donating compound of embodiment 4, wherein the linking group of Formula B is represented by the following structure:

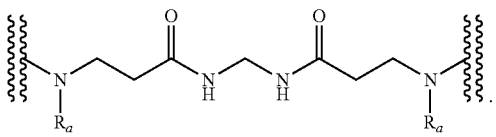

6. The hyperbranched NO donating compound of embodiment 5, wherein each instance of $R_a$ is the NO donating moiety or —H.
7. The hyperbranched NO donating compound of embodiment 6, wherein the linking group of Formula A is represented by the following structure:

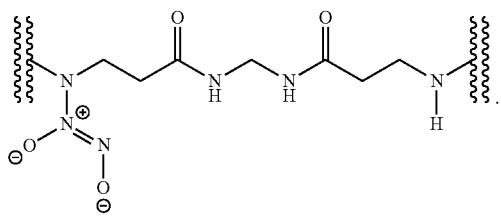

8. The hyperbranched NO donating compound of any above embodiment, further comprising an end group selected from the group consisting of:

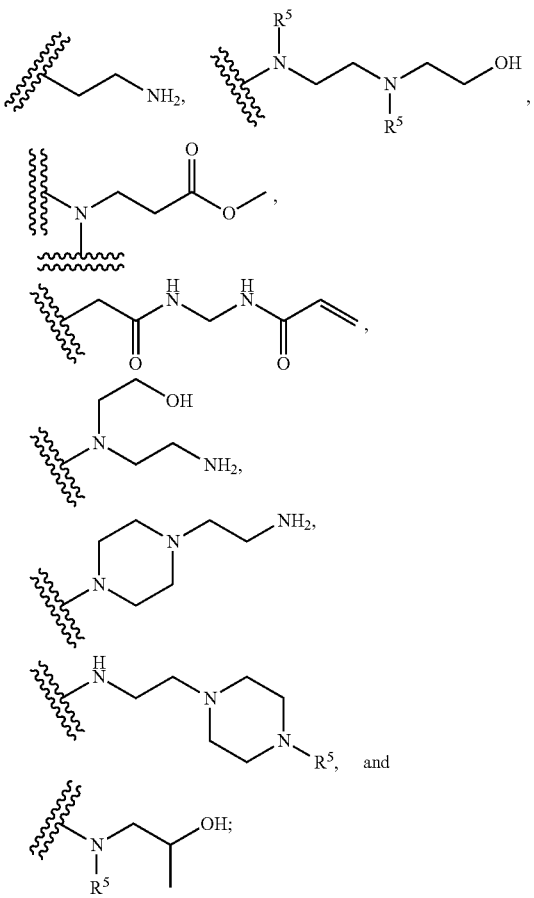

wherein each instance of $R^5$ is H or —N$^+$(=N—O$^-$)O$^-$.

9. The hyperbranched NO donating compound of any above embodiment, further comprising an end group selected from the group consisting of:

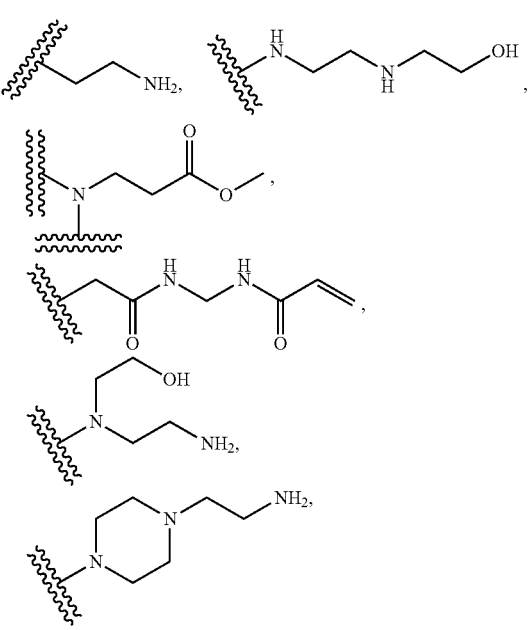

-continued

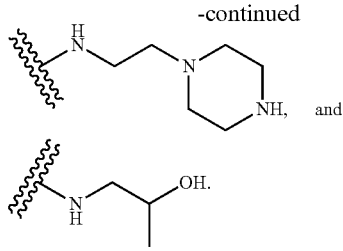

10. The hyperbranched structure of any above embodiment, further comprising one or more of the following groups:

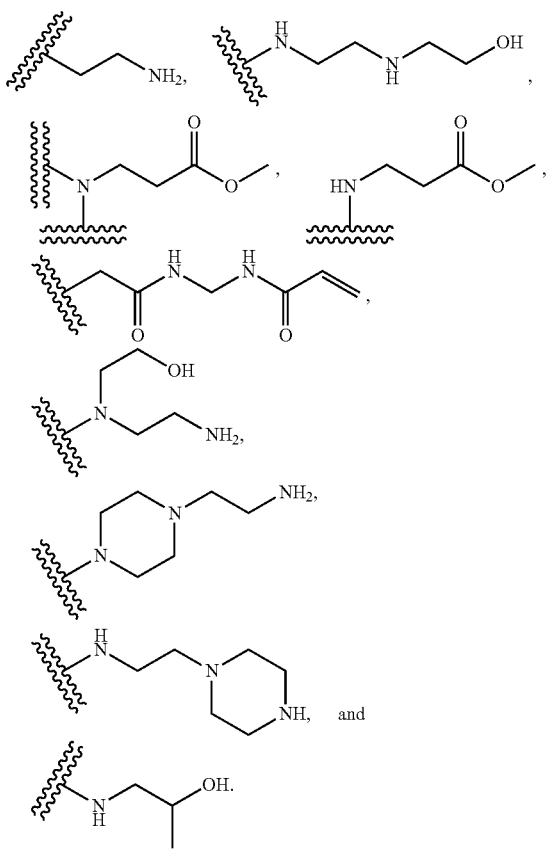

11. The hyperbranched structure of any above embodiment, wherein the hyperbranched structure lacks a dendritic core having any symmetric dendrons.
12. The hyperbranched compound of any above embodiment, wherein each instance of an optional substitution is selected from $C_1$-$C_6$ alkyl or —OH.
13. A hyperbranched nitric oxide (NO) donating compound, comprising:
a linking group of Formula A or Formula B:

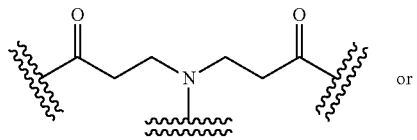

or

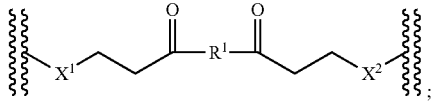

where
"⁓" indicates an attachment to another portion of the hyperbranched NO donating compound;
$X^1$ and $X^2$ are independently selected from the group consisting of —NH—, —N($R_a$)—, —O—, and —S—;
wherein each instance of $R_a$ is selected from a NO donating moiety or —H;
$R^1$ is independently selected from the group consisting of —N($R_c$)$R_a$—N($R_c$)—, —$R_b$(O$R_d$—)$_n$O—$R_b$—, and $C_1$-$C_6$ alkyl;
wherein each instance of $R_c$ is independently selected from a NO donating moiety or —H, an optionally substituted $C_1$-$C_6$ alkyl group, or an optionally substituted polyether having 1 to 6 repeat units;
wherein $R_b$ is a single bond or an optionally substituted $C_1$-$C_6$ alkylene group;
wherein $R_d$ is —CH$_2$— or —CH$_2$—CH$_2$—;
wherein n is an integer selected from 0, 1, 2, 3, 4, 5, or 6; and
wherein the hyperbranched compound comprises at least one of the following NO donating moieties:

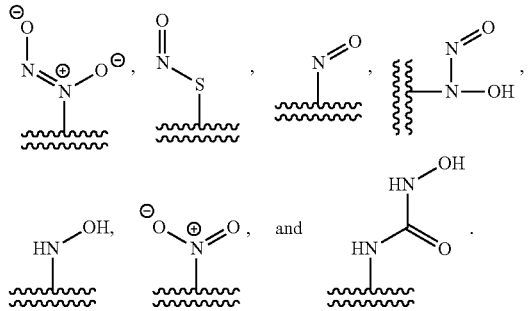

14. The hyperbranched NO donating compound of embodiment 13, further comprising at least one instance of the following structure:

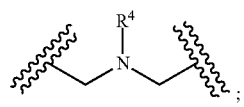

wherein $R^4$ is —N$^+$(=N—O$^-$)O$^-$.
15. The hyperbranched NO donating compound of any one of embodiments 13 to 14, comprising Formula A.
16. The hyperbranched NO donating compound of any one of embodiments 13 to 15, comprising Formula B wherein:
$R^1$ is —N($R_c$)$R_a$—N($R_c$)—;
$R_d$ is —CH$_2$—; and
each $R_c$ is H.
17. The hyperbranched NO donating compound of any one of embodiments 13 to 16, comprising a linking group represented by the following structure:

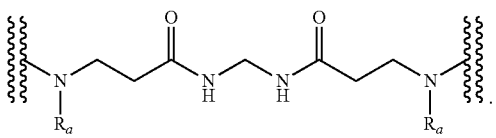

18. The hyperbranched NO donating compound of embodiment 17, wherein each instance of $R_a$ is the NO donating moiety or —H.

19. The hyperbranched NO donating compound of embodiment 18, wherein the linking group of Formula A is represented by the following structure:

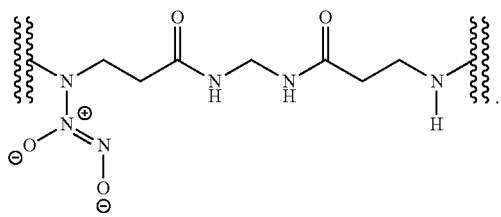

20. The hyperbranched NO donating compound of any one of embodiments 13 to 19, further comprising an end group selected from the group consisting of:

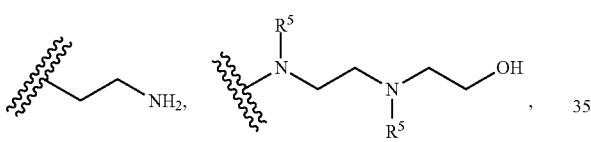

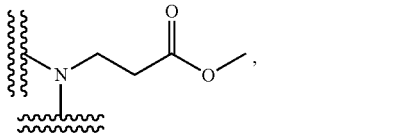

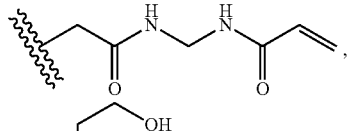

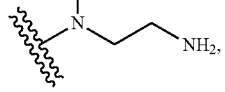

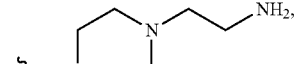

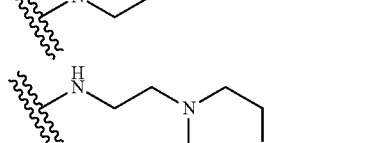

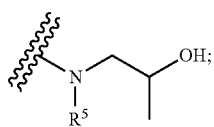

wherein each instance of $R^5$ is H or —N$^+$(=N—O$^-$)O$^-$.

21. The hyperbranched NO donating compound of any one of embodiments 13 to 20, further comprising an end group selected from the group consisting of:

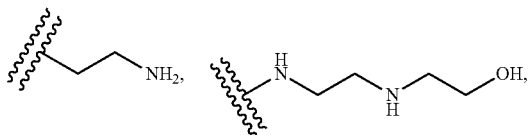

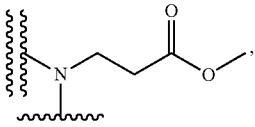

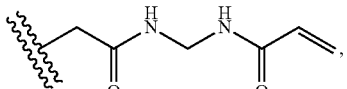

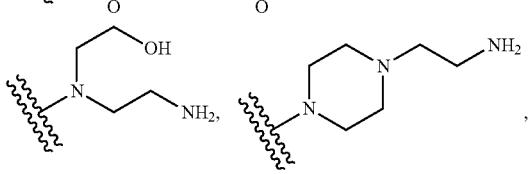

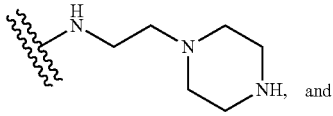

22. The hyperbranched NO donating compound of any one of embodiments 13 to 21, further comprising one or more of the following groups:

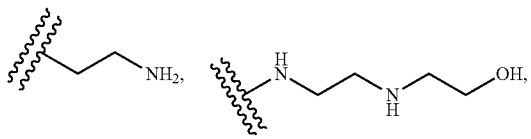

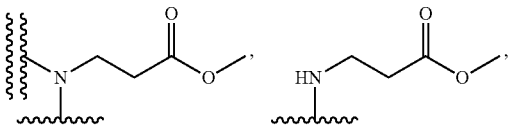

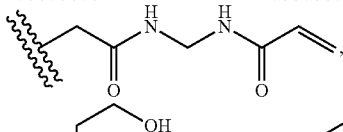

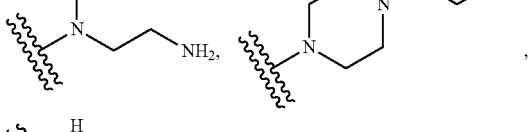

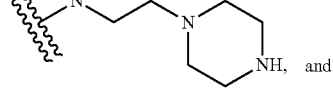

-continued

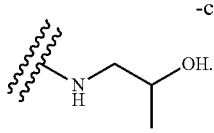

23. The hyperbranched NO donating compound of any one of embodiments 13 to 22, wherein the hyperbranched structure lacks a dendritic core having any symmetric dendrons.
24. The hyperbranched NO donating compound of any one of embodiments 13 to 23, wherein the hyperbranched compound does not comprise an aminoglycoside or glycoside unit.
25. The hyperbranched NO donating compound of any one of embodiments 13 to 24, wherein each instance of an optional substitution is selected from $C_1$-$C_6$ alkyl or —OH.
26. The hyperbranched NO donating compound of any one of embodiments 1 to 25, wherein the hyperbranched compound includes a dendritic unit, a linear unit, and a terminal unit, the dendritic unit comprising a tertiary amine, the linear unit comprising a secondary amine, and the terminal unit comprising a primary amine.
27. The hyperbranched NO donating compound of any one of embodiments 1 to 26, wherein the N-diazeniumdiolate exhibits intramolecular hydrogen bonding with the primary amine of the terminal unit.
28. The hyperbranched NO donating compound of any one of embodiments 1 to 27, wherein the portion of the amines modified by the N-diazeniumdiolate moieties are secondary amines.
29. The hyperbranched NO donating compound of any one of embodiments 1 to 28, wherein the compound comprises at least about 2% by weight NO.
30. The hyperbranched NO donating compound of any one of embodiments 1 to 29, wherein the composition comprises at least about 1 μmol of NO per mg of the compound as measured by real-time NO release in PBS (10 mM, pH 7.4, 37° C.).
31. The hyperbranched NO donating compound of any one of embodiments 1 to 30, wherein the compound comprises at least about 2 μmol of NO per mg of the compound as measured by real-time NO release in PBS (10 mM, pH 7.4, 37° C.).
32. The hyperbranched NO donating compound of any one of embodiments 1 to 31, wherein the composition comprises greater than about 2 μmol of NO per mg of the copolymer as measured by real-time NO release in PBS (10 mM, pH 7.4, 37° C.).
33. The hyperbranched NO donating compound of any one of embodiments 1 to 32, wherein the compound includes hydroxy moieties.
34. The hyperbranched NO donating compound of embodiment 33, wherein the hydroxy moieties are linked to amine moieties through alkyl moieties such that the amine moieties are secondary amines.
35. The hyperbranched NO donating compound of any one of embodiments 1 to 34, wherein the hyperbranched compound has a weight-average molecular weight (MW) of between about $2 \times 10^3$ g mol$^{-1}$ and about $15 \times 10^3$ g mol$^{-1}$ as determined through size exclusion chromatography with a multi-angle light scattering (SEC-MALS) detector.
36. The hyperbranched NO donating compound of any one of embodiments 1 to 34, wherein the hyperbranched compound has a weight-average molecular weight (MW) of between about $3 \times 10^3$ g mol$^{-1}$ and about $10 \times 10^3$ g mol$^{-1}$ as determined through size exclusion chromatography with a multi-angle light scattering (SEC-MALS) detector.
37. The hyperbranched NO donating compound of any one of embodiments 1 to 36, wherein the hyperbranched compound has a weight-average molecular weight (MW) of between about $3 \times 10^3$ g mol$^{-1}$ and about $6 \times 10^3$ g mol$^{-1}$ as determined through size exclusion chromatography with a multi-angle light scattering (SEC-MALS) detector.
38. A method for preparing the hyperbranched NO donating compound of any one of embodiments 1 to 37, comprising:
contacting an acrylate with a nucleophilic agent to form a hyperbranched compound.
39. The method of embodiment 38, wherein the acrylate is a monoacrylate, a diacrylate, a triacrylate, or a tetraacrylate.
40. The method of embodiment 38 or 39, wherein the nucleophilic agent is a bifunctional, trifunctional, or tetrafunctional molecule.
41. The method of any one of embodiments 38 to 40, wherein the nucleophilic agent comprises H—$R_h$N($R_e$)$R_f$—(N($R_e$))$_n$($R_g$O—)$_m$$R_h$—H;
wherein each instance of $R_e$ is independently —H, an optionally substituted $C_1$-$C_6$ alkyl group, or an optionally substituted polyether having 1 to 6 repeat units;
wherein each instance of $R_h$ is a single bond or an optionally substituted $C_1$-$C_6$ alkylene group; and
wherein $R_f$ and $R_g$ are independently optionally substituted $C_1$-$C_6$ alkylene groups.
42. The method of any one of embodiments 38 to 41, wherein the nucleophilic agent comprises one or more of H$_2$N—((CH$_2$)$_a$NH)$_b$—H, H$_2$N—((CH$_2$)$_a$NH)$_b$—(CH$_2$)$_c$H, H$_2$N—((CH$_2$)$_a$X$^5$)$_b$—(CH$_2$)$_c$H, and HX$^5$—((CH$_2$)$_a$X$^6$)((CH$_2$)$_b$X$^7$)$_d$—(CH$_2$)$_e$H;
where each instance of a, b, c, d, or e is independently selected from an integer from 0 to 10; and
where each instance of X$^5$, X$^6$, and X$^7$ is independently selected from O, S, or NH.
43. The method of any one of embodiments 38 to 42, wherein the nucleophilic agent comprises one or more of H$_2$NCH$_2$CH$_2$NHCH$_2$CH$_2$NH$_2$, H$_2$NCH$_2$CH$_2$NHCH$_2$CH$_2$OH, and 44. The method any one of embodiments 38 to 43, wherein the acrylate comprises one or more of N,N'-methylene bis(acrylamide), ethylene glycol diacrylate, propane diol diacrylate, butandiol diacrylate, trimethylolpropane triacrylate, pentaerythritol triacrylate, pentaerythritol triacrylate, glycerol propoxylate (1PO/OH) triacrylate, or trimethylolpropanepropoxylatetriacrylate.
45. The method any one of embodiments 38 to 44, wherein the acrylate comprises one or more of the following structures:

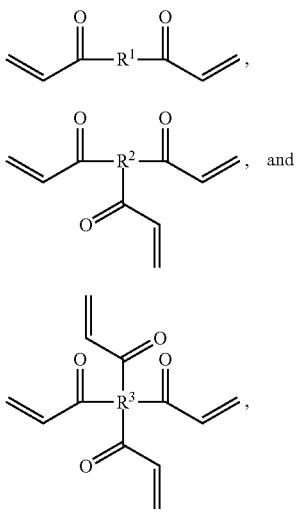

wherein R$^1$, R$^2$, and R$^3$ are independently selected from the group consisting of —R$_b$N(R$_c$)R$_a$—(N(R$_c$))$_n$—R$_b$—, —R$_b$(OR$_d$—)$_n$O—R$_b$—, and C$_1$-C$_6$ alkyl;
wherein each instance of R$_c$ is independently selected from a NO donating moiety, —H, an optionally substituted C$_1$-C$_6$ alkyl group, or an optionally substituted polyether having 1 to 6 repeat units;
wherein R$_b$ is a single bond or an optionally substituted C$_1$-C$_6$ alkylene group; wherein R$_d$ is an optionally substituted C$_1$-C$_6$ alkylene group;
wherein n is an integer selected from 0, 1, 2, 3, 4, 5, or 6;
wherein, where R$^2$ is present, at least one instance of R comprises the —C(O)—CH═CH$_2$ group;
wherein, where R$^3$ is present, at least one instance of carbon of R$_d$ comprises the —C(O)—CH═CH$_2$ groups.

46. The method of embodiment 45, wherein the acrylate is N,N'-methylenebis(acrylamide).
47. The method of any one of embodiments 38 to 46, further comprising exposing the hyperbranched compound to a NO source to provide the hyperbranched NO donating compound.
48. The method of embodiment 47, wherein the NO exposing step is carried out in alkaline conditions.
49. The method of any one of embodiments 38 to 48, wherein a molar ratio of the nucleophile to acrylate is between about 2:1 and about 5:1.
50. The method of any one of embodiments 38 to 48, wherein a molar ratio of the amine to acrylate is between about 3:1 and about 4:1.
51. A method of decreasing microbial contamination comprising, contacting a surface contaminated with a plurality of microbes with a compound comprising:
a hyperbranched NO donating compound as recited in any one of embodiments 1 to 37;
wherein the nitric oxide donor generates nitric oxide and induces damage to the membrane and/or DNA of the microbes, thereby reducing the number of viable microbes.
52. The method of embodiment 51, wherein said plurality of microbes comprises one or more viruses, gram positive bacteria, gram negative bacteria, drug resistant bacteria, molds, yeasts, fungi, and combinations thereof.
53. The method of embodiment 51 or 52, wherein the surface is an organic surface.
54. The method of any one of embodiments 51 to 53, wherein the surface is human skin or animal skin.
55. The method of any one of embodiments 51 to 54, wherein the surface is in the mouth.
56. The method of any one of embodiments 51 to 55, wherein said application does not induce skin irritation.
57. The method of embodiment 51 or 52, wherein the surface an inorganic surface.
58. The method of embodiment 57, wherein the inorganic surface is an external or internal surface of a medical device.
59. The method of embodiment 58, wherein application of the device is a dental device.
60. The method of any one of embodiments 51 to 59, wherein the microbial load comprises drug-resistant bacteria.
61. The method of any one of embodiments 51 to 60, wherein the microbial load comprises one or more dental pathogens.
62. The method of any one of embodiments 51 to 61, wherein the microbial load comprises one or more of *P. aeruginosa, S. aureus P. gingivalis, A. actinomycetemcomitans, A. viscosus*, and/or *S. mutans*.
63. A method of treating and/or preventing dental caries, the method comprising:
contacting the surface of a patient's mouth that is contaminated with one or more dental pathogens with the compound of any one of embodiments 1 to 37;
wherein the nitric oxide donor generates nitric oxide and induces damage to the membrane and/or DNA of the pathogens, thereby reducing the number of viable pathogens.
64. The method of embodiment 63, wherein the microbial load comprises one or more of *P. aeruginosa, S. aureus P. gingivalis, A. actinomycetemcomitans, A. viscosus*, and/or *S. mutans*.
65. Use of the compound of any one of embodiment 1 to 37 in the preparation of a medicament for decreasing microbial contamination, the compound comprising,
a nitric oxide releasing hyperbranched polyaminoglycoside;
wherein the nitric oxide donor generates nitric oxide and induces damage to the membrane and/or DNA of the microbes, thereby reducing the number of viable microbes.
66. The use of embodiment 65, wherein said compound is formulated to treat a plurality of microbes comprising one or more of viruses, gram positive bacteria, gram negative bacteria, drug resistant bacteria, molds, yeasts, fungi, and combinations thereof.
67. The use of embodiment 65 or 66, wherein said compound is formulated to be delivered to an organic surface.
68. The use of any one of embodiments 65 to 67, wherein said compound is formulated to be delivered to human skin or animal skin.
69. The use of embodiment 68, wherein the surface is in the mouth.
70. The use of any one of embodiments 65 to 69, wherein said compound is formulated to be delivered to an inorganic surface.
71. The use of embodiment 70, wherein the surface is an external or internal surface of a medical device.

72. The use of embodiment 71, wherein the device is a dental device.
73. A polyamidoamine composition, comprising:
a hyperbranched co-polymer of an amine and an acrylate, wherein at least a portion of the amines are modified with N-diazeniumdiolate moieties.
74. The polyamidoamine composition of embodiment 73, wherein the hyperbranched co-polymer includes a dendritic unit, a linear unit, and a terminal unit, the dendritic unit comprising a tertiary amine, the linear unit comprising a secondary amine, and the terminal unit comprising a primary amine.
75. The polyamidoamine composition of embodiment 73 or 74, wherein the N-diazeniumdiolate exhibits intramolecular hydrogen bonding with the primary amine of the terminal unit.
76. The polyamidoamine composition of any one of embodiments 73 to 75, wherein the portion of the amines modified by the N-diazeniumdiolate moieties are secondary amines.
77. The polyamidoamine composition of any one of embodiments 73 to 76, wherein the amine is derived from a polyfunctional amine monomer having the following structure:
$H_2N-A_1-(NH)-A_2-NH_2$
wherein $A_1$ and $A_2$ are independently selected from alkyl moieties or hydrogen.
78. The polyamidoamine composition of any one of embodiments 73 to 77, wherein the acrylate is derived from the following monomer:

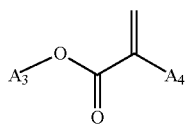

wherein $A_3$ and $A_4$ are independently selected from alkyl moieties or hydrogen.
79. The polyamidoamine composition of any one of embodiments 73 to 78, wherein the composition comprises at least about 2% by weight NO.
80. The polyamidoamine composition of any one of embodiments 73 to 79, wherein the composition comprises at least about 1 µmol of NO per mg of the copolymer as measured by real-time NO release in PBS (10 mM, pH 7.4, 37° C.).
81. The polyamidoamine composition of any one of embodiments 73 to 80, wherein the composition comprises at least about 2 µmol of NO per mg of the copolymer as measured by real-time NO release in PBS (10 mM, pH 7.4, 37° C.).
82. The polyamidoamine composition of any one of embodiments 73 to 81, wherein the composition comprises greater than about 2 µmol of NO per mg of the copolymer as measured by real-time NO release in PBS (10 mM, pH 7.4, 37° C.).
83. The polyamidoamine composition of any one of embodiments 73 to 81, wherein the co-polymer further includes hydroxy moieties.
84. The polyamidoamine composition of embodiment 83, wherein the hydroxy moieties are linked to amine moieties through alkyl moieties such that the amine moieties are secondary amines.
85. The polyamidoamine composition of any one of embodiments 73 to 84, wherein a molar ratio of the amine to acrylate is between about 2:1 and about 5:1.
86. The polyamidoamine composition of any one of embodiments 73 to 85, wherein a molar ratio of the amine to acrylate is between about 3:1 and about 4:1.
87. The polyamidoamine composition of any one of embodiments 73 to 86, wherein the hyperbranched copolymer has a weight-average molecular weight (MW) of between about $2 \times 10^3$ g mol$^{-1}$ and about $15 \times 10^3$ g mol$^{-1}$ as determined through size exclusion chromatography with a multi-angle light scattering (SEC-MALS) detector.
88. The polyamidoamine composition of any one of embodiments 73 to 87, wherein the hyperbranched copolymer has a weight-average molecular weight (MW) of between about $3 \times 10^3$ g mol$^{-1}$ and about $10 \times 10^3$ g mol$^{-1}$ as determined through size exclusion chromatography with a multi-angle light scattering (SEC-MALS) detector.
89. The polyamidoamine composition of any one of embodiments 73 to 88, wherein the hyperbranched copolymer has a weight-average molecular weight (MW) of between about $3 \times 10^3$ g mol$^{-1}$ and about $6 \times 10^3$ g mol$^{-1}$ as determined through size exclusion chromatography with a multi-angle light scattering (SEC-MALS) detector.
90. The polyamidoamine composition of any one of embodiments 73 to 89, wherein the hyperbranched co-polymer of a polyfunctional amine and an acrylate is soluble in water at a level greater than about 1 mg/mL, about 10 mg/mL, about 20 mg/mL, about 50 mg/mL or about 100 mg/mL.
91. The polyamidoamine composition of any one of embodiments 73 to 90, wherein the acrylate is derived from a monomer selected from the salt, ester, and conjugate bases of acrylic acid and its derivatives.
92. The polyamidoamine composition of any one of embodiments 73 to 91, wherein the acrylate is derived from a monomeric methacrylate.
93. The polyamidoamine composition of any one of embodiments 73 to 92, wherein the acrylate is derived from a monomer selected from the group consisting of a methyl acrylate, ethyl acrylate, methyl methacrylate, acrylamide, ethyl methacrylate, 2-chloroethyl vinyl ether, 2-ethylehexyl acrylate, hydroxyethyl methacrylate, hydroxyethyl acrylate, butyl acrylate, butyl methacrylate, N-(2-hydroxypropyl)methacrylamide, N-(3-Aminopropyl)methacrylamide hydrochloride, N-(3-BOC-aminopropyl)methacrylamide, 2-Aminoethyl methacrylate hydrochloride, 2-(tert-Butylamino)ethyl methacrylate, n-iso-propylacrylamide, 2-methoxyethyl acrylate, n-ethylmethacrylamide, n-vinyl acetamide, 2-N-morpholinoethyl acrylate, methacryloyl-L-Lysine, 2-(methylamino)ethyl acrylate, and 2-(methylamino) ethyl methacrylate.
94. The polyamidoamine composition of any one of embodiments 73 to 93, wherein the acrylate is derived from a diacrylate.
95. The polyamidoamine composition of embodiment 94, wherein the diacrylate is selected from the group consisting of ethylene glycol diacrylate, triethylene glycol diacrylate, tetraethylene glycol diacrylate, polyethylene glycol diacrylate, tricyclodecan dimethanol diacrylate, N-acryloxysuccinimide, N-(2-hydroxypropyl)

methacrylamide, Bis[2-(methacryloyloxy)ethyl] phosphate, diacrylamide, and N,N'-methylenebisacrylamide.

96. The polyamidoamine composition of any one of embodiments 73 to 95, wherein the amine is derived from diethylenetriamine.

97. The polyamidoamine composition of any one of embodiments 73 to 96, wherein the amine is derived from a monomer selected from the group consisting of ethylenediamine, diethylenetriamine, triethylenetetramine, tetraethylenepentamine, pentaethylenehexamine, polyetheramine (e.g., JEFFAMINE®), and bis(hexamethylene)triamine.

98. The polyamidoamine composition of any one of embodiments 73 to 97, wherein the hyperbranched co-polymer, upon release of NO, exhibits characteristics consistent with the following: $^1$H NMR: (400 MHz, CD$_3$OD, δ): 2.22-2.90 (COCH$_2$, NHCH$_2$, and NH$_2$CH$_2$), 3.15-3.58 (CONCH$_2$), 3.60 (CH$_3$O). $^{13}$C (600 MHz, CD$_3$OD, δ): 30-60 (CH$_2$ and CH$_3$), 170-175 (C=O). FTIR (cm$^{-1}$): 3308 (NH$_2$), 2957 (CH$_2$), 2848 (CH$_2$), 1647 (C=O), and 1556 (NH).

99. The polyamidoamine composition of any one of embodiments 73 to 98, wherein the hyperbranched co-polymer has a polydispersity index (PDI) of greater than about 1.1.

100. The polyamidoamine composition of any one of embodiments 73 to 99, wherein the hyperbranched co-polymer has a polydispersity index (PDI) of between 1.1 and 2.

101. The polyamidoamine composition of any one of embodiments 73 to 100, wherein the hyperbranched co-polymer has a polydispersity index (PDI) of between 1.5 and 1.9.

102. A polyamidoamine hyperbranched co-polymer comprising one or more dendritic units comprising one or more tertiary amines, a plurality of terminal units comprising a plurality of primary amines, and a plurality of linear units comprising a plurality of secondary amines, wherein at least a portion of the plurality of secondary amines are bound to a plurality N-diazeniumdiolate moieties.

103. The polyamidoamine hyperbranched co-polymer of embodiment 102, wherein at least a portion of the dendritic units include the following structure:

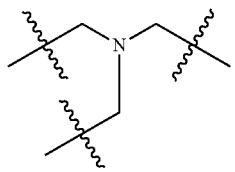 [SMILES: *CN(C*)C*]

and at least a portion of the plurality of linear units include a group selected from the following structures:

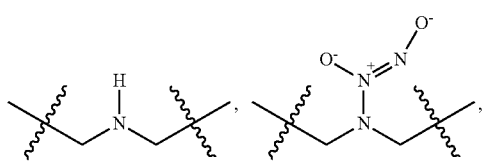

or a combination thereof.

104. The polyamidoamine hyperbranched co-polymer of embodiment 102 or 103, wherein at least a portion of the plurality of N-diazeniumdiolate moieties are stabilized by hydrogen bonding between oxygen of the N-diazeniumdiolate moieties and hydrogen of at least one of the plurality of primary amines.

105. A method of delivering nitric oxide to a subject, comprising:
administering an effective amount of the hyperbranched compound or polyamidoamine composition of any of the preceding claims to the subject.

106. A method of treating a disease state, comprising:
administering an effective amount of the hyperbranched compound or polyamidoamine composition of any of the preceding claims to a subject in need thereof, wherein said disease state is selected from the group consisting of a gingivitis, cancer, a cardiovascular disease, a microbial infection, platelet aggregation and platelet adhesion caused by the exposure of blood to a medical device, pathological conditions resulting from abnormal cell proliferation, transplantation rejections, autoimmune diseases, inflammation, vascular diseases, scar tissue, wound contraction, restenosis, pain, fever, gastrointestinal disorders, respiratory disorders, sexual dysfunctions, and sexually transmitted diseases.

107. A method of manufacturing a polyamidoamine composition comprising:
combining a polyfunctional amine with an acrylate monomer in an appropriate solvent to form a reaction mixture, mixing the reaction mixture for time sufficient for a significant proportion of the polyfunctional amine to react with the acrylate monomer to form a hyperbranched copolymer, heating the reaction mixture to complete polymerization and to remove unreacted monomers to form a base polyamidoamine composition, and mixing the base polyamidoamine composition under basic conditions with gaseous NO at high pressure for a time sufficient to yield N-diazeniumdiolate moeities on the polyamidoamine composition.

108. The method of embodiment 107, wherein the time sufficient for the significant proportion of the polyfunctional amine to react is greater than about 6 hours, between about 6 hours and about 2 weeks, between about 6 hours and 1 week, between about 12 hours and 5 days, or between about 1 day and about 3 days.

109. The method of embodiment 107 or 108, wherein the heating the reaction mixture to complete polymerization and to remove unreacted monomers includes heating under sub-atmospheric pressure.

110. The method of any one of embodiments 107 to 109, wherein the heating the reaction mixture to complete polymerization and to remove unreacted monomers includes heating to a first temperature of about 50° C. to about 70° C. for a first time of about 30 min to about 2 hours, heating to a second temperature of about 90° C. to about 110° C. for a second time of about 30 min to about 4 hours, heating to a third temperature of about 120° C. to about 150° C. for a third time of about 30 min to about 4 hours.

111. The method of any one of embodiments 107 to 110, wherein the heating the reaction mixture to complete polymerization and to remove unreacted monomers includes heating to a first temperature of about 60° C. to about 60° C. for a first time of about 1 hour, heating to a second temperature of about 100° C. for a second time of about 2 hours, heating to a third temperature of about 140° C. for a third time of about 2 hours.

112. The method of any one of embodiments 107 to 111, wherein the polyfunctional amine is selected from the group consisting of ethylenediamine, diethylenetriamine, triethylenetetramine, tetraethylenepentamine, pentaethylenehexamine, a polyetheramine, and bis(hexamethylene)triamine.

113. The method of embodiment 112, wherein the polyetheramine is a JEFFAMINE®.

114. The method of embodiment 113, wherein the JEFFAMINE® is selected from M-600, M-2005, M-1000, M-2070, D-230, D-400, D-2000, D-4000, ED-600 amine, ED-900 amine, ED-2003 amine, EDR-148 amine, EDR-176 amine, T-403 amine, T-3000 amine, T-5000 amine, THF-100 amine, THF-170 amine, XTJ568, XTA801, RFD-270, and XTJ-616.

115. The method of embodiment 112 or 113, wherein the polyetheramine comprises one of the following structures:

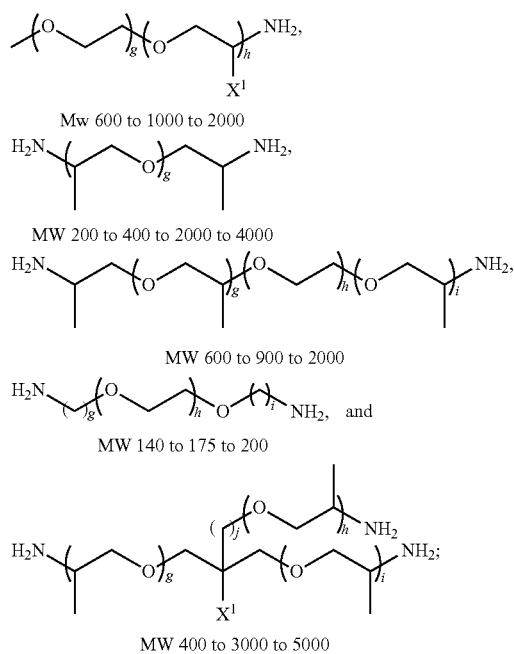

wherein g, h, i, and j are independently an integer from 1 to 100; and
wherein $X^1$ is as defined elsewhere herein or is an optionally substituted $C_{1-6}$ alkyl.

116. The method of any one of embodiments 107 to 115, wherein the acrylate monomer is selected from the group consisting of methyl acrylate, ethyl acrylate, methyl methacrylate, acrylamide, ethyl methacrylate, 2-chloroethyl vinyl ether, 2-ethylehexyl acrylate, hydroxethyl methacrylate, hydroxethyl acrylate, butyl acrylate, butyl methacrylate, N-(2-hydroxypropyl) methacrylamide, N-(3-Aminopropyl)methacrylamide-hydrochloride, N-(3-BOC-aminopropyl)methacrylamide, 2-Aminoethyl methacrylate hydrochloride, 2-(tert-Butylamino)ethyl methacrylate, n-isopropylacrylamide, 2-methoxyethyl acrylate, n-ethylmethacrylamide, n-vinyl acetamide, 2-N-morpholinoethyl acrylate, methacryloyl-L-Lysine, 2-(methylamino)ethyl acrylate, and 2-(methylamino) ethyl methacrylate.

117. The method of any one of embodiments 107 to 116, wherein the appropriate solvent is an alcohol or mixture of alcohols.

118. The method of any one of embodiments 107 to 117, further comprising modifying the polyamidoamine composition with hydroxyl moieties by mixing the polyamidoamine composition with a hydroxy containing compound.

119. The method of embodiment 118, wherein the hydroxy containing compound an epoxide.

120. The method of embodiment 118, wherein the epoxide is propolyene oxide.

121. The method of claim any one of embodiments 107 to 120, wherein combining the polyfunctional amine with the acrylate monomer includes a molar ratio of amine to acrylate of between about 2:1 and about 5:1.

122. The method of claim any one of embodiments 107 to 121, wherein combining the polyfunctional amine with the acrylate monomer includes a molar ratio of amine to acrylate of between about 3:1 and about 4:1.

123. The method of any one of embodiment 107 to 122, wherein the method forms a hyperbranched compound or polyamidoamine composition according to any of the preceding claims.

The present invention is further defined in the following Examples. It should be understood that these Examples, while indicating preferred embodiments of the invention, are given by way of illustration only.

EXAMPLES

The NO-release properties (i.e., payloads and release kinetics) of h-PAMAM were evaluated as a function of chemical modifications. The potential of this scaffold as an oral therapeutic was assessed in terms of antibacterial activity to common dental pathogens and toxicity to human gingival fibroblast cells. It is understood that studying Gram-negative and Gram-positive antibacterial activity in the context of oral health informs uses of these compounds in a broader category of applications. Lastly, the properties of h-PAMAM derivatives were compared to G3-PAMAM counterparts with respect to therapeutic potential.

Example 1: Synthesis of Hyperbranched Polyamidoamines

Hyperbranched polyamidoamines (h-PAMAM) were prepared using a one-pot reaction and similar molecular weight to third generation PAMAM (G3-PAMAM) dendrimers, followed by functionalization with N-diazeniumdiolate nitric oxide (NO) donors.

Materials and Methods

Ethylene diamine (EDA), diethylene triamine (DETA), methyl acrylate (MA), propylene oxide (PO), 3-(4,5-dimethylthiazol-2-yl)-5-(3-carboxymethoxyphenyl)-2-(4-sulfophenyl)-2H-tetrazolium inner salt (MTS), and Dulbecco's phosphate-buffered saline (DPBS) for cell culture were purchased from Sigma-Aldrich (St. Loius, MO.). *Streptococcus mutans* (ATCC #25715), *Actinomyces viscosus* (ATCC #15987), and *Aggregatibacter actinomycetemcomitans* (ATCC #43717) were purchased from the American Type Culture Collection (Manassas, VA., USA). *Porphy-* romonas gingivalis strain A7436 was provided by the UNC School of Dentistry, Chapel Hill, NC. CDC anaerobe 5 vol % sheep blood agar, brain heart infusion (BHI) broth and agar, and GasPak™ EZ campy container system sachets were purchased from Becton, Dickinson, and Company (Franklin Lakes, NJ). Wilkins-Chalgren (W-C) broth was purchased from Acumeida Neogen Corporation (Lansing, MI). Human gingival fibroblast cell line and FibroLife fibroblast serum-free media were purchased from Lifeline Cell Technology LLC (Frederick, MD). Pure nitric oxide (99.5%), argon, nitrogen, and nitric oxide calibration (25.87 ppm in nitrogen) were purchased from Airgas (Durham, NC). Common laboratory salts and solvents were purchased from Fisher Scientific (Pittsburgh, PA). Water was purified using a Millipore Milli-Q UV Gradient A10 System (Bethlehem, PA) to a final resistivity of 18.2 MΩ cm and total organic content of ≤10 ppb. Third generation polyamidoamine (G3-PAMAM) dendrimer was prepared by repeated alkylation and amidation reactions using MA/EDA monomer from an EDA core.

Proton nuclear magnetic resonance (1H NMR) spectra were recorded on a 400 MHz Bruker spectrometer. Carbon nuclear magnetic resonance (13C NMR) spectra were collected on a 600 MHz Bruker instrument. Size exclusion chromatography with multi-angle light scattering (SEC-MALS) was used to determine the molecular weight and polydispersity of polymer. The eluent (PBS, 0.01% azide, pH 7.4) was passed through a miniDawn TREOS multi-angle light scattering detector (Wyatt Technology; Santa Barbara, CA) coupled to a Waters 2414 refractive index detector (Waters Chromatography; Milford, MA).

Synthesis of Hyperbranched Polyamidoamine (h-PAMAM)

heated to 60° C. for 1 h, 100° C. for 2 h, 120° C. for 2 h, and 140° C. for 2 h under a rotary evaporator to finish polymerization and remove unreacted monomer. The product (i.e., h-PAMAM) was a yellow oil. The h-PAMAM was re-dissolved in methanol at 100 mg mL$^{-1}$ and stored in the freezer until future use. The h-PAMAM was characterized using $^1$H NMR, $^{13}$C NMR, and FTIR with peaks as follows. $^1$H NMR: (400 MHz, CD$_3$OD, δ): 2.22-2.90 (COCH$_2$, NHCH$_2$, and NH$_2$CH$_2$), 3.15-3.58 (CONCH$_2$), 3.60 (CH$_3$O). $^{13}$C (600 MHz, CD$_3$OD, δ): 30-60 (CH$_2$ and CH$_3$), 170-175 (C=O). FTIR (cm$^{-1}$): 3308 (NH$_2$), 2957 (CH$_2$), 2848 (CH$_2$), 1647 (C=O), and 1556 (NH).

Characterization

The free primary amine content of h-PAMAM was determined using ninhydrin assay. Briefly, the 2 wt % ninhydrin stock solution was prepared freshly before use by dissolving 0.2 g of ninhydrin in a mixture of 7.5 mL of DMSO and 2.5 mL of a 0.2 M sodium acetate buffer (pH 5.4). For the experiment, 2 mg of h-PAMAM was dissolved in 1 mL of sodium acetate buffer and mixed with 0.5 mL of ninhydrin stock solution. This solution was heated to 100° C. for 5 min, cooled to room temperature, and diluted 10-fold in ethanol. The absorbance was measured at 570 nm using a UV-vis Lambda 40 spectrophotometer (PerkinElmer; Waltham, MA) and compared to G3-PAMAM standard solutions prepared identically. Diethyl amine was also examined by the ninhydrin assay to investigate the potential influence of secondary amine functionalities. The results indicated that the iminium salts, product from the reaction between secondary amines and ninhydrin reagent, had negligible absorbance at 570 nm, suggesting minimal effects from the secondary amines of h-PAMAM.

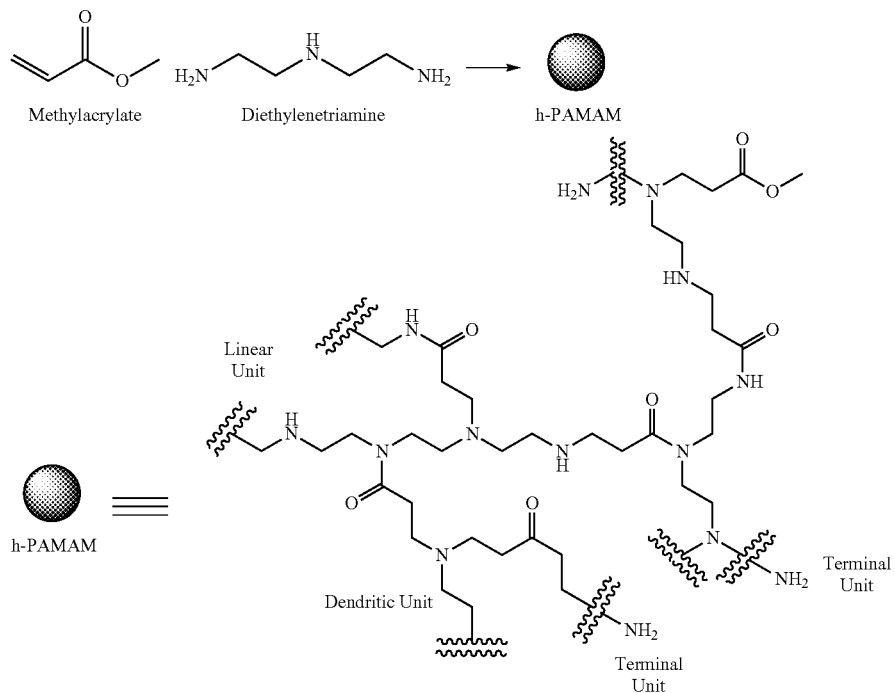

Hyperbranched polyamidoamine (h-PAMAM) polymer was synthesized by the polymerization of diethylenetriamine and methyl acrylate. Briefly, DETA (6.8 mL; 0.06 mol) and MA (6.8 mL; 0.072 mol) were mixed in methanol (10 mL) and stirred for 2 d. The reaction mixture was then Size exclusion chromatography with a multi-angle light scattering (SEC-MALS) detector indicated that the weight-average molecular weight (MW) of h-PAMAM polymer was 6.39×10$^3$ g mol$^{-1}$ with PDI of 1.89. Third generation PAMAM (G3-PAMAM; theoretical molecular weight of 6909 g mol$^{-1}$) dendrimer was also prepared to investigate the influence of architecture on the properties of PAMAM scaffolds independent of molecular weight. The measured MW of G3-PAMAM dendrimer was 7.19×10$^3$ g mol$^{-1}$ with PDI of 1.04. Relative to G3-PAMAM dendrimer (i.e., 32 primary amines per scaffold), the h-PAMAM polymer contained fewer primary amine groups (~8 primary amines per scaffold). As noted in FIG. 1, h-PAMAM polymer is composed of dendritic, linear, and terminal units. The linear units induce structural defects, decreasing the number of exterior primary amines while increasing secondary amines along the polymer backbone. In contrast, structurally perfect G3-PAMAM dendrimer (or substantially defect-free or substantially perfect) consists of dendritic and terminal units attached to a core.

Figure 2A:
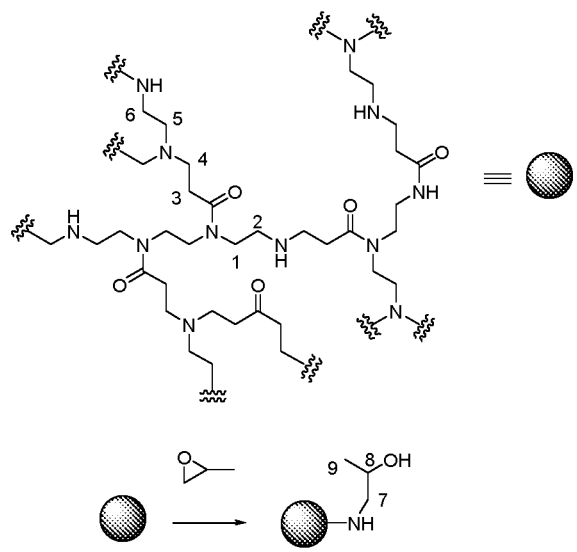
FIG. 2a is a schematic representation of non-limiting embodiments of the structure of a hyperbranched PAMAM with and without hydroxyl terminations.
Figure 2B:
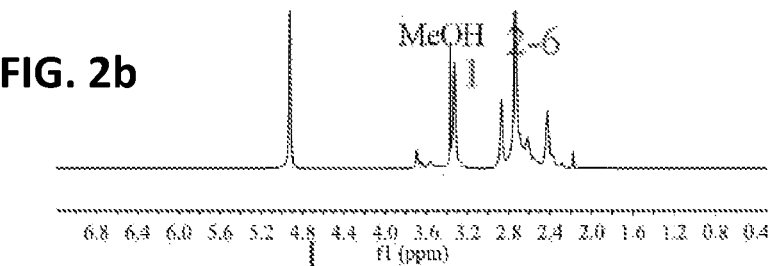
Figure 2C:
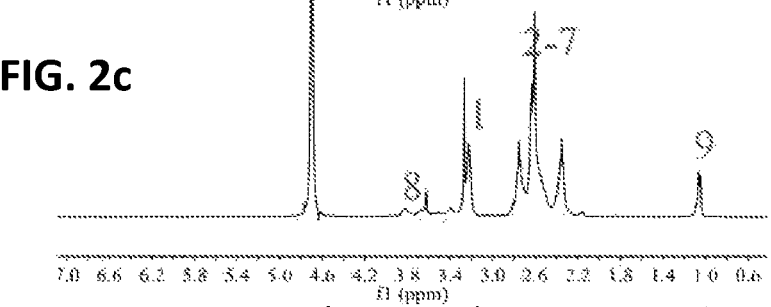
Figure 2D:
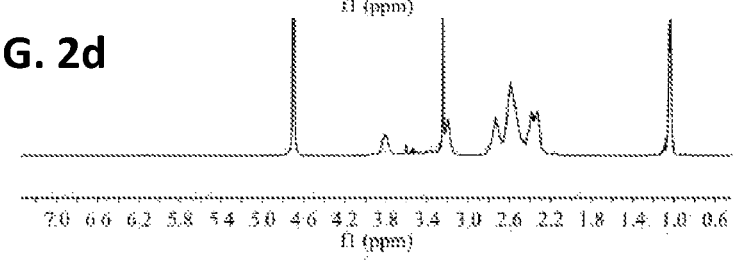
Figure 2E:
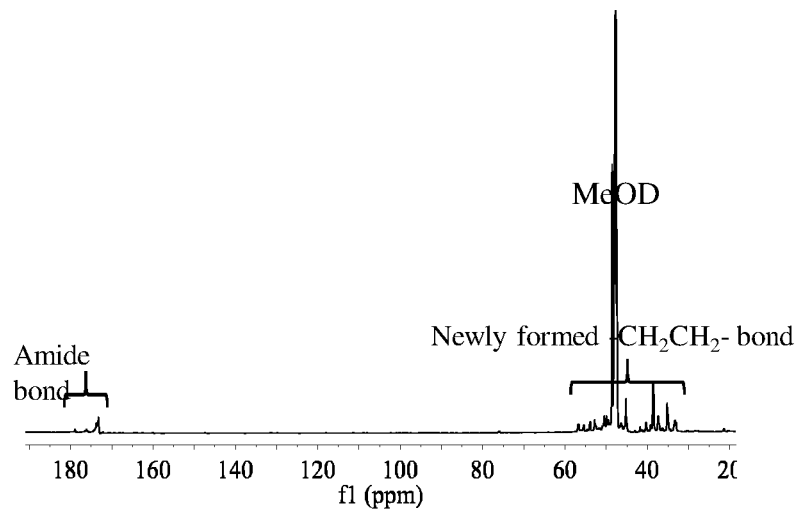
FIG. 2e is a $^{13}$C NMR of h-PAMAM and FIG. 2f is an FTIR for h-PAMAM.
Figure 2F:
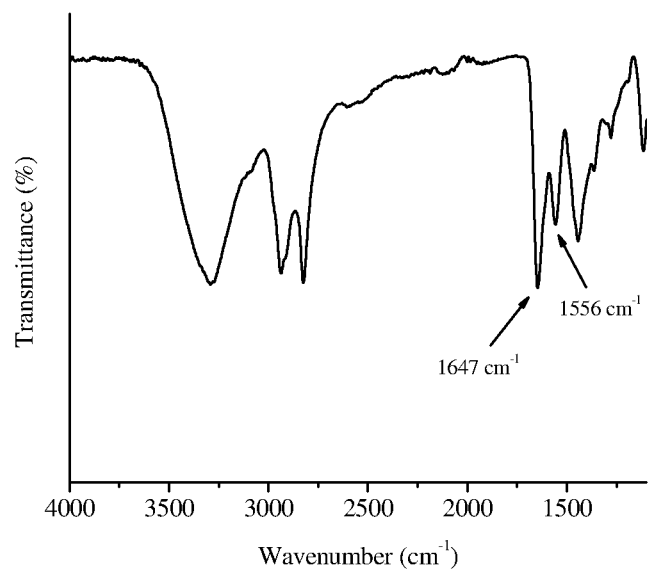

As shown in FIG. 2(b), $^1$H NMR showed the appearance of a broad peak at 2.22 to 2.90 ppm, along with the disappearance of peaks at 5.80 ppm to 6.60 ppm (not shown), indicating the consumption of vinyl groups from methyl acrylate during the reaction. FIG. 2(e) shows the $^{13}$C NMR for the hyperbranched structure and provided evidence for the formation of amide bond (170-180 ppm) and —CH$_2$CH$_2$-bond (30-60 ppm) in different chemical environment, and confirmed the disappearance of the vinyl groups (120-140 ppm; not shown). As shown in FIG. 2(f), FTIR spectrum showed strong peaks at 1647 cm$^{-1}$ and 1556 cm$^{-1}$ that assigned to the amide bond, further confirming the success in synthesizing h-PAMAM.

Example 2: h-PAMAM Propylene Oxide Functionalization

Synthesis of Propylene Oxide-Modified PAMAM Scaffolds

Secondary amine-modified PAMAM scaffolds (including h-PAMAM and G3-PAMAM) were synthesized as disclosed above. To enhance NO payloads, the primary amines of h-PAMAM polymer (~8 primary amines per scaffold) were modified with one molar equivalent of propylene oxide (PO) via a ring opening reaction, yielding h-PAMAM-PO-1. For the comparative study, h-PAMAM polymer and G3-PAMAM dendrimer were modified with one molar equivalent of PO with respect to the primary amines of G3-PAMAM dendrimer (32 primary amine per scaffold), yielding h-PAMAM-PO-2 and G3-PAMAM-PO, respectively. In this manner, the impact of exterior modification on NO release properties (e.g., payloads and release kinetics) of h-PAMAM polymer could also be studied. To provide additional secondary amines, 300 mg of h-PAMAM was reacted with 24 µL of propylene oxide (PO) (i.e., 1 equivalent amount with respect to the molar amount of primary amines of h-PAMAM), yielding h-PAMAM-PO-1. To achieve comparable NO-release properties, 300 mg of h-PAMAM or G3-PAMAM was reacted with 97 µL of PO (i.e., 1 equivalent amount with respect to the molar amount of primary amines of G3-PAMAM), yielding h-PAMAM-PO-2 or G3-PAMAM-PO. The reagents were mixed in 6 mL of methanol and stirred for 3 days. Unreacted PO and solvent were removed under reduced pressure. The PO modification was verified using $^1$H NMR spectroscopy. The PO modification was verified using $^1$H NMR spectroscopy. As shown in FIG. 2(c), the appearance of a distinct peak at 3.82 ppm was assigned to the protons adjacent to the hydroxyl group of the product (R$_2$CHOH).

Calculations were based on 2.5 active amino groups per monomer, and the conversions of total amino groups (both primary and secondary amines) were estimated to be ~11% and ~49% for h-PAMAM-PO-1 and h-PAMAM-PO-2, respectively, using the integration ratio of protons at 3.82 ppm to 2.2-3.60 ppm from $^1$H NMR. $^1$H NMR data of the resulting PO-modified PAMAM scaffolds consisted of the following peaks: h-PAMAM-PO-1 or h-PAMAM-PO-2 (400 MHz, D$_2$O, δ): 1.05 (NHCH$_2$CH(OH)CH$_3$), 2.22-2.90

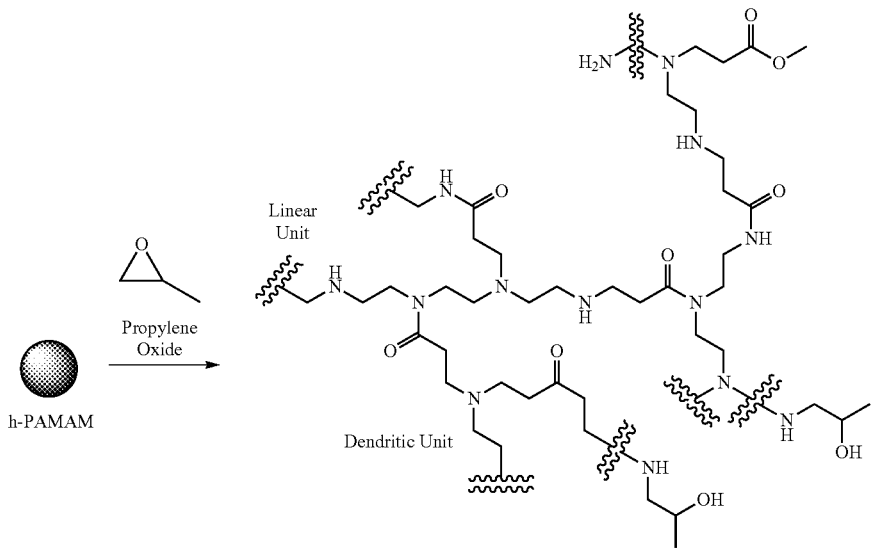

(COCH$_2$, NHCH$_2$, and NH$_2$CH$_2$), 3.15-3.58 (CONHCH$_2$), 3.60 (CH$_3$O), and 3.82 (NHCH$_2$CH(OH)CH$_3$). G3-PAMAM-PO consisted of the following peaks (400 MHz, D$_2$O, δ): 1.05 (NHCH$_2$CH(OH)CH$_3$), 2.37 (CH$_2$N(CH$_2$CH$_2$CO)$_2$), 2.38-2.78 (NCH$_2$, NHCH$_2$), 3.08-3.28 (CONHCH$_2$CH$_2$), and 3.82 (NHCH$_2$CH(OH)CH$_3$). According to the $^1$H NMR data, the conversion efficiencies for h-PAMAM-PO-1, h-PAMAM-PO-2, and G3-PAMAM-PO were estimated to be 11, 49, and 63%, respectively.

Example 3: h-PAMAM Nitric Oxide Functionalization

Synthesis of N-Diazeniumdiolate Nitric Oxide Donor-Modified Hyperbranched Scaffolds

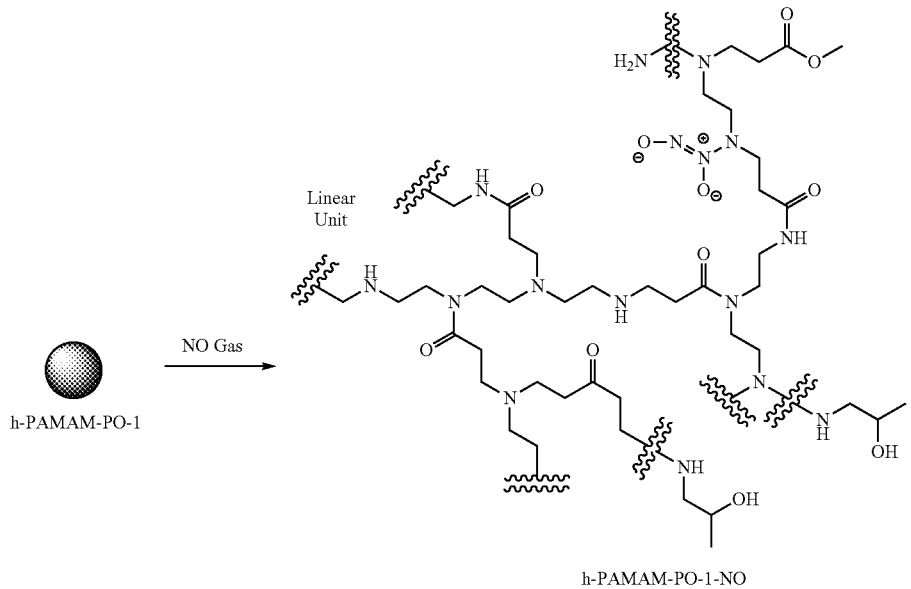

Figures 3A, 3B:
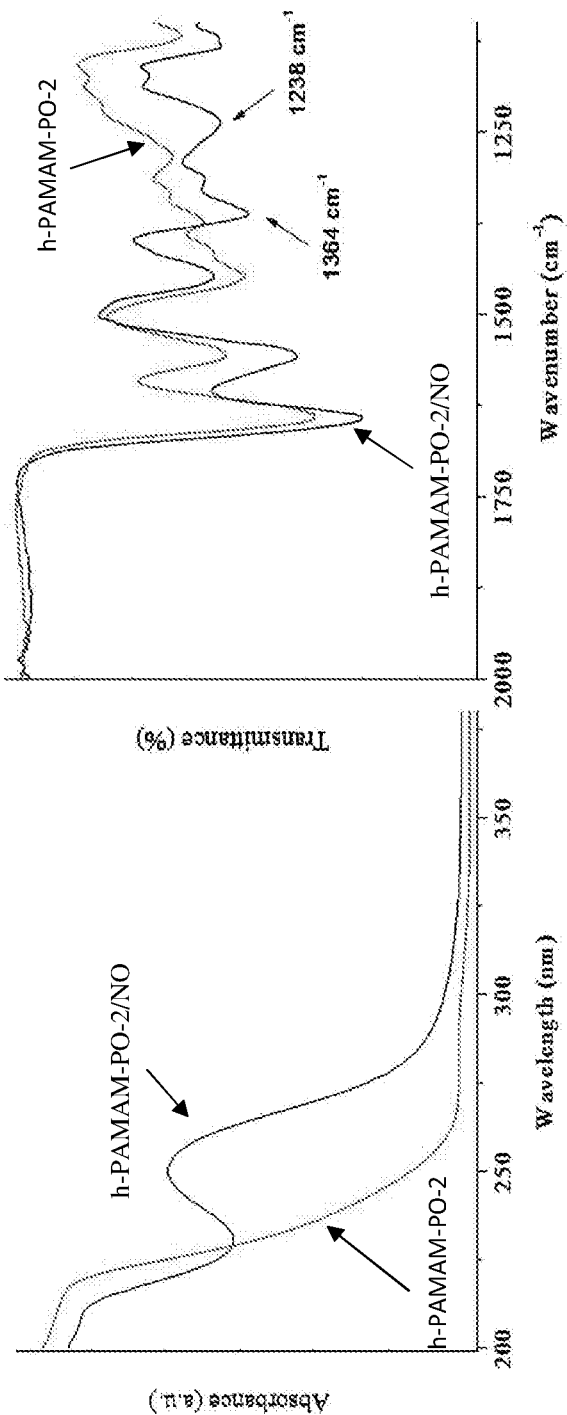
FIG. 3a shows representative UV-vis spectra.
FIG. 3b shows FTIR spectra for: h-PAMAM-PO-2/NO and h-PAMAM-PO-2.

The scaffolds containing secondary amines were exposed to high pressure of gaseous NO under basic conditions, yielding NO-releasing PAMAM, designated h-PAMAM/NO, h-PAMAM-PO-1/NO, h-PAMAM-PO-2/NO, and G3-PAMAM-PO/NO. Specifically, 50 mg of scaffold (h-PAMAM, h-PAMAM-PO-1, h-PAMAM-PO-2, or G3-PAMAM-PO) was combined with 50 µL of NaOMe (5.4 M in MeOH; approximately 1.2 equivalent molar amount relative to primary amines of G3-PAMAM) in 1 mL of anhydrous methanol. The solutions were placed in a Parr hydrogenation reactor and stirred continuously. The reactor was purged with argon 6 times to remove oxygen, and then pressurized to 10 atm with NO gas for 3 d to yield NO donor-modified systems (i.e., h-PAMAM/NO, h-PAMAM-PO-1/NO, h-PAMAM-PO-2/NO or G3-PAMAM-PO/NO). The reactor was then purged with argon to remove unreacted NO, and solvent removed under reduced pressure. The reaction of the PAMAM scaffolds with NO gas under high pressures (10 atm) and high pH (basic conditions) (e.g., in some embodiment, pH values of greater than or equal to about: 8, 9, 10, 11, 12, 13, 14, or ranges spanning and/or including the aforementioned values) yielded NO-releasing PAMAM, designated h-PAMAM/NO, h-PAMAM-PO-1/NO, h-PAMAM-PO-2/NO, and G3-PAMAM-PO/NO. Formation of N-diazeniumdiolate NO donor was verified by the appearance of a ~250 nm characteristic UV-vis peak (See FIG. 3a and FIG. 3b). FT-IR spectra also indicated O—N—N—O deformation (1350-1370 cm−1) and N—N stretching (1230-1250 cm−1) vibrations.

The NO-releasing materials were re-dissolved in anhydrous MeOH as 50 mg mL$^{-1}$ and stored at −20° C. until later use.

Characterization of Nitric Oxide Release

A wide range of NO storage capacities (~1-2.50 µmol mg−1) and NO-release kinetics ($t_{1/2}$ ~30-80 min) were achieved by changing the extent of propylene oxide (PO) modification. Real-time NO release data was measured in PBS (10 mM, pH 7.4, 37° C.). Nitric oxide-releasing PAMAM scaffolds (1 mg) in 20 µL of MeOH were added to deoxygenated 10 mM phosphate buffered saline (30 mL, pH 7.4) at 37° C. Nitrogen was bubbled through this solution at a flow rate of 70 mL min$^{-1}$ to carry the liberated NO to a Sievers chemiluminescence nitric oxide analyzer (Boulder, CO). Additional nitrogen flow was provided into the flask to match the collection rate of the instrument (200 mL min$^{-1}$). Real-time NO release profiles were recorded until the observed NO levels decreased to below 10 ppb mg$^{-1}$ scaffold.

As shown in Table 1, h-PAMAM-PO-1/NO stored the largest amount of NO (~2.50 µmol mg$^{-1}$), followed by h-PAMAM/NO (~2.16 µmol mg$^{-1}$). This resulted from a greater number of secondary amine groups of h-PAMAM-PO-1 via the PO modification. Indeed, approximately half of h-PAMAM's primary amines were converted to secondary amines upon formation of h-PAMAM-PO-1. Additional PO modification of the h-PAMAM (i.e., h-PAMAM-PO-2) began to consume secondary amines along the polymer backbone, as evidenced in $^1$H NMR spectra. The greater PO conversion efficiencies (11 and 49% for h-PAMAM-PO-1 and h-PAMAM-PO-2, respectively) actually resulted in lower NO totals (~1.33 µmol mg$^{-1}$) for h-PAMAM-PO-2/NO. The extent of PO modification also influenced NO-release kinetics, with faster NO release correlating with the extent of PO modification (Refer to FIG. 4). For example, h-PAMAM/NO (0% PO modification) exhibited the most extended NO release ($t_{1/2}$ ~80 min), while h-PAMAM-PO-2/NO (49% PO modification) released NO most rapidly ($t_{1/2}$ ~30 min). It is believed that N-diazeniumdiolate anions are stabilized by neighboring cationic amines through intramolecular hydrogen bonding (FIG. 1), the PO modification of these amines likely diminished such stabilization, resulting in faster NO release (i.e., lower half-lives).

TABLE 1

NO-release properties of N-diazeniumdiolate
NO donor-modified PAMAM polymers in physiological
buffer (PBS; 10 mM, pH 7.4, 37° C.).[a]

| PAMAM polymer | t[NO][b] (µmol mg$^{-1}$) | t[NO]$_{2h}$[c] (µmol mg$^{-1}$) | t$_{1/2}$[d] (min) |
|---|---|---|---|
| h-PAMAM/NO | 2.16 ± 0.24 | 1.30 ± 0.24 | 78 ± 5 |
| h-PAMAM-PO-1/NO | 2.50 ± 0.39 | 1.62 ± 0.21 | 57 ± 5 |
| h-PAMAM-PO-2/NO | 1.33 ± 0.17 | 1.08 ± 0.17 | 31 ± 7 |
| G3-PAMAM-PO/NO | 1.10 ± 0.21 | 0.96 ± 0.17 | 30 ± 6 |

[a]n ≥ 3 separate syntheses;
[b]Total NO storage per milligram scaffold;
[c]NO released amount for the initial 2 h;
[d]Half-life of NO release.

Figure 4:
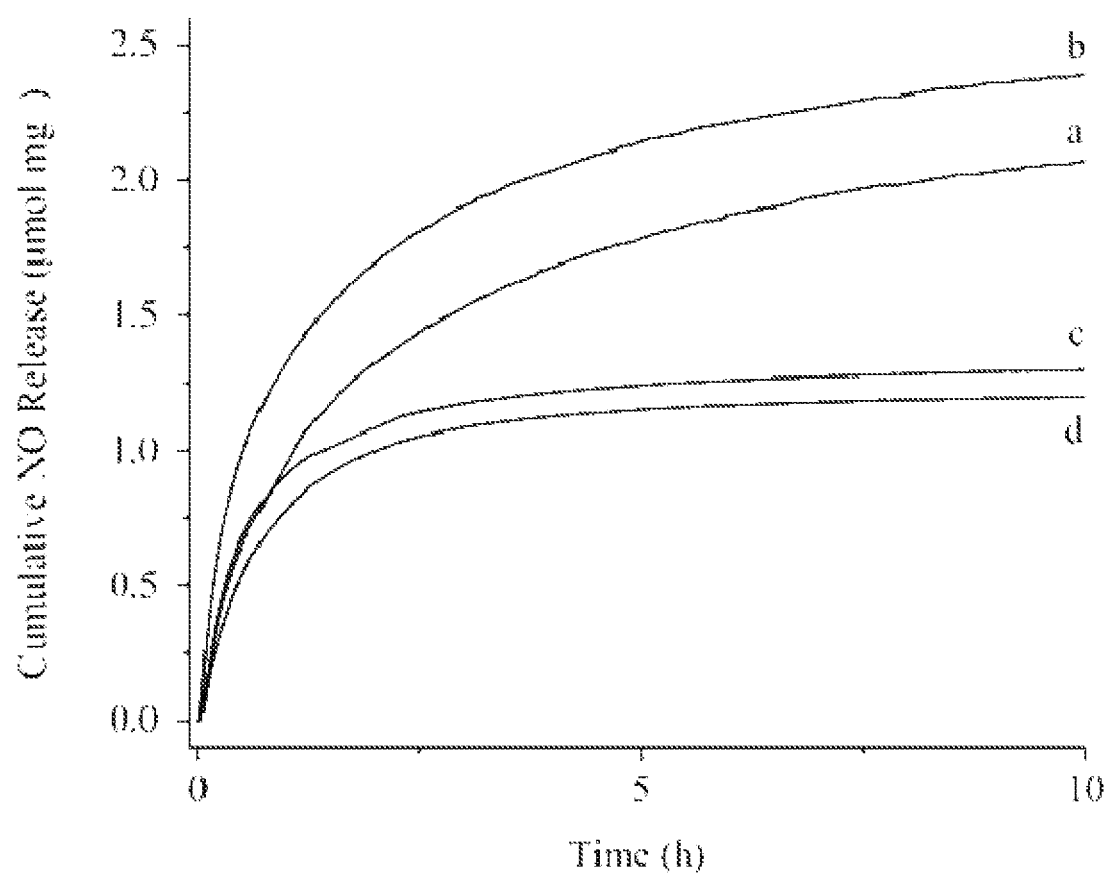
FIG. 4 is a graph showing on the x-axis time and on the y-axis the cumulative NO release from NO-releasing compounds according to several embodiments disclosed herein. They show, respectively, NO-release from (a) h-PAMAM/NO; (b) h-PAMAM-PO-1/NO; (c) h-PAMAM-PO-2/NO; (d) G3-PAMAM-PO/NO in PBS (10 mM, pH 7.4, 37° C.).

The NO-release properties of h-PAMAM-PO-2/NO and G3-PAMAM/NO were nearly identical (See FIG. 4 which shows the cumulative NO release from (a) h-PAMAM/NO; (b) h-PAMAM-PO-1/NO; (c) h-PAMAM-PO-2/NO; (d) G3-PAMAM-PO/NO in PBS (10 mM, pH 7.4, 37° C.).). In addition, the 2 h NO-release totals, corresponding to the dose of NO delivered during a 2 h bactericidal assay, were also comparable, allowing for a direct examination of PAMAM polymer structure (i.e., dendrimer vs. hyperbranched) on bactericidal action (Table 1).

In illustrative embodiments, the polyamidoamine composition comprises at least about 2% by weight NO. In one embodiment, the polyamidoamine composition may release at least about 1 µmol of NO per mg of the copolymer as measured by real-time NO release in PBS (10 mM, pH 7.4, 37° C.). In another embodiment, the composition comprises at least about 2 µmol of NO per mg of the copolymer as measured by real-time NO release in PBS (10 mM, pH 7.4, 37° C.). In another embodiment, the composition comprises greater than about 2 µmol of NO per mg of the copolymer as measured by real-time NO release in PBS (10 mM, pH 7.4, 37° C.).

Example 4: Planktonic Bactericidal Assays for h-PAMAM Structures

Planktonic Bactericidal Assays

The bactericidal activity of PAMAM scaffolds was evaluated against Gram-negative periodontal pathogens (*P. gingivalis* and *A. actinomycetemcomitans*) and Gram-positive cariogenic bacteria (*S. mutans* and *A. viscosus*). Assays were carried out over a 2 h period under static conditions. The minimum bactericidal concentration (MBC, mg mL$^{-1}$), corresponding to a 3-log reduction in bacterial viability, was used to determine and compare antibacterial efficacy of the materials against the bacteria. The bactericidal NO dose was derived by multiplying the corresponding MBC values with the amount of NO delivered over the 2 h exposure time (i.e., t[NO]$_{2h}$×30 g mol$^{-1}$) as measured in PBS by the NOA.

Planktonic bacteria (i.e., *P. gingivalis, A. actinomycetemcomitans, S. mutans,* and *A. viscosus*) were stored in 15 vol % glycerol PBS at −80° C. To perform the bactericidal assay, this frozen stock was incubated in BHI broth (W-C anaerobic broth for *P. gingivalis*) at 37° C. overnight. A 500 µL aliquot of this solution was added into fresh broth and incubated at 37° C. until the bacterial concentration reached 1×10$^8$ colony forming units per milliliter (CFU mL$^{-1}$), as determined by optical density (OD, 600 nm). *P. gingivalis* was cultured anaerobically in an atmosphere of 5 vol % CO$_2$, 10 vol % H$_2$, and 85 vol % N$_2$. *A. actinomycetemcomitans* and *A. viscosus* were cultured under a microaerophilic environment (6-16 vol % O$_2$ and 2-10 vol % CO$_2$) in a GasPak EZ Campy Container System (Becton, Dickinson and Company; Franklin Lakes, NJ). *S. mutans* was cultured aerobically. Prior to the 2 h planktonic bactericidal assay, bacteria were diluted to 10$^6$ CFU mL$^{-1}$ in 1 vol % BHI-supplemented PBS (W-C anaerobic broth for *P. gingivalis*). The NO-releasing or corresponding control materials were then introduced at 37° C. Of note, the addition of broth had negligible effect on the NO-release totals (i.e., NO-release totals were ≤5% lower in 1 vol % broth-supplemented PBS). At 2 h, the bacteria suspensions were diluted 10- and 100-fold, and spiral plated using BHI agar (CDC Anaerobic agar for *P. gingivalis*). To quantify the antibacterial capacities of materials against planktonic bacteria, the minimum bactericidal concentration (i.e., the minimum concentration of materials required to achieve a 3-log reduction in viability after 2 hours) was determined by counting the colonies formed on the agar plate. Of note, the detection limit for the plate counting method was 2.5×10$^3$ CFU mL$^{-1}$.

The h-PAMAM scaffold exhibited some bactericidal properties as a result of the high density of primary and secondary amines. As shown in Table 2, the Gram-negative pathogens tested were more susceptible to h-PAMAM treatment than the Gram-positive pathogens, as evidenced by the lower MBCs. This behavior might be attributed to the thicker peptidoglycan layers of Gram-positive bacteria that may restrict scaffold association and mitigate membrane degradation. The antibacterial action of h-PAMAM was then assessed as a function of PO modification. Diminished antibacterial action was observed for h-PAMAM-PO-1 relative to h-PAMAM, likely the result of partial (~50%) exterior primary amines conversion to less potent secondary amines via the PO modification. It is also possible that the nonionic hydroxyl groups from PO shield cationic amines, thus inhibiting their interaction with bacterial membranes. Extensive PO modification of h-PAMAM as in the case of h-PAMAM-PO-2 further mitigated the antibacterial action based on the greater consumption of cationic amines and/or hydroxyl group shielding effect. In this study, the observed decrease in antibacterial action was most pronounced for the Gram-positive bacteria. For instance, the use of h-PAMAM-PO-2 did not elicit antibacterial action (as defined by a minimum 3-log viability reduction) against *S. mutans* even at 16 mg mL$^{-1}$. It is believed that modifying PAMAM dendrimer with neutral functional groups like polyethylene glycol (MW=685 g mol$^{-1}$) will reduce the eradication potency against Gram-positive *S. aureus*, with little effect (i.e., potency loss) towards Gram-negative *P. aeruginosa*.

Nitric oxide release benefited the bactericidal action of h-PAMAM-PO-2 (Table 2). For example, the concentration of h-PAMAM-PO-2/NO required to eradicate *S. mutans* was <25% of that for h-PAMAM-PO-2. Both h-PAMAM/NO and h-PAMAM-PO-1/NO exhibited lower antibacterial action compared to controls. The charge (negative) of the N-diazeniumdiolate functionalities diminished the ability to associate with bacteria, lessening the amine-directed contact killing observed for h-PAMAM and h-PAMAM-PO-1. This result is supported by the extended NO-release rates of h-PAMAM/NO and h-PAMAM-PO-1/NO (t$_{1/2}$~60-80 min) relative to h-PAMAM-PO-2/NO (t$_{1/2}$ ~30 min). The increased NO release half-lives indicate a prolonged effect of the negatively charged N-diazeniumdiolates on h-PAMAM/NO and h-PAMAM-PO-1/NO over the entire bactericidal assay. Similar doses of NO-releasing scaffolds were required to eradicate the dental pathogens regardless of the degree of PO modification, suggesting a similar NO delivery efficacy. The Gram-positive bacteria evaluated here were slightly more resistant to NO treatment relative to the Gram-negative bacteria.

incubated in a glass bottom confocal dish for 30 min at 37° C. A Zeiss 510 Meta inverted laser scanning confocal microscope (Carl Zeiss; Thornwood, NY) with a 543 nm

TABLE 2

Minimum bactericidal concentration ($MBC_{2\,h}$) and bactericidal NO dose ($\mu g\,mL^{-1}$) required to achieve 3-log reduction in bacterial viability for planktonic dental pathogens after 2 h exposure in PBS (10 mM, pH 7.4, 37° C.)[a]

| | Periodontal pathogens (Gram-negative) | | | | Cariogenic bacteria (Gram-positive) | | | |
|---|---|---|---|---|---|---|---|---|
| | A. a[b] | | P. gingivalis | | A. viscosus | | S. mutans | |
| Scaffold | $MBC_{2\,h}$ (mg mL$^{-1}$) | NO dose ($\mu$g mL$^{-1}$) | $MBC_{2\,h}$ (mg mL$^{-1}$) | NO dose ($\mu$g mL$^{-1}$) | $MBC_{2\,h}$ (mg mL$^{-1}$) | NO dose ($\mu$g mL$^{-1}$) | $MBC_{2\,h}$ (mg mL$^{-1}$) | NO dose ($\mu$g mL$^{-1}$) |
| G3-PAMAM | 0.10 | | 0.50 | | 1 | | 8 | |
| h-PAMAM | 0.10 | | 0.10 | | 0.50 | | 4 | |
| h-PAMAM/NO | 0.50 | 20 | 1 | 39 | 1 | 39 | 4 | 156 |
| h-PAMAM-PO-1 | 0.25 | | 0.25 | | 1 | | 8 | |
| h-PAMAM-PO-1/NO | 0.50 | 24 | 0.50 | 24 | 1 | 49 | 4 | 194 |
| h-PAMAM-PO-2 | 0.50 | | 2 | | 4 | | >16 | |
| h-PAMAM-PO-2/NO | 0.25 | 8 | 1 | 32 | 1 | 32 | 4 | 130 |
| G3-PAMAM-PO | 0.50 | | 4 | | 4 | | >16 | |
| G3-PAMAM-PO/NO | 0.25 | 7 | 1 | 29 | 1 | 29 | 4 | 115 |

[a]n ≥ 3 replicates.
[b]A. a is the abbreviation for A. actinomycetemcomitans.

The antibacterial activities of the h-PAMAM and G3-PAMAM systems were compared to elucidate the effect of PAMAM structure on bactericidal properties. Comparable antibacterial activities were achieved upon modification with PO for both NO-releasing and control scaffolds (Table 2). Given the identical NO-release payloads and kinetics between h-PAMAM-PO-2/NO and G3-PAMAM-PO/NO, this equivalent antibacterial activity suggests comparable polymer-bacterial association. Of note, the MBC values determined for both NO-releasing hyperbranched PAMAM and G3-PAMAM were lower than that of smaller PAMAM dendrimer macromolecules (i.e., G1-PAMAM-PO/NO), especially for cariogenic bacteria (S. mutans). This result indicates that increased size may allow enhanced killing of dental pathogens, consistent with data for other planktonic pathogens. Overall, h-PAMAM-PO-2/NO is equivalent to G3-PAMAM-PO/NO with respect to bactericidal efficacy, but accessible at much lower synthetic cost.

As shown above, the therapeutic potential of these materials was evaluated by studying their antibacterial activities and toxicity against common dental pathogens and human gingival fibroblast cells, respectively. The results indicate that the combination of NO release and PO modification yields h-PAMAM materials with efficient bactericidal action without eliciting unwarranted cytotoxicity. Of importance, NO-releasing PO-modified h-PAMAM polymers exhibited comparable biological properties (i.e., antibacterial action and cytotoxicity) to defect-free G3-PAMAM dendrimers, but at a substantially lower synthetic burden. The results also confirm the importance of size in killing dental pathogens. Overall, h-PAMAM-PO-2/NO is equivalent to G3-PAMAM-PO/NO with respect to bactericidal efficacy, but accessible at much lower synthetic cost.

Confocal Microscopy

Rhodamine B isothiocyanate (RITC)-modified h-PAMAM-PO-2 and G3-PAMAM-PO materials were prepared to facilitate visualization of the macromolecular scaffold with bacteria (S. mutans) via confocal fluorescence microscopy. Rhodamine B isothiocyanate (RITC)-labeled h-PAMAM-PO-2 and G3-PAMAM-PO were synthesized. S. mutans was cultured as described above and diluted to $10^7$ CFU mL$^1$ with PBS. This bacterial solution (3 mL) was HeNe excitation laser (1.0 mW, 25.0% intensity) and BP 560-615 nm filter was used to obtain fluorescence images of the RITC-modified PAMAM-PO. Both bright field and fluorescence images were collected using a N.A.1.2 C-apochromat water immersion lens with a 40× objective. RITC-labeled PAMAM-PO was added to the bacteria solution to achieve a final concentration of 100 $\mu$g mL$^{-1}$. Images were collected every 10 min to visualize the association of PAMAM-PO with the bacteria.

Figures 5A, 5B:
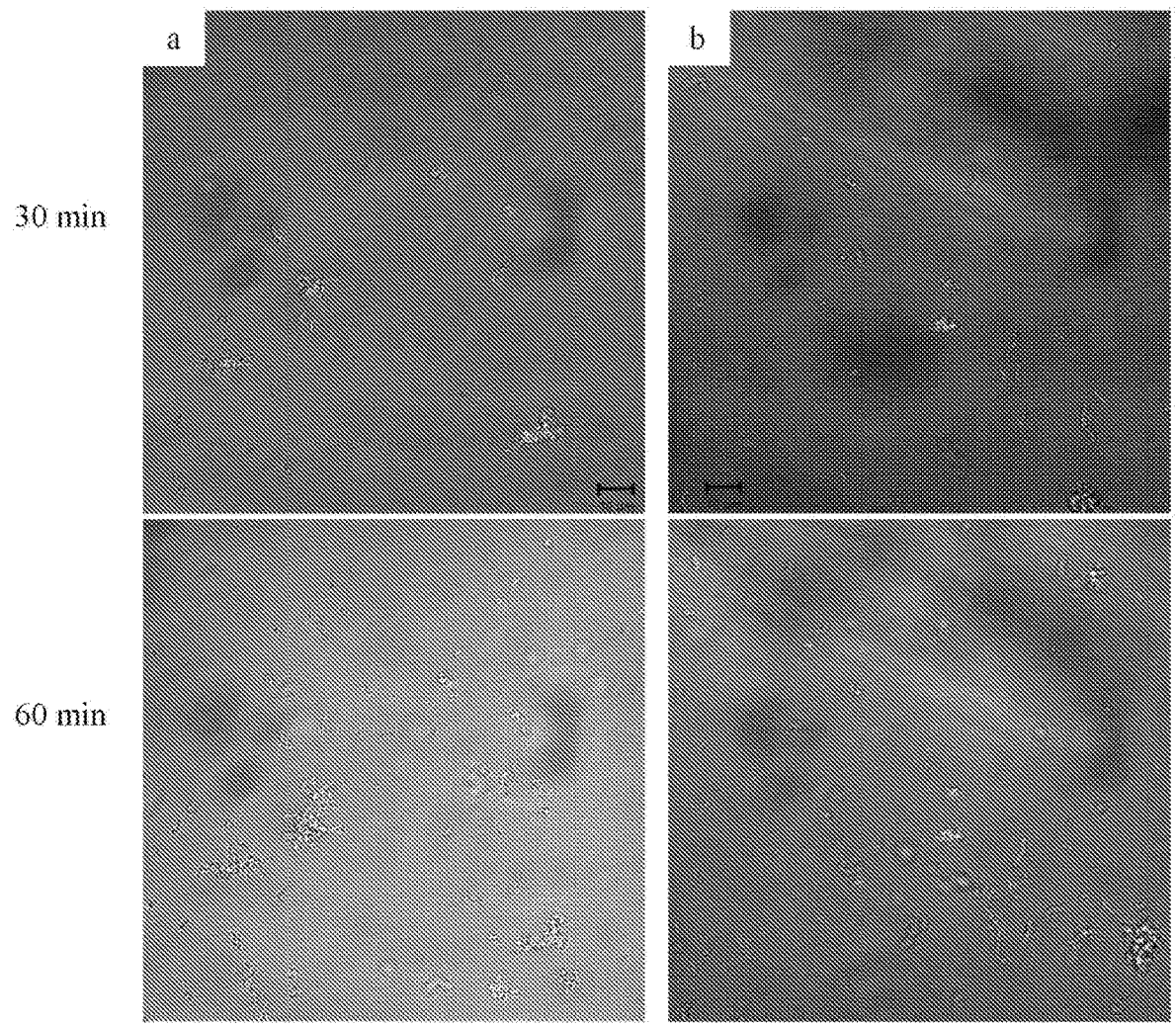
FIG. 5a and FIG. 5b show an overlay of confocal fluorescence and bright-field images of RITC-modified PAMAM scaffolds (100 μg mL$^{-1}$) association with S. mutans cells FIG. 5a h-PAMAM-PO-2.

Nearly identical fluorescence signal accumulation was observed for each time point (FIGS. 5(a)-(b)), confirming the pivotal killing mechanism. These dendrimer scaffolds (e.g., G1-PAMAM-PO) may have benefits as NO-release agents over other macromolecular scaffolds (e.g., silica) because of enhanced association and bactericidal efficacy. The studies herein confirm the equivalent behavior between h-PAMAM-PO-2 and G3-PAMAM-PO, despite the imperfect structure characteristics of the hyperbranched polymer.

In Vitro Cytotoxicity

The toxicity of the PAMAM scaffolds to human gingival fibroblasts (HGF-1) was evaluated after 2 and 24 h exposure times. Human gingival fibroblasts (HGF-1) were grown in FibroLife fibroblast serum-free media, and incubated in 5 vol % $CO_2$ under humidified conditions at 37° C. The cells were trypsinized at 80% confluency and seeded into tissue culture-treated polystyrene 96-well plates at a density of $10^4$ cells/well. The plates were incubated for an additional 24 h at 37° C. The supernatant was aspirated and replaced with 100 $\mu$L of fresh growth medium containing various concentrations of PAMAM scaffolds. After two incubation time points (i.e., 2 and 24 h) at 37° C., the supernatant was aspirated, and the cells were washed with DPBS. A 100 $\mu$L solution of media/MTS/PMS (105/20/1, v/v/v) solution was added to each well, and incubated for 3 h at 37° C. The absorbance of the colored supernatant was quantified at 490 nm using a Thermoscientific Multiskan EX plate reader (Waltham, MA). Measurements for untreated cells (control) and media/MTS/PMS mixture (blank) were also collected. Results were expressed as percentage of relative cell viability as follows:

% cell viability=[($Abs_{490}$–$Abs_{blank}$)]/($Abs_{control}$–$Abs_{blank}$)]×100%   (Eq. 1)

A killing curve was constructed for NO-releasing and control PAMAM scaffolds by plotting % cell viability versus concentration (mg mL⁻).

Figure 6A:
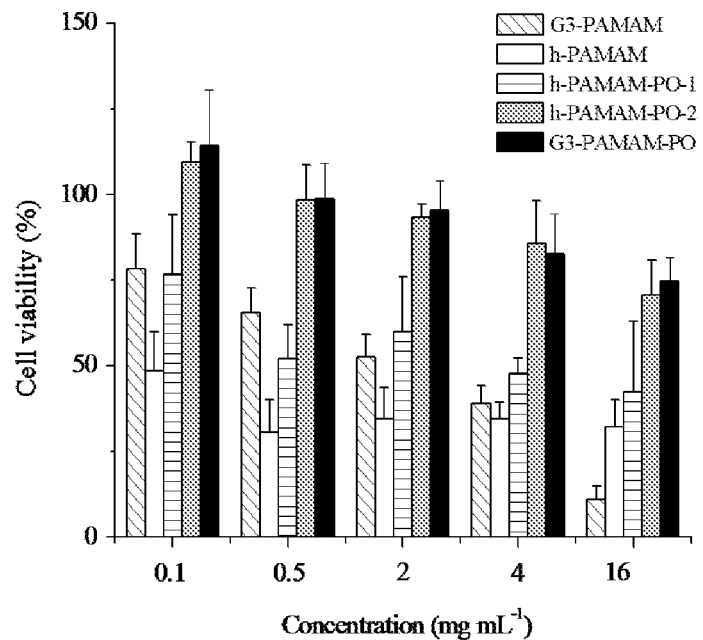
FIG. 6a and FIG. 6b are bar graphs showing Human gingival fibroblast (HGF-1) viability (%) following 2 h exposure to FIG. 6a controls (not functionalized with NO) and FIG. 6b NO-releasing PAMAM scaffolds according to embodiments disclosed herein.
Figure 6B:
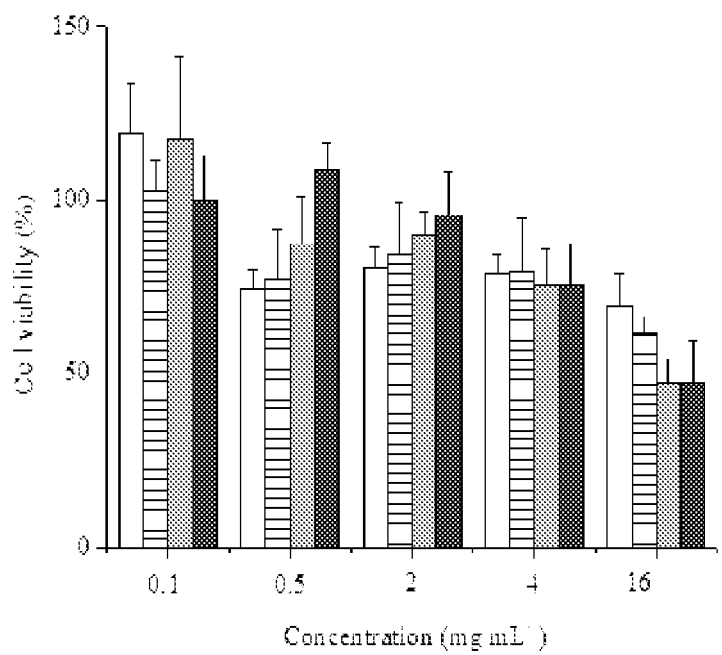

The 2 h incubation period was selected to correspond with the exposure time for the bactericidal assays. As shown in FIG. 6(a) and FIG. 6(b) 3, h-PAMAM proved to be the most toxic to HGF-1, likely due to the cationic amine disruption of cell membranes. The toxicity of h-PAMAM was lessened from the reduced amine content and shielding of non-ionic hydroxyl groups. The addition of NO mitigated the toxicity of h-PAMAM and h-PAMAM-PO-1 further (FIG. 6b), an effect of negatively charged N-diazeniumdiolate functional groups that restrained HGF-1 interaction.

Figure 7A:
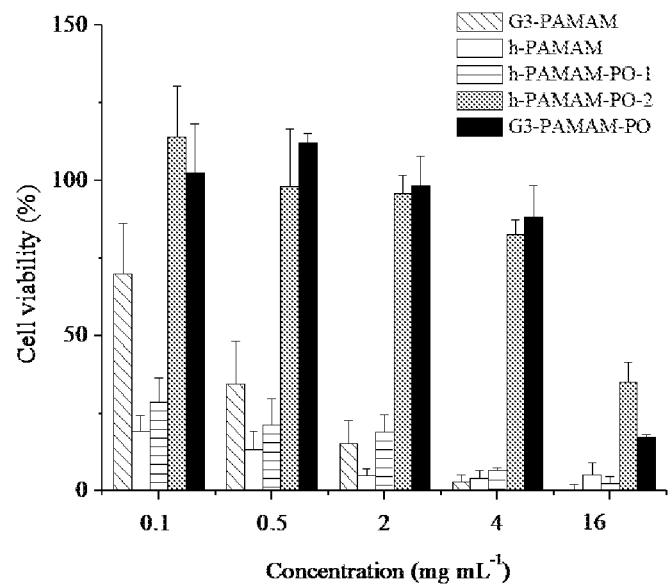
FIG. 7a FIG. 7b are bar graphs showing Human gingival fibroblast (HGF-1) viability (%) following 24 h exposure to FIG. 7a controls (not functionalized with NO) and FIG. 7b NO-releasing PAMAM scaffolds according to embodiments disclosed herein.
Figure 7B:
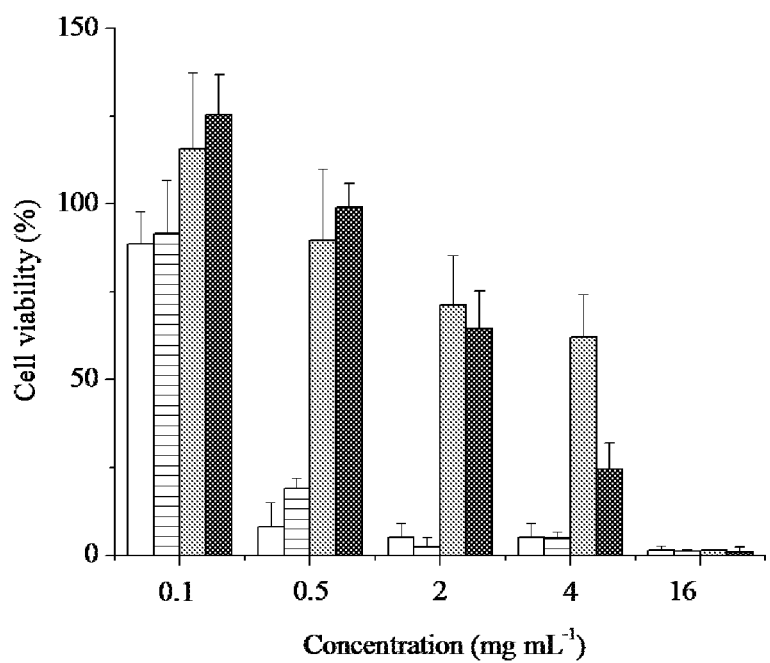

At 24 h incubation periods (See FIG. 7(a) and FIG. 7(b)), h-PAMAM and h-PAMAM-PO-1 exhibited considerable HGF-1 toxicity even at low concentration (i.e., ≤30% viability at 0.1 mg mL$^{-1}$) relative to h-PAMAM-PO-2 (i.e., ≥80% viability at 4 mg mL$^{-1}$). These results suggest that partial PO modification of exterior primary amines (i.e., h-PAMAM-PO-1) is insufficient to mitigate macromolecular toxicity over extended periods. The addition of NO release to the scaffolds via NO donor modification (i.e., h-PAMAM, h-PAMAM-PO-1, and h-PAMAM-PO-2) resulted in a decreased viability of HGF-1 cells at high concentrations (>0.5 mg mL$^{-1}$) relative to controls, indicating that a high dose of NO is toxic to mammalian cells. See Worley et al. In contrast, NO-releasing h-PAMAM polymers at low concentrations (0.1 mg mL$^{-1}$) exhibited less toxicity versus controls, suggesting that a low level of NO is tolerable and may even promote cell proliferation. The h-PAMAM-PO-2/NO polymer elicited some toxicity to HGF-1 cells at 4 mg mL$^{-1}$ (the highest effective bactericidal concentration), representing an advantage of h-PAMAM-PO-2/NO over NO-releasing macromolecular scaffolds (silica nanoparticles and G1-PAMAM dendrimers).

Lastly, the cytotoxicity was compared between h-PAMAM polymers and G3-PAMAM dendrimers using HGF-1 cells. Despite a lower observed toxicity for unmodified G3-PAMAM dendrimers relative to h-PAMAM polymers at concentrations <2 mg mL$^{-1}$, significant toxicity was still observed for G3-PAMAM dendrimers even at 0.5 mg mL$^{-1}$. Upon modification with PO, comparable toxicity was achieved for h-PAMAM polymers and G3-PAMAM dendrimers (i.e., h-PAMAM-PO-2 and G3-PAMAM-PO systems, respectively). Collectively, these data illustrate the potential of h-PAMAM-PO-2/NO as a safe antibacterial agent for oral antibacterial therapies.

As noted above, the synthesis and characterization of N-diazeniumdiolate NO donor-modified h-PAMAM polymers is provided. In some embodiments, the NO-release properties (i.e., payloads and release kinetics) of h-PAMAM were evaluated as a function of chemical modifications. The potential of this scaffold as an oral therapeutic was assessed in terms of antibacterial activity to common dental pathogens and toxicity to human gingival fibroblast cells. Lastly, the properties of h-PAMAM structures were compared to G3-PAMAM counterparts with respect to therapeutic potential and gave favorable results. The combination of NO release ability with propylene oxide (PO) modification on a hyperbranched PAMAM scaffold (h-PAMAM-PO-2/NO) enabled the efficient eradication of select oral pathogens with low/minimal toxicity to human gingival fibroblasts. Despite structural defects, the antibacterial activity of h-PAMAM-PO-2/NO was comparable to structurally perfect G3-PAMAM-PO/NO. In this regard, h-PAMAM-PO-2/NO shows promise as a therapeutic. In some embodiments, the antibacterial action of h-PAMAM-PO-2/NO may be used against clinically relevant ex vivo multi-species dental biofilms. In some embodiments, the disclosed NO-releasing hyperbranched polymers may be used for oral care applications. In some embodiments, the disclosed NO-releasing hyperbranched polymers may be used for oral care applications in the oral microbiome.

Example 5: Synthesis of Hydroxyl-Terminated Hyperbranched Polymer

Materials and Methods

N,N'-methylene bisacrylamide (MBA), N-(2-Hydroxyethyl)ethylenediamine (HEDA), fetal bovine serum (FBS), Dulbecco's modified Eagle's medium (DMEM), phenazine methosulfate (PMS), 3-(4,5-dimethylthiazol-2-yl)-5-(3-carboxymethoxyphenyl)-2-(4-sulfophenyl)-2H-tetrazolium inner salt (MTS), trypsin, Dulbecco's phosphate buffered saline (DPBS), and penicillin streptomycin (PS) were purchased from Sigma-Aldrich and used without further purification. Sodium methoxide (5.4 M solution in methanol) was purchased from Acros Organics. Nitric oxide (NO) gas (99.5%) was purchased from Praxair. A Millipore Milli-Q UV Gradient A-10 System was used to purify distilled water to a final resistivity of 18.2 MΩ·cm and a total organic content of ≤6 ppb. *Pseudomonas aeruginosa* (*P. aeruginosa*; ATCC #19143) and *Staphylococcus aureus* (*S. aureus*; ATCC #29213) were obtained from the American Type Culture Collection. Tryptic soy agar (TSA) and Tryptic soy broth (TSB) were purchased from Becton, Dickinson, and Company. L929 mouse fibroblasts (ATCC #CCL-1) were obtained from the University of North Carolina Tissue Culture Facility. All other materials are obtained from commercial sources and used without further purification.

Nuclear magnetic resonance ($^1$H NMR) spectra were recorded on a Bruker (400 MHz) spectrometer. Quantitative $^{13}$C nuclear magnetic resonance ($^{13}$C NMR) spectrum and 2D NMR technique were recorded on a 600 MHz Bruker instrument. UV-Vis absorption spectra were measured on a PerkinElmer Lambda 40 Spectrophotometer. Gel permeation chromatography measurements were performed on an aqueous GPC-multi-angle light scattering system equipped with a Waters 2414 refractive index detector (Milford, MA) coupled to a Wyatt miniDawn TREOS multi-angle light scattering detector (Santa Barbara, CA).

Synthesis of Hydroxyl-Terminated Hyperbranched Polymer (HBPMH)

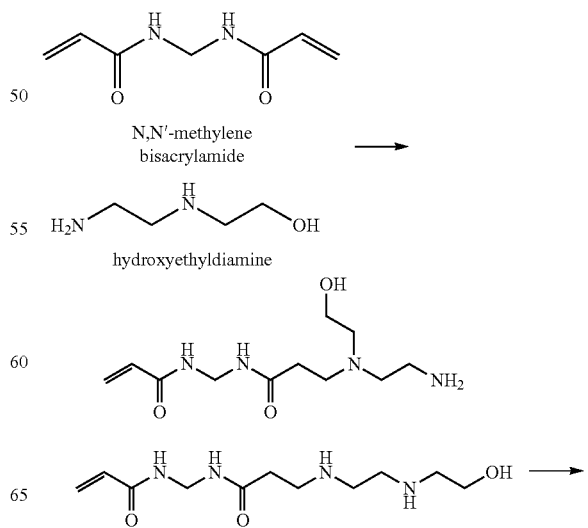

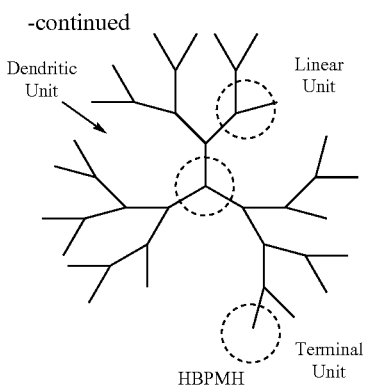

HBPMH

Figures 8A, 8B, 8C, 8D, 8E, 8F, 8G:
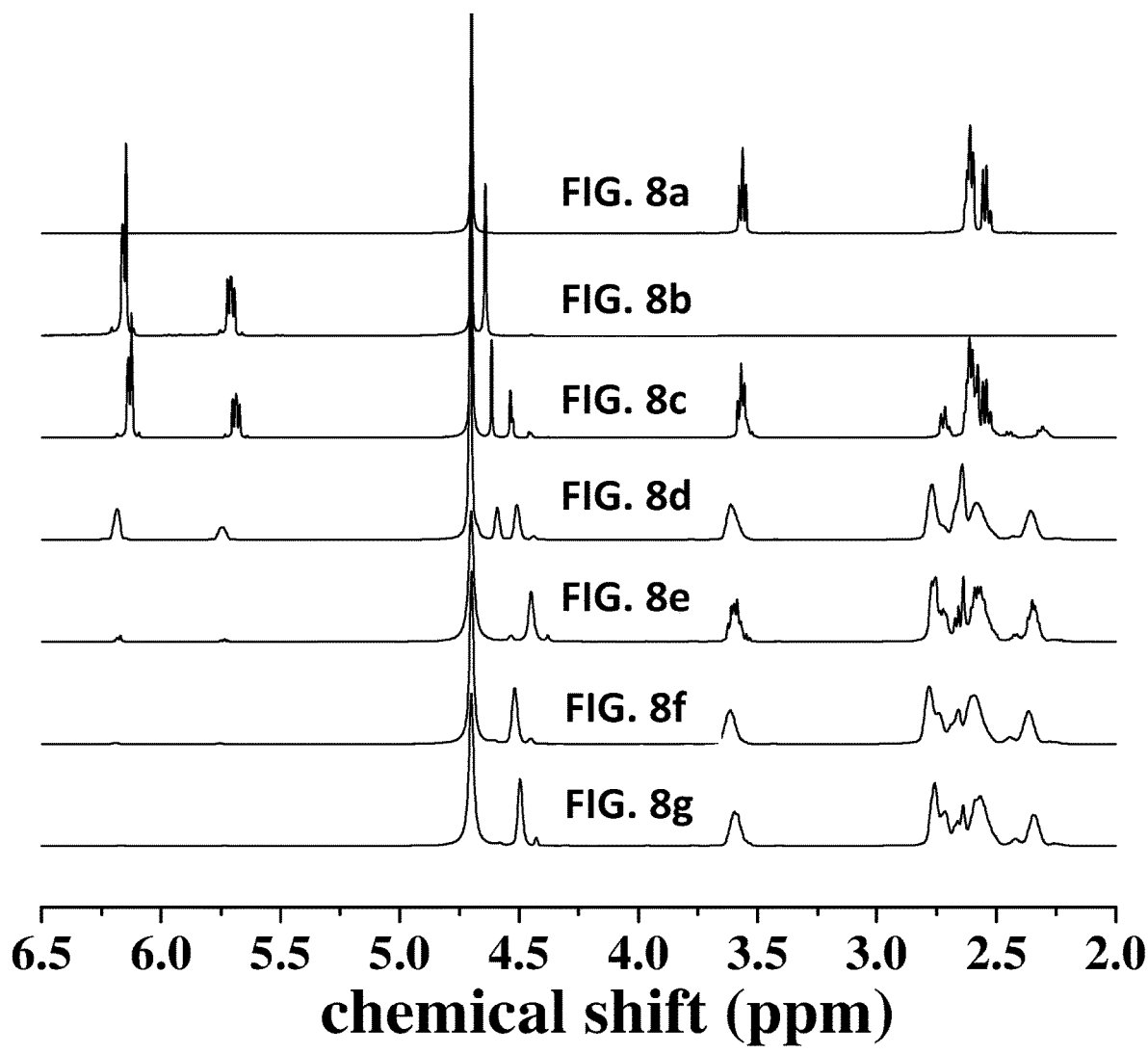
FIG. 8a through FIG. 8g show the polymerization process as monitored by NMR. $^1$H NMR spectra of monomers.

The Michael addition polycondensation procedure was as follows: MBA (1.540 g, 10 mmol) was added into the mixture of HEDA (1.041 g, 10 mmol) in 15 mL deionized water, followed by reacting at 75° C. for 72 hours with vigorous stirring. The resulting solution was precipitated in cold acetone and centrifuged to obtain white solid product. The product was dried under vacuum for 3 days at room temperature. The final product was gained as white solid powder (1.212 g, yield: 47.0%). Hyperbranched poly(methylene bisacrylamide-hydroxyethyl ethylenediamine) (HBPMH) were synthesized by Michael addition polycondensation between $A_2$-monomer of N,N'-methylene bisacrylamide and trifunctional amine monomer of N-(2-Hydroxyethyl)ethylenediamine, with an equal feeding molar ratio at 75° C. for 3 days. The polymerization process was firstly monitored by $^1$H NMR spectra under different reaction time (FIG. 8). Two peaks around 5.70 ppm and 6.10 ppm assigned to the double bonds of MBA monomer diminished gradually with the procedure of polymerization. The conversion efficiency of vinyl groups ($CR_V$) can be calculated according to the formula of CRv %=(1-$S_{5.60\sim6.20}$/3$S_{4.4\sim4.65}$) *100%, where $S_{5.60\sim6.20}$ was the integration of proton signals (5.60~6.20 ppm) assigned to double bonds and $S_{4.40\sim4.65}$ was the integration of proton signals (4.40~4.65 ppm) assigned to the methylene group between two amide groups. The $CE_V$ was 31.6% for 10 min, 74.1% for 2 hours and 97.2% for 6 hours, respectively. The result indicated that Michael addition polymerization went on very fast in the initial stage. Two new protons signals in the range of 2.26~2.35 ppm and 2.41~2.47 ppm were also observed after 10 min reaction, which were assigned to the newly-formed methylene groups adjacent to the amide groups in the intermediate I and intermediate II. The integration area of signals (2.26~2.35 ppm) was larger than that of signals (2.41~2.47 ppm), indicating that primary amine had a higher reactivity than secondary amine. 12 hour later, the proton signals of vinyl groups almost disappeared. All the sharp peaks were changed into broad peaks, demonstrating the occurrence of polymerization. Similar time-dependent NMR trace was also reported in the synthesis of primary amine-terminated hyperbranched poly (amidoamines). Of note, residual double bonds (less than 0.2%) were left in the final macromolecular architecture.

Figure 9:
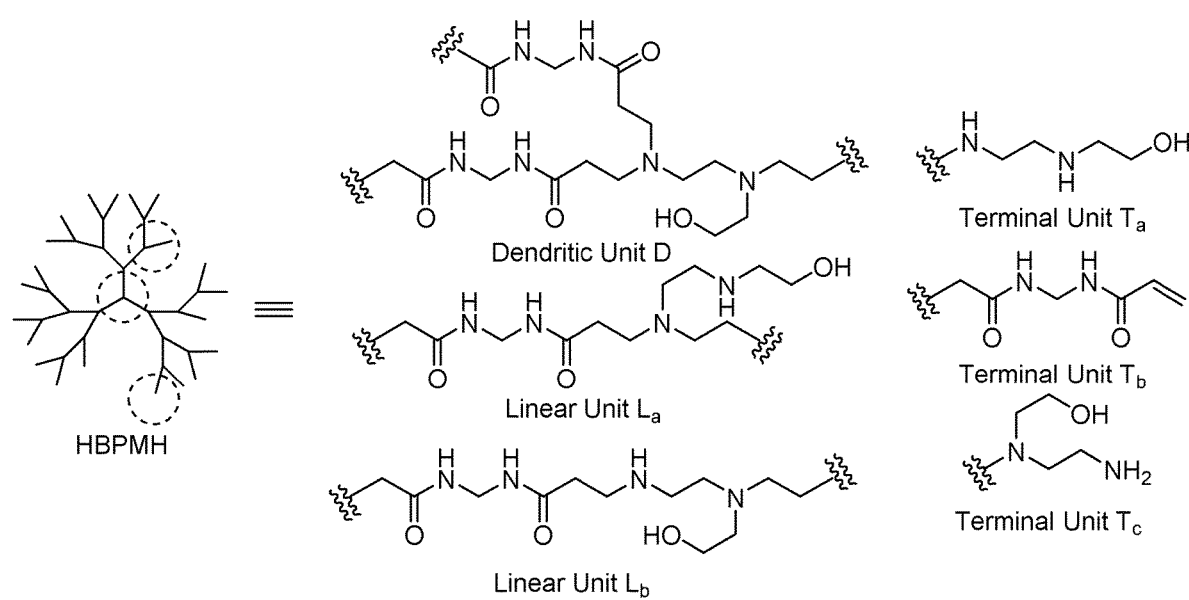
FIG. 9 shows hydroxyl-terminated HBPMH reacted via the Michael addition polymerization of MBA with HEDA, and the possible structural segments in the macromolecular backbone.
Figure 10A:
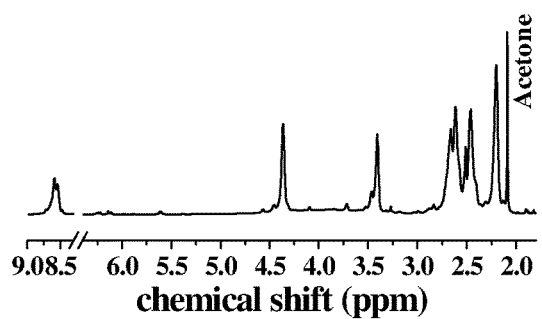
FIG. 10a and FIG. 10b show characterization data for HBPMH as disclosed elsewhere herein.
Figure 10B:
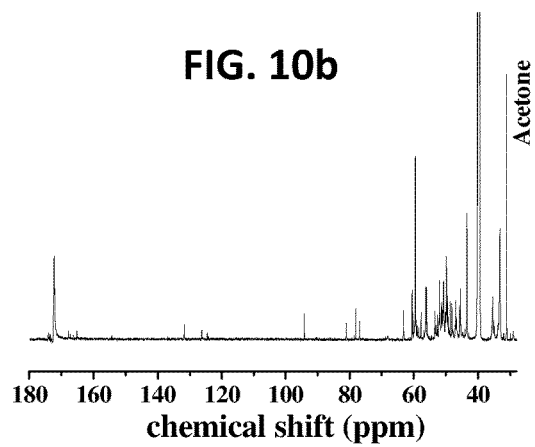
Figure 10C:
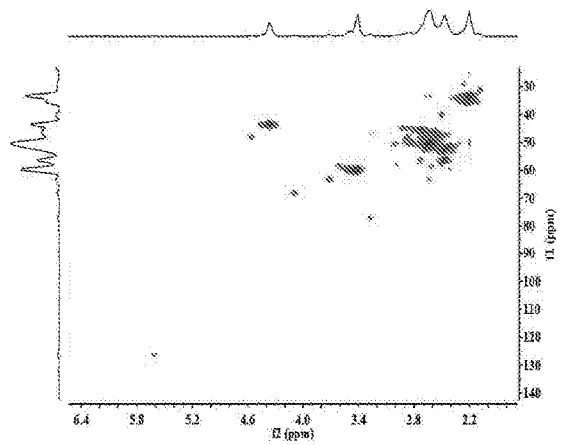
FIG. 10c is a $^{13}$C, $^1$H-HSQC NMR spectrum of hydroxyl-terminated HBPMH. Solvent: DMSO.
Figure 10D:
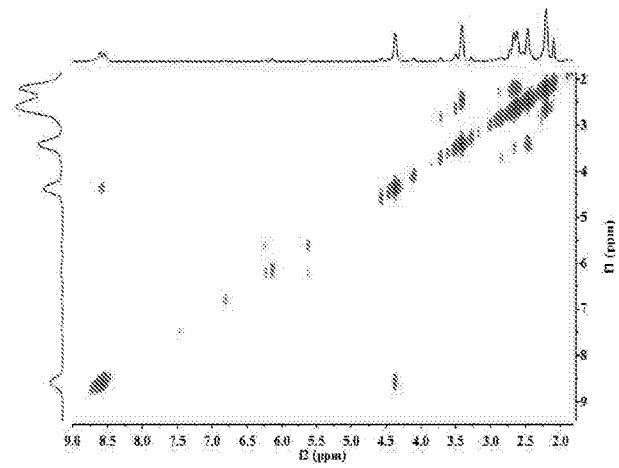
FIG. 10d is a $^1$H, $^1$H-COSY NMR spectrum of hydroxyl-terminated HBPMH. Solvent: DMSO.

In general, hyperbranched polymers can be composed of dendritic units, linear units and terminal units as shown in FIG. 9. Six possible structural segments of newly-synthesized HBPMH are illustrated in FIG. 9, where D, $L_a$, $L_b$, $T_a$ and $T_b$ represent the fractions of dendritic units (D), linear units ($L_a$, $L_b$), and terminal units ($T_a$, $T_b$), respectively. $^1$H-$^{13}$C HSQC, $^1$H-$^1$H COSY, $^1$H NMR, quantitative $^{13}$C NMR spectra were performed to elaborately confirm the 3D topological structures of HBPMH (FIGS. 10a-d). No signals were observed in the range of 37~42 ppm in the $^{13}$C NMR spectrum (FIG. 10b), indicating that terminal unit $T_c$ with primary-amine was not found in the macromolecular backbone of HBPMH. However, the degree of branching (DB) based on $^1$H NMR or the quantitative $^{13}$C NMR was challenging, owing to the complicated structure of HBPMH. The molecular weight and its polydispersity index (PDI) of HBPMH were characterized by gel permeation chromatography (GPC). The weight molecular weight ($M_w$) of HBPMH was 6,368 g/mol, with PDI about 1.78. The number of average degree of polymerization (DPn) was calculated by dividing the $M_w$ of HBPMH by the total molecular weight of two monomers (258 g/mol), equal to 24.7. Each of the groups of FIG. 9 were confirmed by NMR, except terminal unit $T_c$.

Synthesis of N-Diazeniumdiolate Nitric Oxide Donor-Modified Hyperbranched Scaffolds The consequent HBPMH abundant with secondary amines was reacted with NO gas (10 bar) under strong alkaline conditions to yield N-diazeniumdiolates NO donors (FIGS. 11(a-d)). To synthesize N-diazeniumdiolate-functionalized HBPMH, secondary-amine-contained HBPMH were added into 2.0 mL of anhydrous methanol (MeOH). In the following step, 1 equiv of sodium methoxide in methanol (with respect to the molar amount of secondary amine in polymeric backbone) was added into the mixture, followed by vortex to gain homogeneous solutions. The mixture was placed in a stainless steel reactor with strong magnetic stirring. The vessel was purged rapidly with argon three times to a pressure of 7 bar, followed by three longer argon purge cycles (10 minutes) to remove the residual oxygen in from the solutions. The vessel was then pressurized to 10 bar of NO gas, maintaining the pressure for 3 days. The solutions were purged with argon at three times short durations, followed by three times longer purges (10 minutes) to remove unreacted NO gas. The solutions were precipitated in 15 mL of acetone for 1 time, followed by centrifugation to remove the solvent. The final product was dried in the vacuum drying oven at room temperature for 2 hours. The resulting N-diazeniumdiolate-functionalized HBPMH were parafilmed and stored at −20° C. for future use.

Figure 12A:
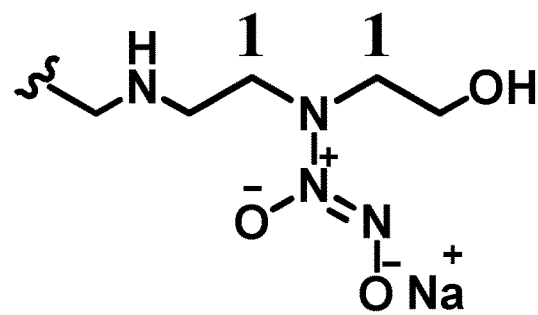
FIG. 12a, FIG. 12b, FIG. 12c, and FIG. 12d show four different N-diazeniumdiolates units in the macromolecular backbones of HBPMH.
Figure 12B:
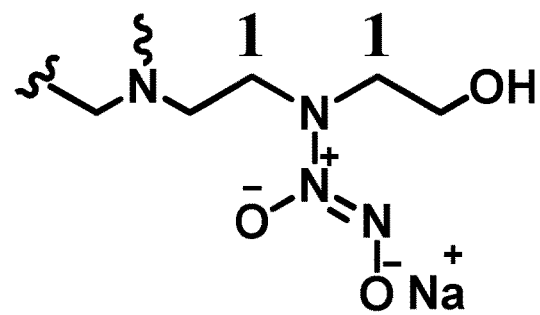
Figure 12C:
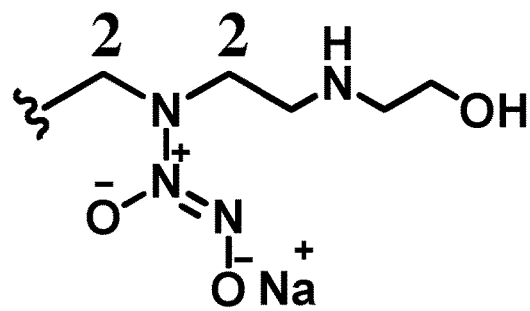
Figure 12D:
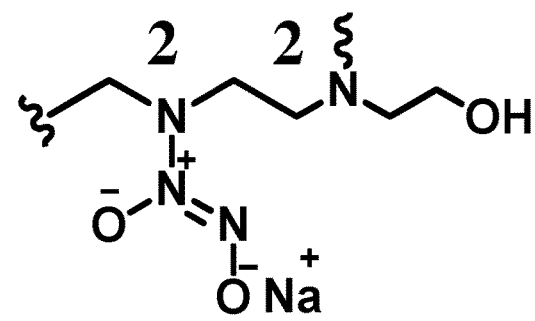

The obtained N-diazeniumdiolate-modified HBPMH (HBPMH/NO) was characterized by UV-Vis spectra, $^1$H NMR spectra and FTIR spectra. Compared to the UV-Vis spectrum of HBPMH, a strong and typical absorption peak (around ~254 nm) assigned to the N-diazeniumdiolates structure appeared in the UV-Vis spectrum (FIG. 11b), indicating the formation of HBPMH/NO. Besides, a broad absorption peak around 330~360 nm assigned to carcinogenic N-nitrosamine species was not observed, demonstrating that no N-nitrosamines were formed in the final NO donor of HBPMH/NO. The formation of HBPMH/NO was also characterized by $^1$H NMR spectra (FIG. 11c). Through diazeniumdiolation, the proton signals in the range of 2.50~2.90 ppm corresponding to methylene groups bonds to secondary amines are shifted to high chemical shifts in the range of 2.95~3.20 ppm, owing to the electron-withdrawing effect of newly-formed diazeniumdiolate groups. Peak 1 (3.10~3.20 ppm) was corresponded to the N-diazeniumdiolates linked to the secondary amine closed to the hydroxyl groups (FIG. 12a and FIG. 12b); while peak 2 (2.95~3.10 ppm) represented the N-diazeniumdiolates far away from the hydroxyl groups (FIG. 12c and FIG. 12d). The conversion efficiency of secondary amine to N-diazeniumdiolate ($CE_{SA}$) can be calculated by the formula of $CE_{SA}$%=($S_{1,2}$/

Figure 13:
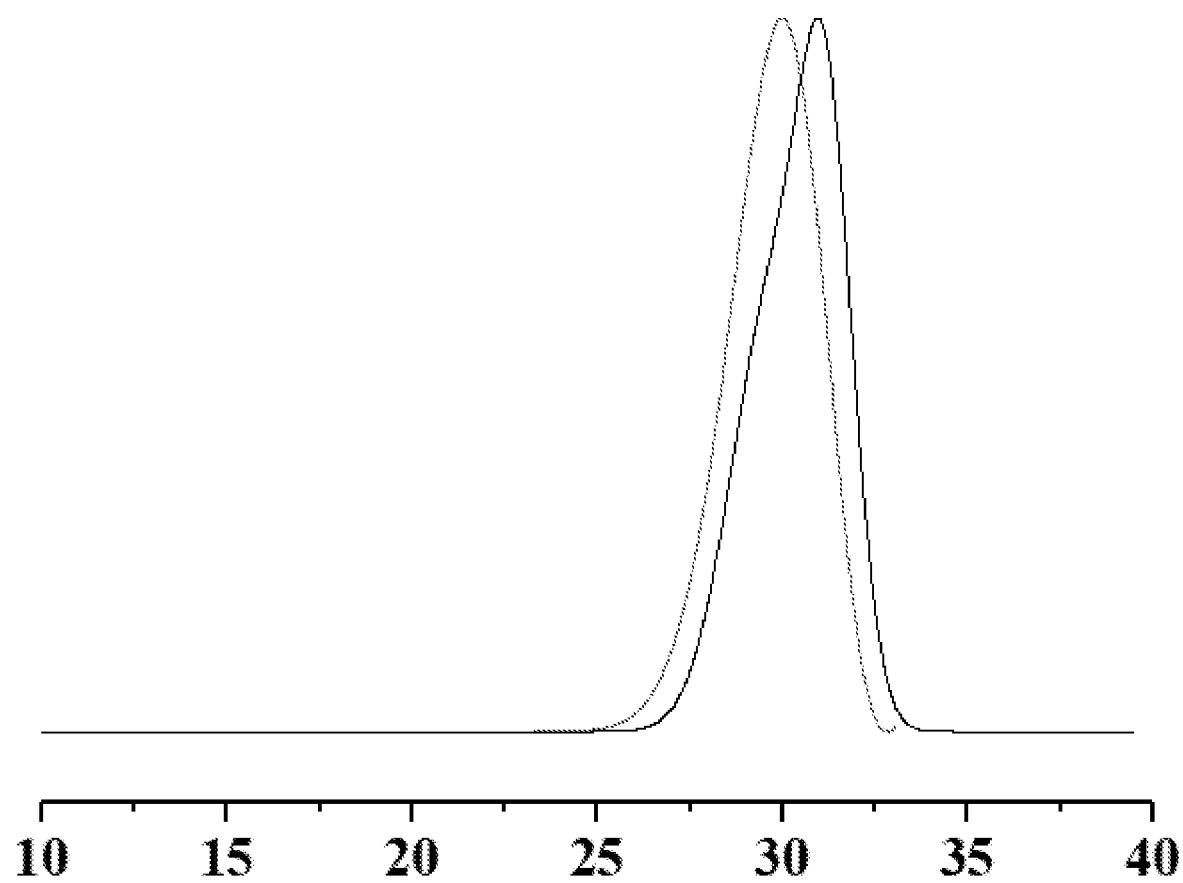
FIG. 13 shows an overlay of GPC curves for both HBPMH (right-most curve) and NO-releasing HBPMH/NO (left-most curve) in water eluent.

4)/($S_{4.50}$/2)×100%, where $S_{4.50}$ and $S_{1,2}$ represent the integration of peaks around ~4.50 ppm and the total integration of peaks 1 and 2, respectively. The resulting $CE_{S4}$ was equal to 27.3%. FTIR spectra (FIG. 11d) provided further evidence for the formation of HBPMH/NO. In comparison with the unfunctionalized HBPMH, one enhanced FTIR band at 1361 cm$^{-1}$ and one new FTIR band at 945 cm$^{-1}$ appeared in the FTIR spectrum, that have been assigned to the characteristic peaks for the O—N—N—O asymmetric stretch and in-plane N—N symmetric stretch, respectively. Both distinct FTIR bands manifested the successful introduction of N-diazeniumdiolates into HBPMH backbones. GPC was also employed to prove the formation of HBPMH/NO (FIG. 13). The Mw of HBPMH/NO was increased to 6,973 g/mol through the diazeniumdiolation, while its PDI had no obvious change (PDI=1.69). Compared to the Mw of HBPMH, a notable increase (569 g/mol) in molecular weight indicated that the N-diazeniumdiolate NO donor segments (—N$_2$O$_2$Na) was successfully introduced into the macromolecular backbone of HBPMH.

Characterization of Nitric Oxide Release

The real-time NO release was monitored by using a Sievers NOA 280i chemluminescence NO analyzer (NOA, Boulder, CO). Prior to analysis, the NO analyzer was calibrated with air passed through a NO zero filter (0 ppm of NO) and 25.87 ppm of standard NO gas. In a typical measurement, 1 mg of N-diazeniumdiolate-functionalized HBPMH was added into a sample vessel with 30 mL of deoxygenated PBS (pH 7.4, 37° C.) to initiate NO release. The vessel was purged with nitrogen at a flow rate of 80 mL/min to carry the liberated NO gas to the NOA analyzer. Additional nitrogen flow was supplied to the vessel to match the collection rate of instrument (200 mL/min). NO analysis was terminated when NO level was reduced to below 10 ppb NO/mg N-diazeniumdiolate-functionalized HBPMH.

N-diazeniumdiolates NO donors proceed through a pH-triggered NO-release process. FIG. 14(a) displays the proposed dissociation procedure of the new N-diazeniumdiolates modified hyperbranched polymer scaffold. If HBPMH/NO is immersed into the physiological condition (i.e., 37° C., pH 7.4), 1 mole of N-diazeniumdiolates should react with 1 mole of proton and regenerate 1 mole of the parent secondary amine compounds and two moles of NO radicals. Chemiluminescence-based nitric oxide analyzer (NOA) was employed to real-time detect the NO radicals, investigating the NO-releasing total storage and dissociation kinetics of the water-soluble HBPMH/NO in PBS buffer (pH 7.43) at physiological temperature (37° C.). The calculated NO-releasing parameters (e.g., total NO storage, half-life of NO release, maximum flux, time to maximum flux, and conversion rate) are provided in Table 3. Representative real-time NO release profiles of HBPMH/NO are shown in FIGS. 14b and 14c. In general, HBPMH/NO exhibited high NO storage capabilities (i.e., NO total ~2.01 µmol/mg) and fast NO-release kinetics (i.e., NO-release half-life ~20 min). The rapid NO-release kinetics was led by the faster water uptake ability of hydroxyl-terminated HBPMH than that of alky-chains modified dendrimer. Further calculation revealed that the conversion efficiency of secondary amines in HBPMH to N-diazeniumdiolates was 25.9%, which agreed well with the NMR data. This may be attributed to the sterical hindrance from the densely topological architecture of hyperbranched polymers and repulsion interactions among negatively-charged N-diazeniumdiolates.

TABLE 3

Nitric oxide releasing properties for HBPMH/NO in PBS (pH 7.4) at 37° C.

| Materials | t[NO]$^a$ (µmol/mg) | $t_{1/2}$ (min) | [NO]max (ppb/mg) | $t_{[NO]max}$ (min) | $t_{4\,h}$[NO]$^b$ (µmol/mg) | Conversion Efficiency (%) |
|---|---|---|---|---|---|---|
| HBPMH | 2.01 ± 0.07 | 20 ± 2 | 10896 ± 789 | 3.3 ± 0.5 | 1.81 ± 0.05 | 25.9 ± 0.6 |

$^a$Total NO storage;
$^b$NO released over 4 h (µmol) per milligram of HBPMH/NO. Each parameter was analyzed with multiple replicates (n ≥ 3).

Example 6: Planktonic Bactericidal Assays for HBPMH Hyperbranched Structures

Whether NO is an efficient antibacterial agent to eliminate planktonic bacteria was tested. The antibacterial ability of hydroxyl-terminated HBPMH/NO was evaluated against model pathogens of Gram-negative Pseudomonas aeruginosa and Gram-positive Staphylococcus aeruginosa, which are related with serious illness (e.g., wounds). Planktonic bacterial viability assays were performed under static conditions to confirm the minimum bactericidal concentration required to eliminate bacteria viability by 3 logs (i.e., 99.9% killing) over 4 hours (MBC$_4$ h), which is a common parameter to quantify the antibacterial activity. The NO amount delivered by NO-releasing HBPMH/NO over this period was also calculated to quantitatively evaluate the required NO dose in the bactericidal activity.

P. aeruginosa or S. aureus colony were cultured in 3 mL of TSB overnight (around 16 hours) at 37° C. A 1000 µL aliquot of the resulting suspension was added into 15 mL of fresh TSB and incubated at 37° C. for another 2 hours, to achieve a concentration of 10$^8$ colony forming units per mL (CFU/mL, confirmed by the OD600). The bacteria was collected by centrifugation, resuspended in sterile PBS, and diluted to 10$^6$ CFU/mL. The antibacterial efficacy of both non-NO-releasing and NO-releasing HBPMH against planktonic bacteria was evaluated under static condition over 4 hours at 37° C. Blanks (untreated cells) were incubated in each experiment to ensure the bacteria remained viable at 10$^6$ CFU/mL over 4 hour assay. 100 µL aliquots of blank, control or NO-releasing HBPMH treated bacteria suspensions were shifted, diluted 10-fold in sterile H$_2$O and plated on TSA plates using an Eddy Jet spiral plater (IUL; Farmingdale, NY), followed by incubation overnight at 37° C. Bacterial viability was evaluated by counting the total colonies on the TSA plates by using a Flash & Go colony counter (IUL; Farmingdale, NY). Minimum bactericidal concentrations (MBC$_{4h}$) were designated as the minimum concentration of NO-releasing HBPMH over 4 hours exposure that resulted in a 3-log reduction of bacterial viability compared to the blank. Of note, the limit of detection for this selected plate counting method is 2.5×10$^3$ CFU/mL. Both MBCs and required NO doses are provided in Table 4.

The antibacterial activity of both control hydroxyl-terminated HBPMH and NO-releasing HBPMH/NO against planktonic bacteria was performed to evaluate the function of nitric oxide. HBPMH exhibited bactericidal efficacy against P. aeruginosa, with its MBC$_4$ h value of 500 µg/mL; while HBPMH had no remarkable effect on eradiation against S. aureus at the concentrations below 16000 µg/mL (FIG. 15a and FIG. 15b). The MBC$_4$ h values of primary amine-terminated G4 PAMAM dendrimer against P. aeruginosa and S. aureus were 30 µg/mL and 1000 µg/mL, respectively (not shown). Without being bound to a particular mechanism, the increased MBC$_{4h}$ values for HBPMH manifested the lower cytotoxicity of hydroxyl-terminated HBPMH because of the PEGylation protection. However, NO-releasing HBPMH/NO exhibited good bactericidal efficacy against both P. aeruginosa and S. aureus, whose MBC$_4$ h values were 50 µg/mL and 1000 µg/mL, respectively. The notably decreased MBC$_{4h}$ values indicated NO work as pivotal antibacterial agent, especially to S. aureus. Further inspection in MBC$_{4h}$ values and required NO doses indicated HBPMH/NO exhibited more effective elimination against P. aeruginosa. The increased antibacterial activity toward P. aeruginosa was attributed to the fast association between HBPMH/NO and thin peptidoglycan layer of Gram-negative bacteria membrane and the resulting high efficient NO delivery.

TABLE 4

Minimum bactericidal concentration (MBC$_4$ $_h$) and NO doses of NO-releasing HBPMH/NO required for 3-log reduction in planktonic bacteria viability

| Materials | P. aeruginosa | | S. aereus | |
|---|---|---|---|---|
| | MBC$_4$ $_h$ (µg/mL) | NO dose (µmol/mL) | MBC$_4$ $_h$ (µg/mL) | NO dose (µmol/mL) |
| HBPMH | 500 | | >16000 | |
| HBPMH/NO | 50 | 0.09 | 1000 | 1.81 |

In Vitro Cytotoxicity

Despite the effective antibacterial activity, the utility of new antibacterial materials is also related to their toxicity to mammalian cells. The elaborate design for the hydroxyl-terminated HBPMH effectively decreased the cellular toxicity.

L929 mouse fibroblasts were cultured in DMEM supplemented with 10% v/v fetal bovine serum (FBS) and 1 wt % penicillin/streptomycin, and incubated in 5% v/v CO$_2$ under humidified conditions at 37° C. After reaching confluency (80%), the cells were trypsinized, seeded onto tissue-culture treated polystyrene 96-well plates at a density of 1×10$^4$ cells/mL, and incubated at 37° C. for 24 hours. The supernatant was then aspirated and replaced with 100 µL of fresh growth medium containing various concentrations of both non-NO-releasing and NO-releasing HBPMH to each well. Over incubation at 37° C. for 4 hours, the supernatant was aspirated and 100 µL of a mixture of DMEM/MTS/PMS (105/20/1, v/v/v) was added to each well. The absorbance of the resulting colored solutions over 3 hours incubation was quantified by using a ThermoScientific Multiskan EX plate reader (Waltham, MA) at 490 nm. The mixture of DMEM/MTS/PMS and untreated cells were used as a blank and control, respectively. Cell viability was calculated according to the formula as follows:

$$\text{Cell viability } (\%) = \frac{Absorbance_{490} - Absorbance_{blank}}{Absorbance_{control} - Absorbance_{blank}} \times 100\%$$

Figure 16A:
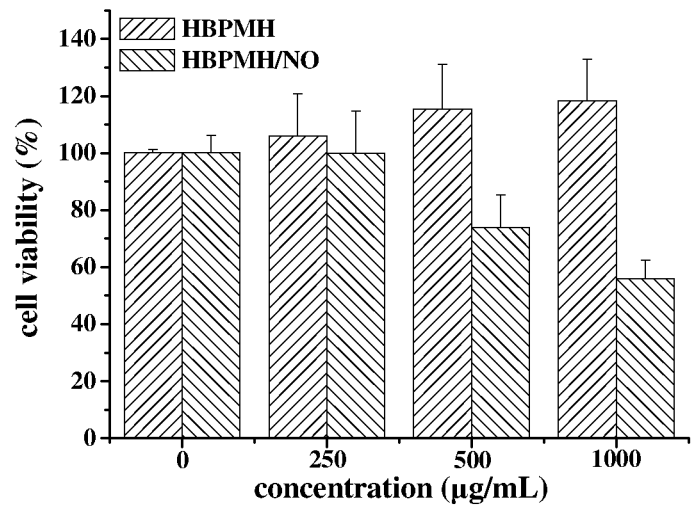
FIG. 16a and FIG. 16b show in vitro cytotoxicity for certain HBPMH embodiments.
Figure 16B:
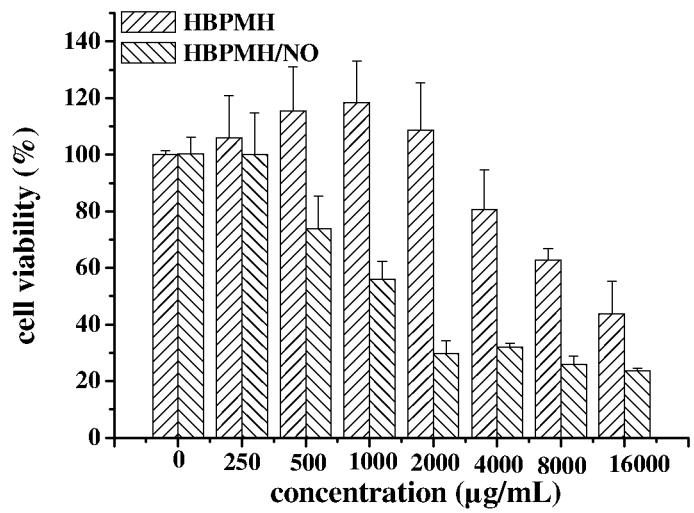

The cytotoxicity of both control and NO-releasing HBPMH/NO was evaluated against mouse fibroblast cells at various concentrations from 0 to 16000 µg/mL. The normalized cell viabilities of both control and NO-releasing HBPMH/NO over 4 hours incubation are provided in FIGS. 16(a)-(b). Hydroxyl-terminated HBPMH exhibited non-toxic nature (above 50% cell viability) against mouse fibroblast cells at the concentrations below 8000 µg/mL (FIGS. 16a and 16b). Through the diazeniumdiolation, the above 50% cell viability of NO-releasing HBPMH/NO was decreased to 1000 µg/mL, since large NO concentrations could result in cell death via nitrosation stress or oxidative stress. It is found that both control and NO-releasing HBPMH/NO are non-toxic against mouse fibroblast cells at their MBC$_{4h}$ values. In summary, the bactericidal activity against planktonic bacteria and the low cytotoxicity of NO-releasing HBPMH/NO suggest that the new NO-releasing HBPMH/NO may be utilized as an ideal antimicrobial agent for applications in wound healing or cystic fibrosis.

Biocompatible hydroxyl-terminated HBPMH was successfully synthesized through Michael addition polycondensation. N-diazeniumdiolate-functionalized HBPMH with high NO total and fast NO kinetics were also reported in this study. The utility of NO-releasing hydroxyl-terminated HBPMH as a new antibacterial agent was demonstrated by the antibacterial and cytotoxicity assays. It is believed that hydroxyl-terminated HBPMH and other hyperbranched structures as disclosed herein can serve as a biocompatible scaffold for other biomedical applications (e.g., gene delivery or drug delivery). N-diazeniumdiolate-functionalized HBPMH may serve as effective NO-releasing materials for targeted applications.

In summary, a biocompatible hydroxyl-terminated hyperbranched poly(methylene bisacrylamide-hydroxyethyl ethylenediamine) (HBPMH) was successfully synthezied through green, low-cost, and efficient Michael addition polycondensation. The resulting secondary-amine-contained HBPMH was reacted with nitric oxide (NO) gas under alkaline conditions to yield N-diazeniumdiolate-functionalized HBPMH (HBPMH/NO). The NO total and half-life of HBPMH/NO are around ~2.01 µmol/mg and ~20 min, respectively. Gram-negative Pseudomonas aeruginosa and Gram-positive Staphylococcus aeruginosa were used to evaluate the antibacterial activity of HBPMH/NO, with minimum bactericidal concentrations for 4 hour incubation 50 µg/mL and 1000 µg/mL. Additionally, both control HBPMH and NO-releasing HBPMH/NO exhibited non-toxic nature to mammalian L929 mouse fibroblast cells in vitro.

Example 7: Synthesis of Hyperbranched Poly(Methylene Bisacrylamide-Aminoethyl Piperazine Synthesis of Hyperbranched Polymer (HBPMA)

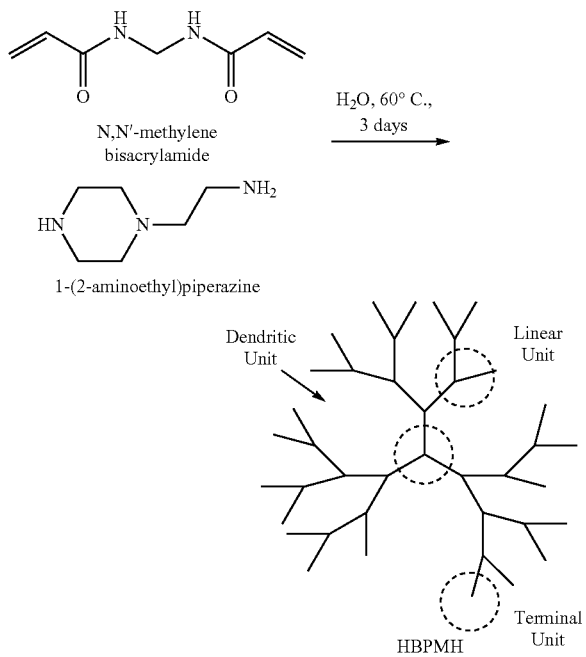

Figure 17:
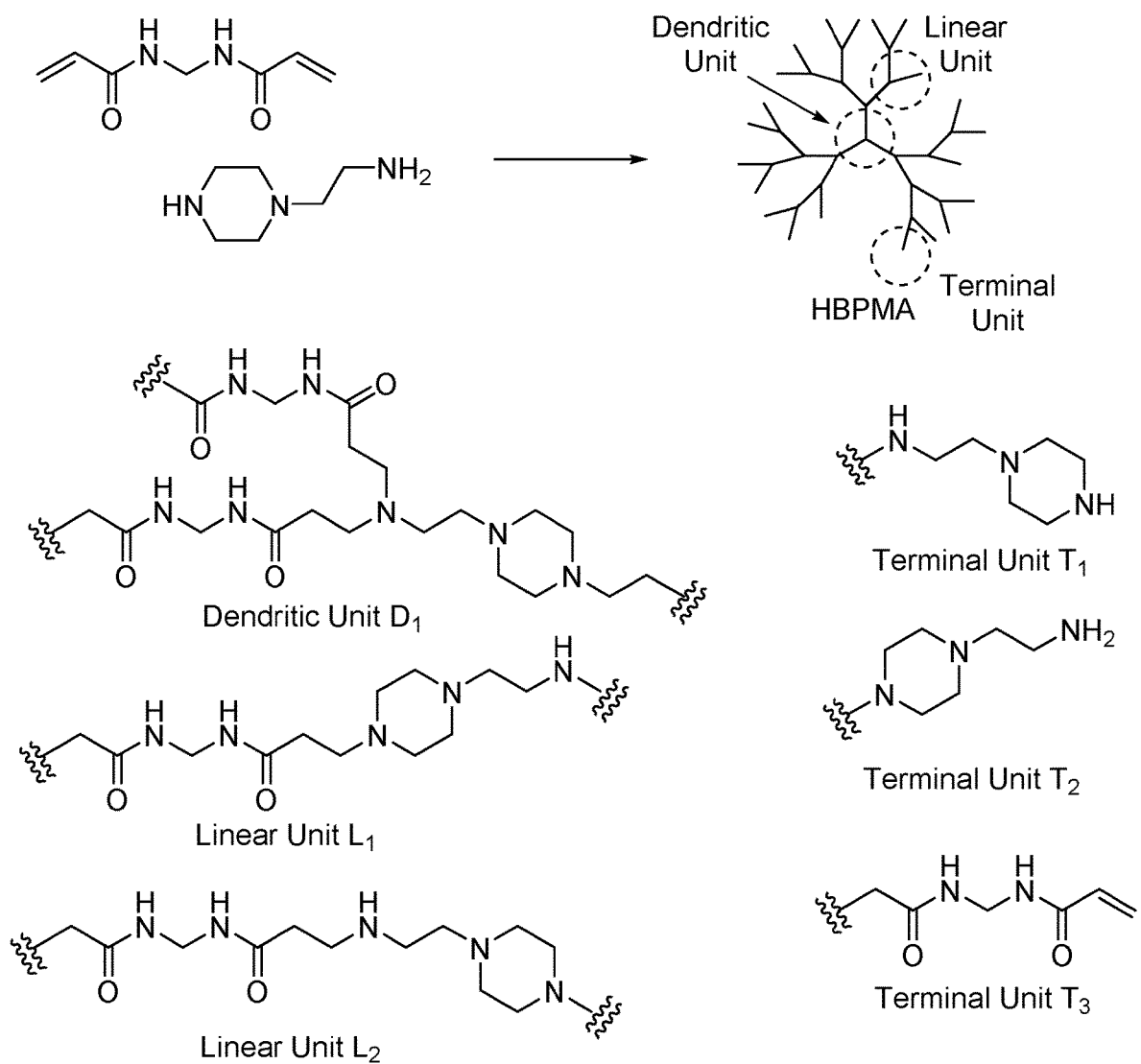
FIG. 17 shows a non-limiting example of a polymerization route of primary amine-terminated HBPMA via the Michael addition polymerization of MBA with AP, and representative structural segments in the macromolecular backbone.
Figure 18A:
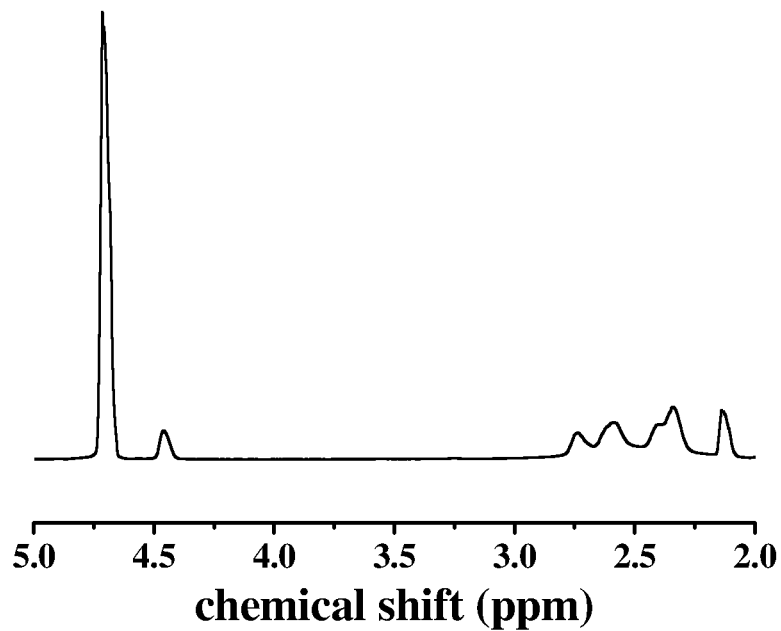
FIG. 18a and FIG. 18b show characterization data for HBPMA using $^1$H NMR (FIG. 18a) and quantitative $^{13}$C NMR spectrum (FIG. 18b).
Figure 18B:
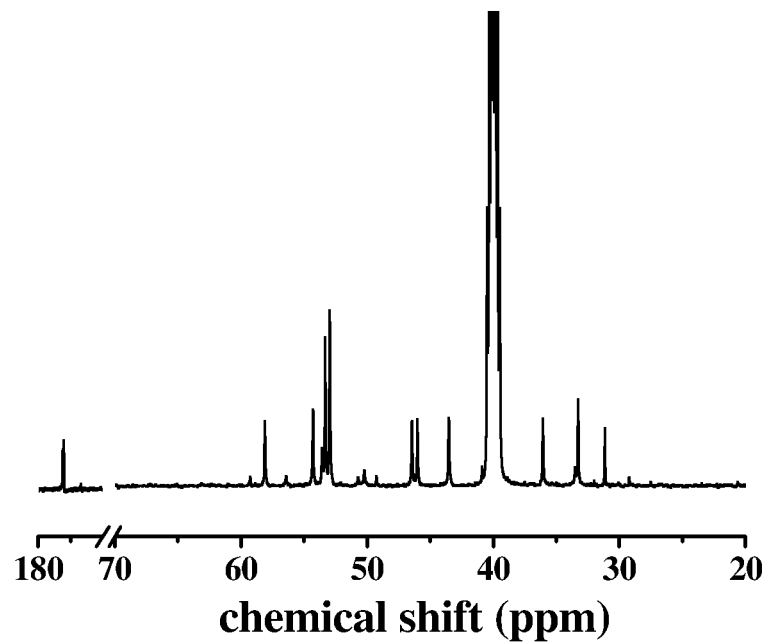

Hyperbranched poly(methylene bisacrylamide-aminoethyl piperazine) (HBPMA) was synthesized by Michael addition polycondensation between $A_2$-monomer of N,N'-methylene bisacrylamide (MBA) and trifunctional amine monomer of 1-(2-aminoethyl)piperazine (AP), with an equal feeding molar ratio at 60° C. for 3 days. Some possible structural units of HBPMA are shown in FIG. 17. $^1$H NMR and quantitative $^{13}$C NMR spectra were used to characterize the obtained hyperbranched polymers (FIG. 18(a) and FIG. (b)). The results were the same with the reported literature. Based on the quantitative $^{13}$C NMR spectrum, the degree of branching (DB) for HBPMA can be calculated according to the following formula of DB=(D+T)/(D+L+T), where D, T, and L represent the fractions of the branched, terminal, and linear units, respectively. The calculated DB was equal to 40.0%.

Synthesis of N-Diazeniumdiolate Nitric Oxide Donor-Modified Hyperbranched Scaffolds The synthetic HBPMA abundant with secondary amines was reacted with NO gas (10 bar) under strong alkaline conditions to yield N-diazeniumdiolates NO donors (FIG. 19(a)). The obtained N-diazeniumdiolate-modified HBPMA (HBPMA/NO) was characterized by $^1$H NMR spectra and UV-Vis spectra. The formation of HBPMA/NO was first characterized by $^1$H NMR spectra (FIG. 19(b)). Through diazeniumdiolation, the proton signals in the range of 2.50~2.85 ppm corresponding to methylene groups bonds to secondary amines are shifted to high chemical shifts in the range of 2.95~3.18 ppm, owing to the electron-withdrawing effect of newly-formed diazeniumdiolate groups. UV-Vis spectra (FIG. 19(c)) provided further evidence for the formation of HBPMH/NO. Compared to the UV-Vis spectrum of HBPMH, a strong and typical absorption peak (around ~256 nm) assigned to the N-diazeniumdiolates structure appeared in the UV-Vis spectrum (FIG. 19(c)), indicating the formation of HBPMH/NO. Besides, a broad absorption peak around 330~360 nm assigned to carcinogenic N-nitrosamine species was not observed, demonstrating that no N-nitrosamines were formed in the final NO donor of HBPMH/NO.

Characterization of Nitric Oxide Release

Figures 20A, 20B, 20C:
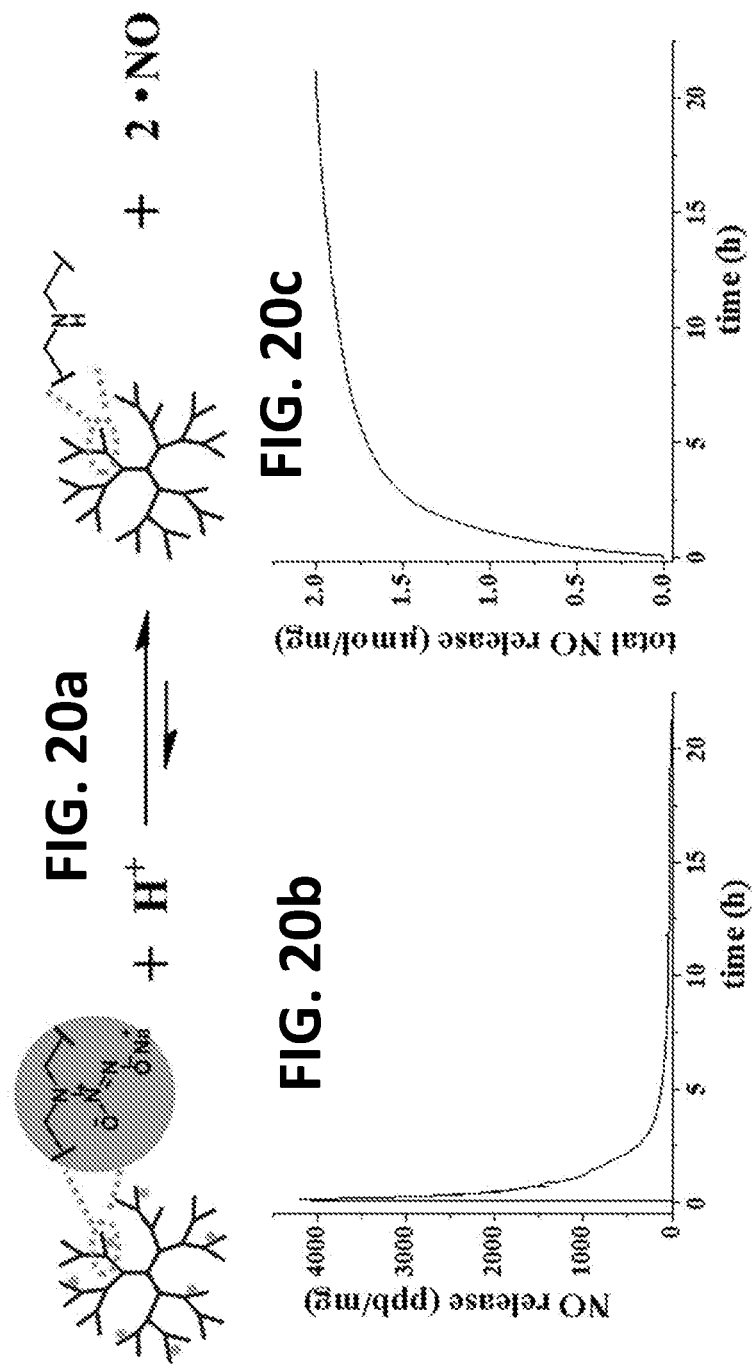
FIG. 20a through FIG. 20c show characterization of the dissociation of NO-releasing HBPMA/NO.

FIG. 20(a) displays a proposed dissociation procedure of N-diazeniumdiolate-modified HBPMA. In the dissociation of HBPMA/NO at physiological condition (i.e., 37° C., pH 7.4), 1 mole of N-diazeniumdiolates would react with 1 mole of proton and regenerate 1 mole of the parent secondary amine compounds and two moles of NO radicals. Chemiluminescence-based nitric oxide analyzer (NOA) was utilized to real-time detect the NO radicals, investigating the NO-releasing total storage and dissociation kinetics of the water-soluble HBPMH/NO in PBS buffer (pH 7.43) at physiological temperature (37° C.). The calculated NO-releasing parameters (e.g., total NO storage, half-life of NO release, maximum flux, time to maximum flux, and conversion rate) are provided in Table 5. Representative real-time NO release profiles of HBPMH/NO are shown in FIGS. 20(b) and 20(c). In general, HBPMH/NO exhibited higher NO storage capabilities (i.e., NO total ~2.08 μmol/mg) and similar NO-release kinetics (i.e., NO-release half-life ~60 min), compared to alkyl-modified G3 PAMAM denderimers (i.e., NO total ~1.0 μmol/mg and NO-release half-life ~60 min). The conversion efficiency of secondary amines in HBPMA to N-diazeniumdiolates was 29.4%. The conversion efficiency may be attributed to the steric hindrance from the densely topological architecture of hyperbranched polymers and repulsion interactions among the negatively-charged N-diazeniumdiolates.

TABLE 1

Nitric oxide releasing properties for HBPMA/NO in PBS (pH 7.4) at 37° C.

| Materials | t[NO]$^a$ (μmol/mg) | $t_{1/2}$ (min) | [NO]max (ppb/mg) | $t_{[NO]max}$ (min) | $t_{4\,h}$[NO]$^b$ (μmol/mg) | Conversion Efficiency (%) |
|---|---|---|---|---|---|---|
| HBPMH | 2.08 ± 0.10 | 60 ± 4 | 4541 ± 359 | 5.1 ± 1.0 | 1.73 ± 0.07 | 29.4 ± 1.4 |

$^a$Total NO storage;
$^b$NO released over 4 h (μmol) per milligram of HBPMH/NO. Each parameter was analyzed with multiple replicates (n ≥ 3).

CONCLUSION

Herein, a synthetic protocol for preparing NO-releasing hyperbranched structures capable of NO storage and release kinetics over wide ranges was provided. The favorable NO payloads, release kinetics, bactericidal action, and cytotoxicity suggest that these scaffolds may be used in a number of therapeutic applications beyond oral health.

What is claimed is:

1. A hyperbranched nitric oxide (NO) donating compound, comprising:

a linking group comprising any one or more of Formulas A, B, C, or D:

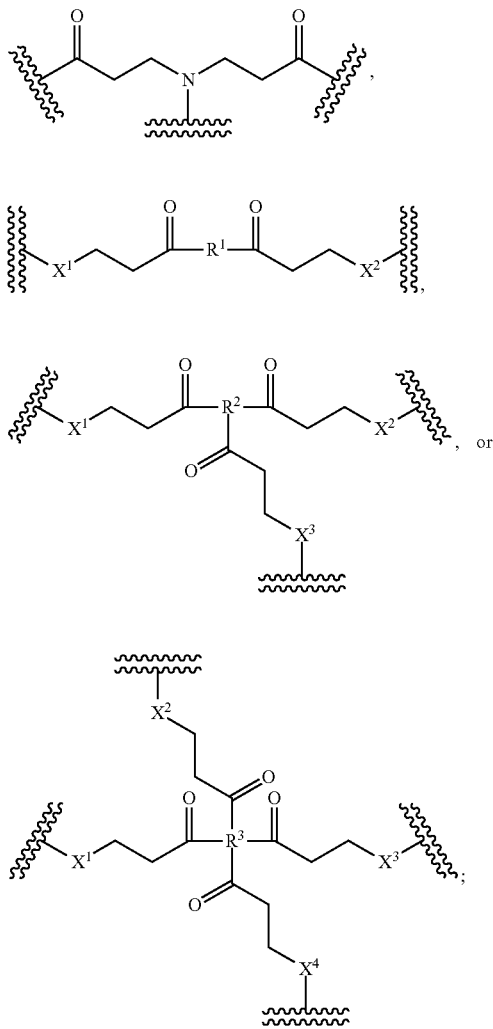

wherein,

∼∼∼ indicates an attachment to another portion of the hyperbranched NO donating compound;

$X^1$, $X^2$, $X^3$, and $X^4$ are independently selected from the group consisting of —NH—, —N($R_a$)—, —O—, and —S—; wherein, at least one instance of $X^1$, $X^2$, $X^3$, and $X^4$ is —N($R_a$)—;

wherein each instance of $R_a$ is selected from a NO donating moiety, —H, an optionally substituted $C_1$-$C_6$ alkyl group, or an optionally substituted polyether having 1 to 6 to repeat units; wherein, in at least one instance of Formula A, the secondary amine of Formula A is directly bound to a NO donating moiety or at least one instance of $R_a$ is a NO donating moiety, wherein the NO donating moiety is selected from the group consisting of:

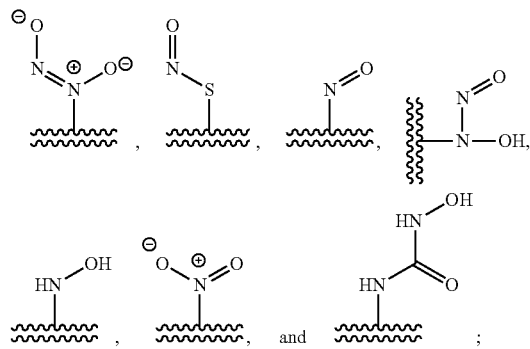

$R^1$, $R^2$, and $R^3$ are independently selected from the group consisting of —$R_b$N($R_c$)$R_d$—(N($R_c$))$_n$—$R_b$—, —$R_b$(O$R_d$—)$_n$O—$R_b$—, and $C_1$-$C_6$ alkyl;

wherein each instance of $R_c$ is independently selected from a NO donating moiety, —H, an optionally substituted $C_1$-$C_6$ alkyl group, or an optionally substituted poly ether having 1 to 6 repeat units;

wherein $R_b$ is a single bond or an optionally substituted $C_1$-$C_6$ alkylene group;

wherein $R_a$ is an optionally substituted $C_1$-$C_6$ alkylene group;

wherein n is an integer selected from 0, 1, 2, 3, 4, 5, or 6;

wherein, where $R^2$ is present, at least one instance of $R_d$ comprises the —C(O)—(CH$_2$)$_2$—$X^3$— group;

wherein, where $R^3$ is present, at least one instance of $R_d$ comprises the —C(O)—(CH$_2$)$_2$—$X^3$— group and at least one instance of $R_d$ comprises the —C(O)—(CH$_2$)$_2$—$X^4$— group;

and, wherein the hyperbranched compound does not comprise an aminoglycoside or glycoside unit.

2. The hyperbranched NO donating compound of claim 1, further comprising at least one instance of the following structure:

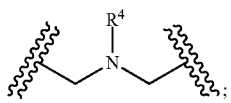

wherein $R^4$ is —N$^+$(=N—O—)O—.

3. The hyperbranched NO donating compound of claim 2, wherein the linking group comprises Formula A.

4. The hyperbranched NO donating compound of claim 1, wherein the linking group comprises Formula B, wherein:
$R^1$ is-$R_b$N($R_c$)$R_d$—(N($R_c$))$_n$—$R_b$—;
n is 1;
$R_d$ is —CH$_2$—;
$R_b$ is a single bond; and
each $R_c$ is H.

5. The hyperbranched NO donating compound of claim 4, wherein the linking group of Formula B is represented by the following structure:

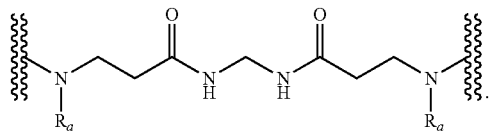

6. The hyperbranched NO donating compound of claim 5, wherein each instance of $R_a$ is the NO donating moiety or —H.

7. The hyperbranched NO donating compound of claim 6, wherein the linking group of Formula B is represented by the following structure:

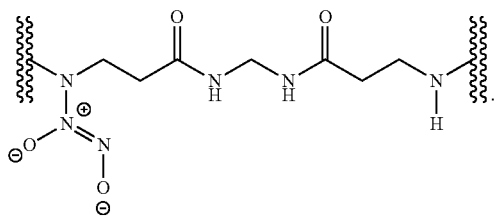

8. The hyperbranched NO donating compound of claim 1, further comprising an end group selected from the group consisting of:

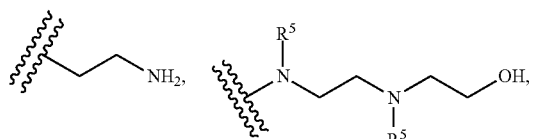

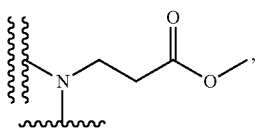

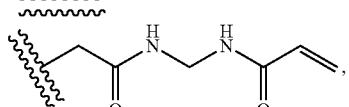

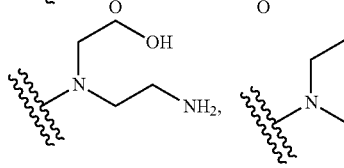

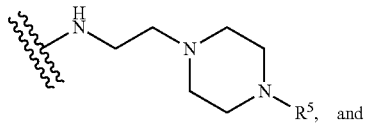

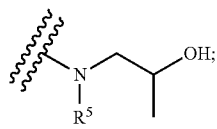

wherein each instance of $R^5$ is H or —N$_+$(=N—O—)O—.

9. The hyperbranched NO donating compound of claim 1, further comprising an end group selected from the group consisting of:

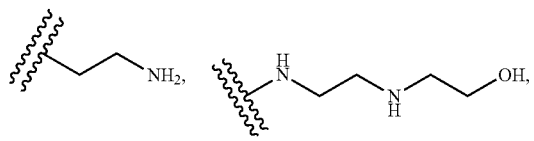

-continued

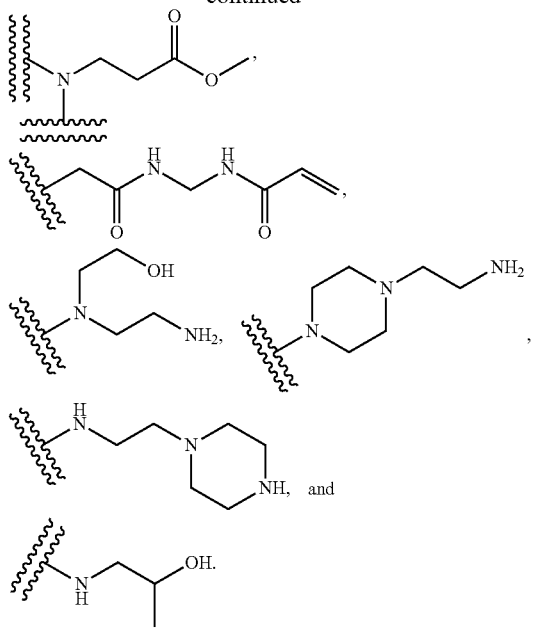

10. The hyperbranched structure of claim 1, further comprising one or more of the following groups:

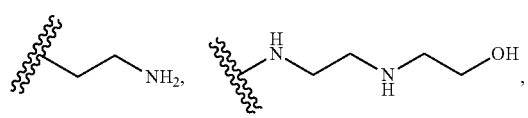

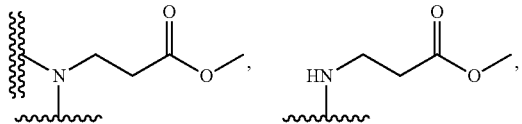

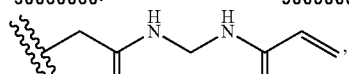

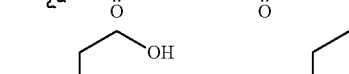

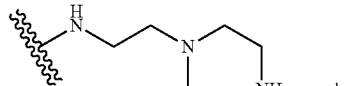

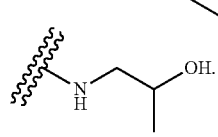

11. The hyperbranched structure of claim 1, wherein the hyperbranched structure lacks a dendritic core having any symmetric dendrons.

12. The hyperbranched compound of claim 1, wherein each instance of an optional substitution is selected from $C_1$-$C_6$ alkyl or —OH.

13. The hyperbranched nitric oxide (NO) donating compound of claim 1, wherein the NO donating moiety directly bound to a secondary amine in Formula A, or $R_a$ is

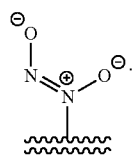
* * * * *